(12) United States Patent
Martin

(10) Patent No.: US 10,918,007 B2
(45) Date of Patent: Feb. 16, 2021

(54) WIRELESS CONTROL SYSTEM FOR ROW PLANTING SYSTEMS

(71) Applicant: Ronald S. Martin, Elkton, KY (US)

(72) Inventor: Ronald S. Martin, Elkton, KY (US)

( * ) Notice: Subject to any disclaimer, the term of this patent is extended or adjusted under 35 U.S.C. 154(b) by 0 days.

(21) Appl. No.: 16/794,177

(22) Filed: Feb. 18, 2020

(65) Prior Publication Data

US 2020/0221629 A1 Jul. 16, 2020

Related U.S. Application Data

(63) Continuation-in-part of application No. 16/593,765, filed on Oct. 4, 2019, and a continuation-in-part of application No. 15/690,269, filed on Aug. 29, 2017, now Pat. No. 10,561,054.

(60) Provisional application No. 62/804,208, filed on Feb. 11, 2019, provisional application No. 62/803,420, filed on Feb. 8, 2019, provisional application No. 62/741,438, filed on Oct. 4, 2018, provisional application No. 62/380,936, filed on Aug. 29, 2016.

(51) Int. Cl.

| | |
|---|---|
| *A01B 63/24* | (2006.01) |
| *A01B 63/32* | (2006.01) |
| *A01C 7/00* | (2006.01) |
| *A01B 35/16* | (2006.01) |
| *A01C 7/08* | (2006.01) |
| *A01B 63/00* | (2006.01) |
| *A01B 79/00* | (2006.01) |
| *A01C 5/06* | (2006.01) |
| *A01B 49/06* | (2006.01) |

(52) U.S. Cl.
CPC .............. *A01B 63/32* (2013.01); *A01B 35/16* (2013.01); *A01B 49/06* (2013.01); *A01B 63/008* (2013.01); *A01B 79/005* (2013.01); *A01C 5/066* (2013.01); *A01C 7/006* (2013.01); *A01C 7/08* (2013.01)

(58) Field of Classification Search
USPC .................................. 700/245–264; 701/2, 50
See application file for complete search history.

(56) References Cited

U.S. PATENT DOCUMENTS

| | | | | |
|---|---|---|---|---|
| 4,413,685 A | * | 11/1983 | Gremelspacher | ...... A01B 63/22 111/14 |
| 7,673,570 B1 | * | 3/2010 | Bassett | .................. A01C 7/006 111/63 |

(Continued)

*Primary Examiner* — Jonathan L Sample
(74) *Attorney, Agent, or Firm* — Duncan Galloway Egan Greenwald PLLC; Kevin T. Duncan

(57) ABSTRACT

An apparatus and system for adjustably controlling the position and depth of row closer wheels in no-till planting applications, the apparatus comprising a frame, a piston movably secured at the top to the frame, upper and lower parallel arms disposed about the piston and movably secured at one end to the frame and at the other end to a hub stem, and a set of piston arms each movably secured at the top to one of the upper or lower parallel arms and at the other end to the bottom of the piston. A closing wheel assembly having a closing wheel frame and a set of closing wheels pivotally mounted to a lever on a single axle assembly allows the operator to change the angle at which the closing wheels intersect the ground surface during use. Accordingly, as the angle of the lever is manipulated, the angle of the closing wheel pivotally mounted to that lever changes in the vertical and/or horizontal dimensions.

13 Claims, 58 Drawing Sheets

(56) References Cited

U.S. PATENT DOCUMENTS

| | | | | |
|---|---|---|---|---|
| 8,428,831 | B2* | 4/2013 | Thompson | A01B 69/004 |
| | | | | 701/50 |
| 8,550,020 | B2* | 10/2013 | Sauder | F15B 11/042 |
| | | | | 111/200 |
| 9,888,624 | B2* | 2/2018 | Maniar | A01C 7/088 |
| 2010/0180695 | A1* | 7/2010 | Sauder | G05B 19/402 |
| | | | | 73/862.045 |
| 2012/0060730 | A1* | 3/2012 | Bassett | A01B 63/008 |
| | | | | 111/149 |
| 2012/0060731 | A1* | 3/2012 | Bassett | A01C 7/205 |
| | | | | 111/149 |
| 2012/0305274 | A1* | 12/2012 | Bassett | A01B 21/083 |
| | | | | 172/5 |
| 2012/0312568 | A1* | 12/2012 | Van Buskirk | A01C 7/203 |
| | | | | 172/140 |
| 2013/0146318 | A1* | 6/2013 | Bassett | A01C 21/005 |
| | | | | 172/5 |
| 2013/0248212 | A1* | 9/2013 | Bassett | A01C 7/205 |
| | | | | 172/4 |
| 2014/0048297 | A1* | 2/2014 | Bassett | A01B 63/114 |
| | | | | 172/4 |
| 2014/0116735 | A1* | 5/2014 | Bassett | A01B 63/008 |
| | | | | 172/2 |
| 2017/0215334 | A1* | 8/2017 | Dienst | A01C 5/064 |

* cited by examiner

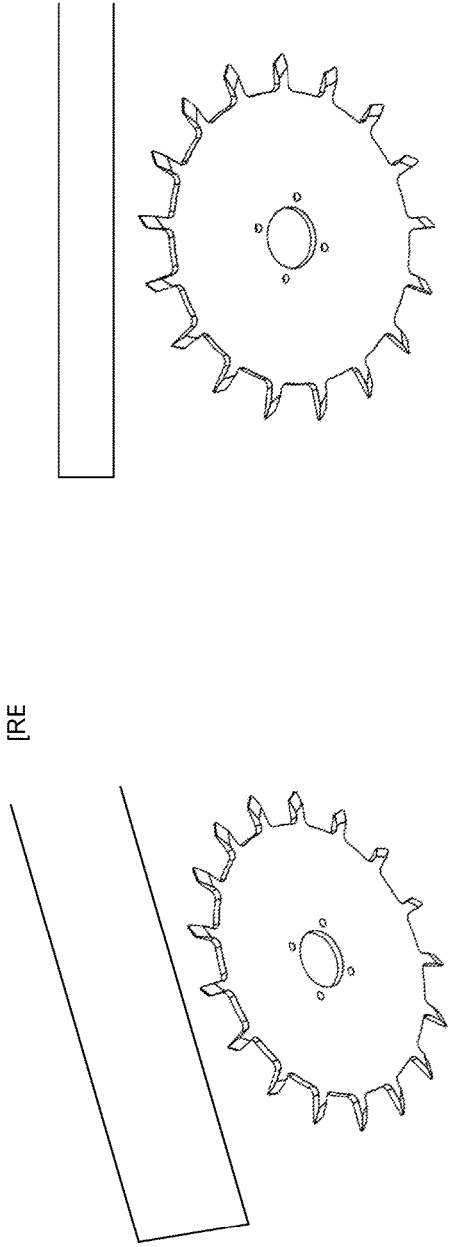
Fig. 1
[PRIOR ART]
Fig. 3
[PRIOR ART]
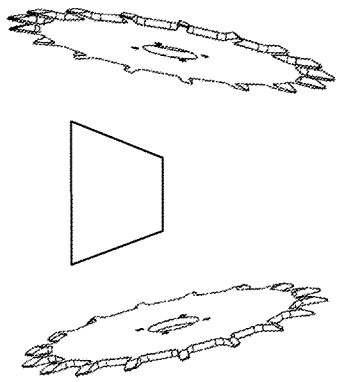
Fig. 4
[PRIOR ART]
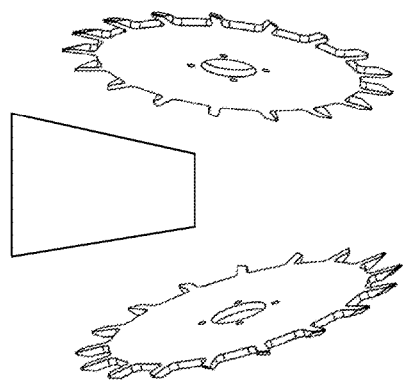
Fig. 2
[PRIOR ART]

WIRELESS CONTROL SYSTEM FOR ROW PLANTING SYSTEMS

CROSS-REFERENCE AND CLAIM OF PRIORITY

The present application is a continuation-in-part of U.S. patent application Ser. No. 15/690,269, entitled WIRELESS CONTROL SYSTEM FOR FLOATING ROW CLEANER, filed 29 Aug. 2017, Martin, which claims benefit of priority to U.S. Prov. Pat. App. 62/380,936, entitled WIRELESS CONTROL SYSTEM, filed 29 Aug. 2016, Martin; and the present application is a continuation-in-part of and claims benefit of priority to U.S. patent application Ser. No. 16/593,765, entitled COMPACT ROW CLOSER AND ROW CLEANER ASSEMBLIES, filed 4 Oct. 2019, Martin et al., which claims benefit of priority to provisional applications U.S. Prov. Pat. App. No. 62/741,438, entitled COMPACT PARALLEL ARM ROW CLOSER AND ROW CLEANER, filed 4 Oct. 2018, Martin et al.; to U.S. Prov. Pat. App. 62/803,420, entitled IMPROVED ROW CLEANER/CLOSING WHEEL, filed 8 Feb. 2019, Martin et al.; and to U.S. Prov. Pat. App. No. 62/804,208, entitled IMPROVED ROW CLOSING WHEEL ASSEMBLY, filed 11 Feb. 2019, Martin et al., all of which are incorporated by reference herein in their entirety.

FIELD OF THE INVENTION

The present disclosure is generally applicable to the field of agricultural equipment, and more particularly for improved row closing and row cleaning in no-till farming applications and for improved row cleaning and for the closing of seed troughs.

AUTHORIZATION PURSUANT TO 37 C.F.R. § 1.171 (D)(C)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used at the front or leading portion of a planter row unit to clear only a small portion or strip of earth of the residue to enable seeds and fertilizer to be placed in the ground in connection with a coulter or other tillage tool. The row cleaner removes the residue and only very lightly tills the topmost soil or earth to provide for a clear path for seed and fertilizer placement. One key aspect to row cleaner operation is to maintain necessary clearance between the row cleaner and the coulter or other tillage tool for terrain responsive operation. Also, at the trailing end of the planter row unit closing wheels are used to close the seed slot opened during row planting operation.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners. However, these existing row cleaner systems have drawbacks. Fixed row cleaners do not follow or track changes in land elevation as the planter moves over a field. Adjustable and floating row cleaners may not possess the ideal geometry with respect to a planter to provide for optimal row cleaning action by the cleaner wheel assemblies. Additionally, after seeds have been planted the open planted row need to be closed. Existing row closing assemblies comprise similar drawbacks and limitations to those of existing row cleaners. Namely, existing row closing assemblies do not maintain an ideal desired geometry for closing wheels as the closing wheels and row closing assembly travel over terrain.

For example, as the row closing wheel assemblies of the prior art travel down a row, they may rise and fall with changes in row elevation. However, these changes in elevation cause a change in the geometry, or orientation, of the row closing wheels relative to the row being closed. If the closing wheel assembly is at too low of an angle, the closing action of the wheel assembly may be considered "negative" as opposed to the desired "positive" closing action of a level closing wheel assembly. Prior art closing wheel assemblies can be centered over an open row or seed slot where seeds have been planted. However, most cannot be adjusted at all, or if they can be adjusted they cannot be adjusted to compensate for changes in elevation over a row or seed slot. A 13" spading closing wheel is 1" greater in diameter than a standard smooth closing wheel. This is by design to allow the wheels to engage the soil and effectively close the seed slot. When working in looser soils, the spading closing wheels frequently engage the soil deeper than in firmer soils. To help reduce this excessive soil engagement, down pressure may need to be reduced, e.g., to a minimum setting, by adjusting the angle of the entire closing wheel assembly. Greater down pressure settings tend to lower the rear of the closing wheel arm assembly, which reduces the gathering action of the two spading closing wheels. FIGS. 1-4 of the prior art closing wheel arm illustrate the problem. The angle of the closing wheel arm assembly influences the gathering action of the spading closing wheels. A low closing wheel arm (FIG. 1) angle creates the negative closing action (FIG. 2), and a level closing wheel arm (FIG. 3) creates the positive closing action (FIG. 4).

U.S. Pat. No. 4,785,890 issued to Martin for "Ground-driven rotary row cleaner" illustrates prior art that may be relevant to the invention disclosed and claimed herein, but which fails to teach the improvements disclosed and claimed herein.

What is needed is a compact row closing assembly and/or row cleaning assembly that can both follow or track changes in land elevation and maintain an optimal geometry or angle with respect to the planter or plater system to provide for optimal row cleaning operation and/or positive row closing action with minimal soil engagement and down pressure.

Another problem with existing row closer wheel designs is that the relative angle of the wheels with respect to the frame can be difficult to change for any given set of closer wheels.

What is needed is a single lever user interface to provide for the adjustment of the angle of penetration of row closer wheels with respect to a furrow or seed trough.

SUMMARY OF THE INVENTION

The present invention provides a compact parallel arm configuration that may be used in both floating row closer systems and in row cleaner systems and provides an effective and efficient solution that improves both row cleaning and row closing operations over prior art row closer/cleaning systems. Although discussed largely in the context of row closing operation in this specification, the invention is expressly stated herein as applying also to row cleaning operation and persons possessing ordinary skill in the art would appreciate and understand the use and benefits of the invention in connection with row cleaning operation.

Critically, the parallel-linkage configuration of the present invention provides a frame for supporting spading closing wheels or alternatively row clearing wheels. The parallel-linkage frame allows the row closer/cleaner to move vertically up/down relative to the ground without altering the angle of approach of the interlinked spading closing/cleaning wheels when encountering changing ground/terrain elevation. Closing/cleaning wheels have teeth configured to interlink or mesh effectively in a rotating operation to engage the ground and/or debris.

In connection with one embodiment of the present invention in a row closing/cleaning operation, the compact parallel arm floating row closer/cleaner system provides the benefits of a floating row closer/cleaner in a form factor typically associated with fixed row closer/cleaner assemblies. The compact parallel arm floating row closer/cleaner may include a spring bias or other bias or optionally comprises a pneumatic, electrical, hydraulic or electro-mechanical piston positioned in a vertical orientation, perpendicular to a frame mounting plate. For example, the piston may be secured at its top to the frame mounting plate by a pin. Disposed about the piston are a set of parallel arms, comprising an upper parallel arm assembly and a lower parallel arm assembly, and (optionally) one of a set of piston arms. Each of the upper parallel arm assembly and lower parallel arm assembly on either side of the piston are secured by fastener to the frame mounting plate at one end, a proximal end or rear, and are permitted to move rotatably in an angular fashion about the mounting point by a bushing or bearing. At the other end of each arm assembly, a distal end or front, each arm assembly is similarly secured to a mounting point at the top or upper end of a stem assembly. Each of two piston arms is secured at the top to both of the parallel arm assemblies by fasteners, and is secured at the bottom of the piston arm to the bottom of the piston by a fastener. In this exemplary configuration, the upper arm assembly and the lower arm assembly, which are each substantially "U" shaped, are disposed about the piston and the piston arms are disposed on opposite sides of the piston and exterior of the upper and lower arm assemblies.

As the piston extends and retracts, or compresses and decompresses, it maintains a substantially vertical position relative to the ground. The vertical orientation of the piston relative to the ground provides for the compact parallel arm floating row closer of the present invention to maintain a form factor typically associated with fixed row closer assemblies while providing the ground or terrain following features of a floating row closer assembly. The parallel arm assemblies change angle or orientation with respect to the piston and frame mounting plate, and also with respect to a stem assembly, but the stem assembly and piston maintain a constant, substantially vertical orientation and remain substantially parallel to one another as the piston compresses and decompresses to follow changes in terrain elevation.

By maintaining the orientation and angle of the stem assembly, the compact parallel arm floating row closer of the present invention keeps the row closing wheels of the wheel assemblies in the desired orientation with respect to the ground to provide for optimal row closing without excessive soil engagement while maintaining an optimal positive closing action. The stem assembly can only travel vertically up and down following the movement of the piston arm, thereby preventing any changes in angle of the row closer wheel assemblies with respect to the ground as the compact parallel arm floating row closer moves to follow changes in the terrain. This provides for row closing at a constant soil engagement depth and pressure providing for ideal planting and row closing conditions.

Applicant further discloses and claims herein a row cleaner frame and structure, without limitations, which has particular application as an improved no-till or minimum tillage planting apparatus and or planting row unit. The present invention provides a mounting mechanism for planter row unit row cleaners. It includes an assembly for mounting the residue wheels in front of the row unit so that the row cleaner wheels are mounted in front of and to each side of a coulter, as in FIGS. 46-49. The row cleaner assembly itself is pivotally connected to the planter frame and one side of the support arm upon which the row unit coulter is mounted. The mounting of the row cleaner allows it to rise and fall about a horizontal axis, within a predetermined range, in response to either terrain elevation changes or contact with non-moveable obstructions such as rocks, large soil clods and root crowns.

A large of number of corn acres are planted with a row spacing of 30-38 inches. For various reasons, including increased yields, decreasing erosion and decreasing chemical costs, farmers are interested in reducing row spacing to less than 30 inches. Reductions to a row spacing of 15-20 inches is therefore desirable. The reduction in width between planted rows in combination with the use of row cleaners can lead to plugging of the planter row units i.e. the volume of trash flow is too high for the amount of actual physical space available between planter row units contiguously mounted on a tool bar. Furthermore, the reduced spacing between row units reduces the physical space available for mounting a row cleaner to a row unit. This problem is especially an issue for planters having a split row type, such as the 1700 Series John Deere front-fold planter. Applicant's design is of benefit and desirable. Additionally, many users wish to mount an accessory tool with the row cleaner, i.e. a coulter mounted in combination with a row cleaner for each row unit.

The present invention further provides a closing wheel assembly adapted or configured to provide for the adjustment of the orientation of closing wheels with respect to the furrow. The closing wheel assembly consists of a single lever that is pivotally mounted to the axle assembly and may move relative to the adjustable closing wheel frame. One end of the lever forms a handle and the opposite end attaches to a single axle, the axle having angled ends for attaching a set of closing wheels on a set of corresponding hubs. Angle notches or axle securing points are provided on a securing point arm or portion of the frame to secure the lever in a desired position, which consequently secures the closing wheels and axle attached to that angle lever in a desired orientation. If the closing wheels are angled with respect to the furrow in either the vertical or horizontal planes, adjusting the lever may compensate for orientation changes in the closing wheels due to changes in penetration depth of the closing wheels.

The single lever interface of the current invention improves over the multiple lever designs of the prior art and provides for a single interface through which the angle of a set of closing wheels on an adjustable closing wheel frame may be re-oriented with respect to the ground. The relative toe-in, camber, and/or angle of penetration of the closing wheels on the single axle may be adjusted by manipulating the lever and securing it one of a plurality of locking points on the adjustable closing wheel frame.

The present invention further provides a firming wheel frame and a row closing wheel frame for use with a row planting unit. The firming wheel frame and row closing wheel frame provide for the use of a single lever angle adjustment or independent lever angle adjustment on row closing wheels with certain row planter unit types, such as those produced by Case IH. The firming wheel frame positions the firming wheel to the rear of the row planter unit and clear of the closing wheel frame and closing wheels. The firming wheel frame is also angled to provide access to row planter unit adjustments on the row planter unit. The row closing wheel frame is positioned relatively forward of the row planting unit and the position and height of the frame may be adjusted by a pneumatic or hydraulic system, such as by a locally or remotely controlled actuator. The firming wheel frame and the closing wheel frame are shaped such that they do not interfere with the operation of the row planter unit, the firming wheel, or with each other, and the firming wheel frame and the closing wheel frame are independently adjustable through the firming wheel suspension, row cleaner adjustment actuator, and row planting unit factory adjustment features.

In the present invention, the row closing wheels may be positioned on a common rotating axis or may be positioned on offset or independent axes. Positioning the row closing wheels on an offset axis provides for the pushing of material through the teeth of the row cleaning wheels and allows for material to flow through the wheels. In some soil and moisture conditions, having the closing wheels on a common axis can cause material to be picked up and dropped instead of closing a seed trough or furrow as desired. The co-axial wheels may "fight" or counteract each other instead of providing a complementary closing action.

Additionally, separately mounting the closing wheels and having the closing wheels on separate axes provides for the independent adjustment of the angle of the closing wheels, which may be desirable in some soil conditions. The types of closing wheels used with the cleaning and closing wheel frames as disclosed herein may be changed to properly suit soil conditions and closing or cleaning wheel types may be "mixed-and-matched" to provide for optimum results. For example, a smooth wheel may be used with a razor wheel, a razor wheel may be used with a spike wheel, and any other combination of one or more wheels may be used to provide the desired cleaning or closing action. This enables the wheels to best match the soil conditions. Additionally, increasing the angle, toe-in, or camber of the wheels relative to their engagement with the ground may be said to provide a more "aggressive" engagement with the soil which is desirable in moist or wet soil conditions. Having a less "aggressive" engagement with the soil may be desirable in drier soil conditions.

A first embodiment of the invention provides a wireless control system for use with a planter row unit to provide adjustable depth control of a set of row cleaner assemblies, the control system comprising: a controller adapted to communicate via a communications link with a user-operated processor-based device having operating thereon a control application compatible with the controller; a source of compressed air adapted to output a pneumatic main supply; an electro-pneumatic regulator having an electrical input adapted to receive an electrical control signal originating from the controller, a pneumatic input in communication with the pneumatic main supply, and a pneumatic output adapted to provide a first pneumatic control supply at a first supply pressure; an air bag adapted to provide a variable force responsive to the first supply pressure on a row cleaner device, the air bag being fixed at one end relative to a frame portion of a planter row unit; and a biasing means adapted to bias the row cleaner device in a direction opposite to the air bag variable force; wherein the air bag device and the biasing means are mechanically connected to the row cleaner device by a set of linkages configured to move in an essentially vertical orientation relative to the ground.

The first embodiment may be further characterized by one or more of the following additional features: a plurality of air bags connected to the first pneumatic control supply to provide variable force on respective row cleaner devices, with each of the plurality of air bags being fixed at one end relative to a frame portion of a planter row unit; the controller comprises a programmable logic controller (PLC) adapted to communicate via a communications link with a user-operated processor-based device having operating thereon a control application compatible with an operating system of the PLC; the set of linkages comprise a pair of parallel linkages configured to pivot relative to the frame portion of the row planter and move at an end distal to the row planter in an essentially vertical manner; the biasing means is a mechanical spring; the biasing means is a second air bag configured opposite the air bag; a second electro-pneumatic regulator having an electrical input adapted to receive an electrical control signal originating from the controller, a pneumatic input in communication with the pneumatic main supply, and a pneumatic output adapted to provide a second pneumatic control supply at a second supply pressure, and wherein the biasing means is a second air bag configured opposite the air bag and is responsive to the second pneumatic control supply; a position feedback sensor adapted to sense the position of the row cleaner device and produce a position feedback signal representative of the sensed position, the position feedback sensor having an output in direct or indirect communication with the controller; the user-operated processor-based device is a portable controller device adapted to present a user interface element to enable an operator to adjust/set the first pneumatic control supply via a graphical user interface (GUI)

displayed on the portable controller device; the controller communicates with the user-operated processor-based device using a wireless protocol; the wireless protocol is Bluetooth; the controller communicates with a cab control platform via an ISOBUS communications system.

A second embodiment of the invention provides a wireless control system for use with a planter row unit to provide adjustable control of a set of row closer assemblies, the control system comprising: a controller adapted to communicate via a communications link with a user-operated processor-based device having operating thereon a control application compatible with the controller; a source of compressed air adapted to output a pneumatic main supply; an electro-pneumatic regulator having an electrical input adapted to receive an electrical control signal originating from the controller, a pneumatic input in communication with the pneumatic main supply, and a pneumatic output adapted to provide a first pneumatic control supply at a first supply pressure; an air bag adapted to provide a variable force responsive to the first supply pressure on a row closer device, the air bag being fixed at one end relative to a frame portion of a planter row unit; and a biasing means adapted to bias the row closer device in a direction opposite to the air bag variable force; wherein the air bag device and the biasing means are mechanically connected to the row closer device by a set of linkages configured to move in an essentially vertical orientation relative to the ground.

The second embodiment may be further characterized by one or more of the following additional features: a plurality of air bags connected to the first pneumatic control supply to provide variable force on respective row closer devices, with each of the plurality of air bags being fixed at one end relative to a frame portion of a planter row unit; the controller comprises a programmable logic controller (PLC) adapted to communicate via a communications link with a user-operated processor-based device having operating thereon a control application compatible with an operating system of the PLC; the set of linkages comprise a pair of parallel linkages configured to pivot relative to the frame portion of the row planter and move at an end distal to the row planter in an essentially vertical manner; the biasing means is a mechanical spring; the biasing means is a second air bag configured opposite the air bag; a second electro-pneumatic regulator having an electrical input adapted to receive an electrical control signal originating from the controller, a pneumatic input in communication with the pneumatic main supply, and a pneumatic output adapted to provide a second pneumatic control supply at a second supply pressure, and wherein the biasing means is a second air bag configured opposite the air bag and is responsive to the second pneumatic control supply; a position feedback sensor adapted to sense the position of the row closer device and produce a position feedback signal representative of the sensed position, the position feedback sensor having an output in direct or indirect communication with the controller; the user-operated processor-based device is a portable controller device adapted to present a user interface element to enable an operator to adjust/set the first pneumatic control supply via a graphical user interface (GUI) displayed on the portable controller device; the controller communicates with the user-operated processor-based device using a wireless protocol; the wireless protocol is Bluetooth; the controller communicates with a cab control platform via an ISOBUS communications system.

In one embodiment the present invention provides a compact parallel arm floating row closer assembly without a piston as in the first embodiment. A frame mounting plate is secured to a planter frame. Upper and lower sets of left and right parallel arms are secured at a proximal end, or rear, to the frame mounting plate by a fastener and nut, and are secured at an other end, a distal end or front, to a corresponding left or right hub frame by a fastener. The hub frame connects the upper and lower sets of parallel arms to provide for vertical movement of the closing wheel assemblies that are secured to the hub plates of the hub frame. A spring secured to the frame mounting plate and to a connecting bolt provides a tension to apply a constant downward pressure for even soil engagement. The connecting bolt may be placed in one of several positions on either the upper or lower parallel arms depending on how the row closer is installed and based on the terrain, desired closing action, etc.

In another embodiment, the present invention provides a floating assembly adapted for use as a row closer or row cleaner when connected, respectively, to the trailing end or leading end of a row planter. The floating assembly comprising: a frame mounting plate; a set of at least two upper arms each having a front end and a rear end, each rear end movably secured to the frame mounting plate at a set of upper frame pivot points with each front end distal to the frame mounting plate; a set of at least two lower arms each having a front end and a rear end, each rear end movably secured to the frame mounting plate at a set of lower frame pivot points with each front end distal to the frame mounting plate, wherein the upper and lower arms are parallel to one another and extend outward from the frame mounting plate; a wheel support member essentially parallel to and spaced from the frame mounting plate, the wheel support member having a top end and a bottom end, the wheel support top end being pivotally connected to the set of upper arms at a top pivot and the wheel support bottom end being pivotally connected to the set of lower arms at a bottom pivot; a pair of wheel mounts extending from the wheel support member bottom end and being adapted to rotatably support a connected wheel.

The invention may further be characterized by wherein the wheel support member further comprises: a set of at least two wheel support members parallel to and spaced from the frame mounting plate with each wheel support member having a top end and a bottom end, each wheel support top end being pivotally connected to a respective one from the set of upper arms at a top pivot point and each wheel support bottom end being pivotally connected to a respective one from the set of lower arms at a bottom pivot point, and each wheel support member having an angled wheel mount extending inwardly and downwardly from the wheel support member bottom end being adapted to rotatably support a connected wheel.

In another embodiment, the present invention provides a floating row closer apparatus comprising: a frame mounting plate; a parallel arm floating assembly comprising: a piston having a top and a bottom, the top being movably secured to the frame mounting plate; an upper parallel arm assembly having a front end and a rear end, the rear end movably secured to the frame mounting plate, the upper parallel arm assembly being substantially "U" shaped; a lower parallel arm assembly having a front end and a rear end, the rear end movably secured to the frame mounting plate, the lower parallel arm assembly being substantially "U" shaped; a set of piston arms having a top and a bottom, the top of each arm in the set of piston arms movably secured to both the upper parallel arm assembly and lower parallel arm assembly, the bottom of each arm in the set of piston arms movably secured to the bottom of the piston; wherein the piston is disposed between the upper parallel arm assembly and lower parallel arm assembly; and wherein the piston and the set of piston arms maintain a relative angle when the piston changes from a compressed to an uncompressed state and the upper parallel arm assembly and lower parallel arm assembly change in angular orientation with respect to the frame mounting plate, the piston, and the piston arms when the piston moves from a compressed to an uncompressed state.

The apparatus may further comprise a stem assembly. The stem assembly may be disposed between the front end of the upper and lower parallel arm assemblies. The stem assembly may provide stability to upper and lower parallel arm assemblies. The apparatus may further comprise a set of wheel assemblies disposed on the stem assembly. The upper parallel arm assembly, the lower parallel arm assembly, the set of piston arms, and the piston may provide for the movement of the stem assembly and the set of wheel assemblies up and down in a vertical direction. The movement of the stem assembly and the set of wheel assemblies may not change a relative angle of the of the set of wheel assemblies with respect to a surface. The set of wheel assemblies may comprise row closer wheels. The piston may be a pneumatic piston, adjustable remotely, or the piston may further comprise a piston shaft secured to the set of piston arms.

In another embodiment the present invention provides a floating row closer apparatus comprising: a frame mounting plate; a parallel arm floating assembly comprising: a spring having a first end and a second end, the first end being secured to the frame mounting plate and the second end being secured to a connector; a first set of parallel arms having a front end and a rear end, the rear end movably secured to the frame mounting plate, each arm comprising a set of connector apertures; a second set of parallel arms having a front end and a rear end, the rear end movably secured to the frame mounting plate, each arm comprising a set of connector apertures; a set of hub frame plates having a top and a bottom, the top of each hub frame plate in the set of hub frame plates movably secured to both of either the front end of the first set of parallel arms or front end of the second set of parallel arms; wherein the connector is disposed between first set of parallel arms and the second set of parallel arms, and is disposed on a corresponding set of connector apertures from the respective sets of connector apertures for the respective first and second sets of parallel arms; and wherein the frame mounting plate and the set of hub frame plates maintain a relative angle when the set of hub frame plates travel up and down in a vertical orientation and the first and second sets of parallel arms change in angular orientation with respect to the frame mounting plate and the set of hub frame plates when the set of hub frame plates travel up and down in a vertical orientation, the spring providing a tension on the parallel arm floating assembly as the spring moves from a compressed to an uncompressed state through the up and down travel of the set of hub frame plates.

In one exemplary embodiment, the invention provides a closing wheel assembly comprising: a laterally adjustable closing wheel stem comprising a set of lateral position settings adapted to receiving a position locking member to hold the closing wheel stem in place, the closing wheel stem adapted to be securely supported by a closing wheel assembly support; a pair of closing wheels respectively attached in rotatable fashion to a pair of hubs and secured to the hubs by fastening means; a common or unified axle for supporting the pair of hubs and pair of closing wheels, the common axle securely attached to the closing wheel stem and having an axis essentially perpendicular to the ground when mounted for operation; a lever coupled to the common axle to provide adjustable positioning of the pair of closing wheels relative to the ground; wherein the pair of hubs are angled to provide a toe-in configuration of the oppositely facing closing wheels to allow closing wheels to be adjustably angled by operation of the single lever assembly in either or both of vertical and/or horizontal planes to provide a desired orientation of the closing wheels with respect to the furrow.

The closing wheel assembly may be further characterized in one or more of the following manners: wherein the lever includes a ring portion connected to the common axle; further comprising a lever position member comprising a plurality of locking points adapted to receive a pin, protrusion or other locking means provided on the lever to hold the lever in place and to maintain a desired orientation of the closing wheels; wherein the closing wheel stem includes a rotational support or shell for receiving and supporting the common axle; wherein the closing wheel stem is both laterally (vertically) adjustable and adapted for angular adjustment relative to a front/back orientation of the planter to provide further orientation adjustment of the pair of closing wheels; wherein the closing wheel stem is mounted to a set of parallel linkage arms configured to provide a degree of vertical freedom of movement of the closing wheel assembly; further comprising a piston mechanically coupled to the closing wheel stem and adapted to provide a degree of vertical freedom of movement of the closing wheel assembly.

In another embodiment the present invention provides a floating assembly adapted for use as a row closer or row cleaner when connected, respectively, to the trailing end or leading end of a row planter, the assembly comprising: a frame mounting plate; a set of at least two upper arms each having a front end and a rear end, each rear end movably secured to the frame mounting plate at a set of upper frame pivot points with each front end distal to the frame mounting plate; a set of at least two lower arms each having a front end and a rear end, each rear end movably secured to the frame mounting plate at a set of lower frame pivot points with each front end distal to the frame mounting plate, wherein the upper and lower arms are parallel to one another and extend outward from the frame mounting plate; a wheel support member essentially parallel to and spaced from the frame mounting plate, the wheel support member having a top end and a bottom end, the wheel support top end being pivotally connected to the set of upper arms at a top pivot and the wheel support bottom end being pivotally connected to the set of lower arms at a bottom pivot; a pair of wheel mounts extending from the wheel support member bottom end and being adapted to rotatably support a connected wheel; a laterally adjustable closing wheel stem comprising a set of lateral position settings adapted to receiving a position locking member to hold the closing wheel stem in place; a common or unified axle for supporting pair of connected wheels, the connected wheels each comprising a wheel hub, the common axle securely attached to the closing wheel stem and having an axis essentially perpendicular to the ground when mounted for operation; a lever coupled to the common axle to provide adjustable positioning of the pair of closing wheels relative to the ground; wherein the hubs are angled to provide a toe-in configuration of the connected wheels to allow wheels to be adjustably angled by operation of the single lever assembly in either or both of vertical and/or horizontal planes to provide a desired orientation of the closing wheels with respect to a furrow. The assembly may further comprise a firming wheel frame adapted to position a firming wheel out from the row planter, the firming wheel frame comprising an angled body configured to provide access to adjustment features of the row planter.

BRIEF DESCRIPTION OF THE FIGURES

In order to facilitate a full understanding of the present invention, reference is now made to the accompanying drawings, in which like elements are referenced with like numerals. These drawings should not be construed as limiting the present invention, but are intended to be exemplary and for reference.

In order that the advantages of the cleaning wheel will be readily understood, a more particular description of the assemblies briefly described above will be rendered by reference to specific embodiments illustrated in the appended drawings. Understanding that these drawings depict only typical embodiments of the cleaning wheel and are not therefore to be considered limited of its scope, the assemblies will be described and explained with additional specificity and detail through the use of the accompanying drawings.

FIG. 1 provides a perspective view of a prior art fixed row closer in a low closing wheel arm angle position.

FIG. 2 provides a perspective view of a prior art fixed row closer in a low closing wheel arm angle position and showing a negative closing action.

FIG. 3 provides a perspective view of a prior art fixed row closer in a level closing wheel arm position.

FIG. 4 provides a perspective view of a prior art fixed row closer in a level closing wheel arm position and showing a positive closing action.

DETAILED DESCRIPTION

Figure 5:
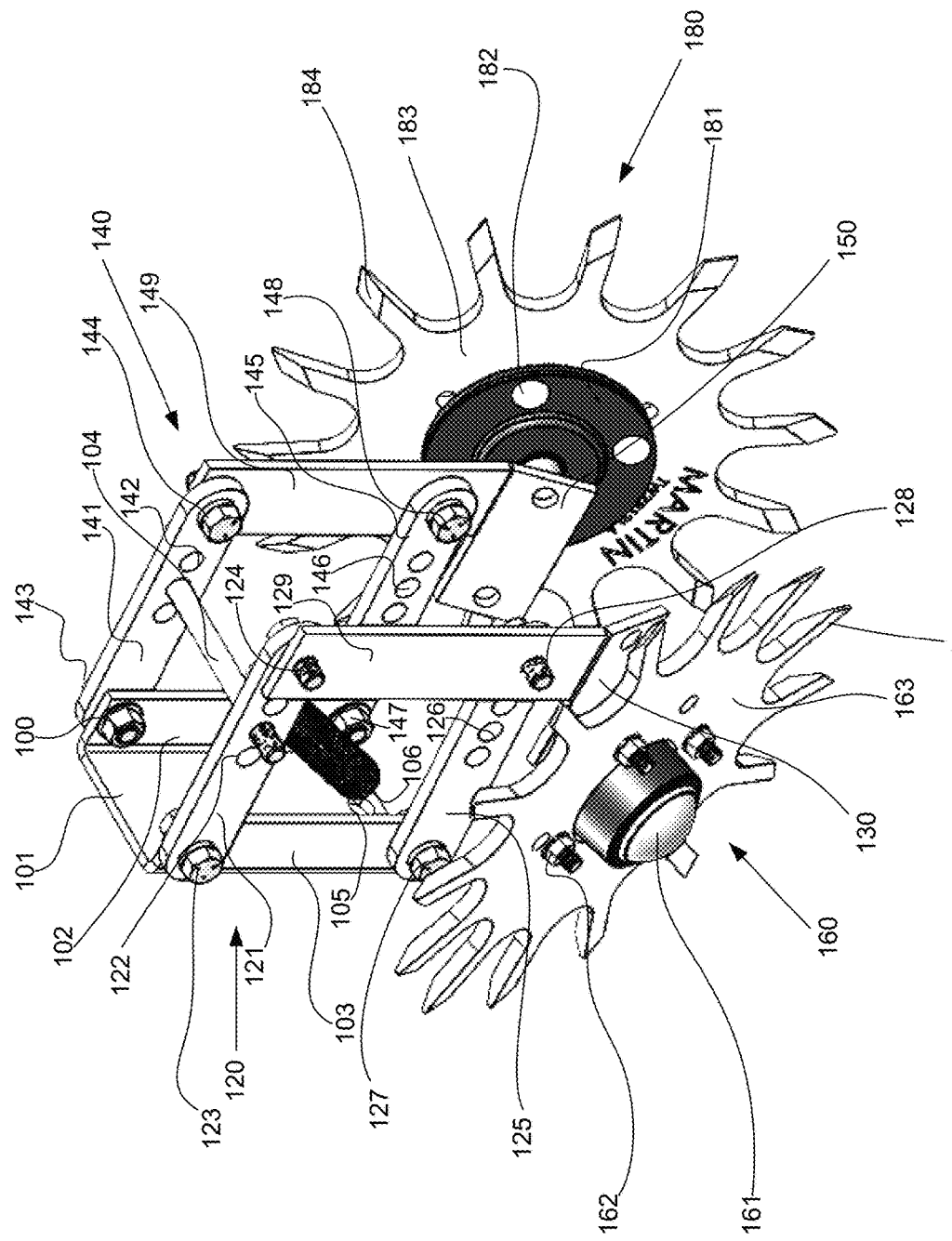
FIG. 5 provides a perspective view of a compact parallel arm row closer according to a first, spring-biased embodiment of the present invention.
Figure 7:
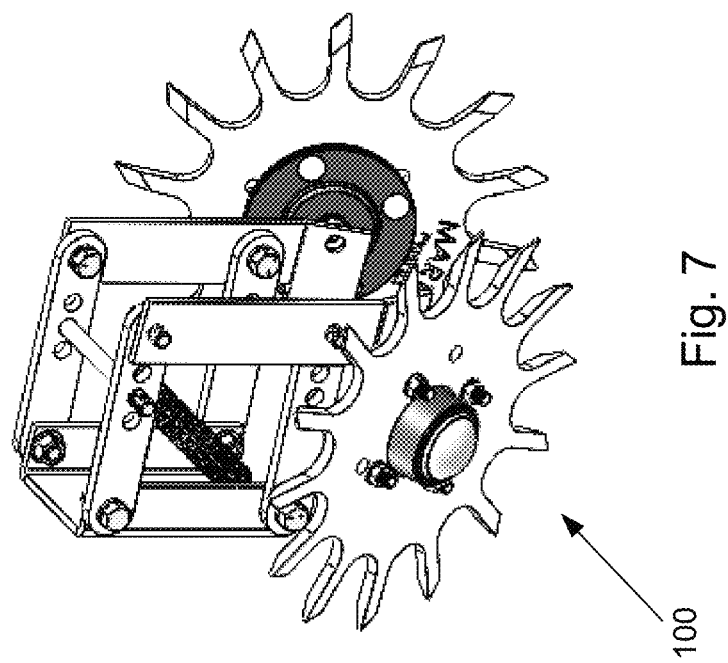
FIG. 7 provides a perspective view of a compact parallel arm row closer according to the first embodiment of the present invention.
Figure 6:
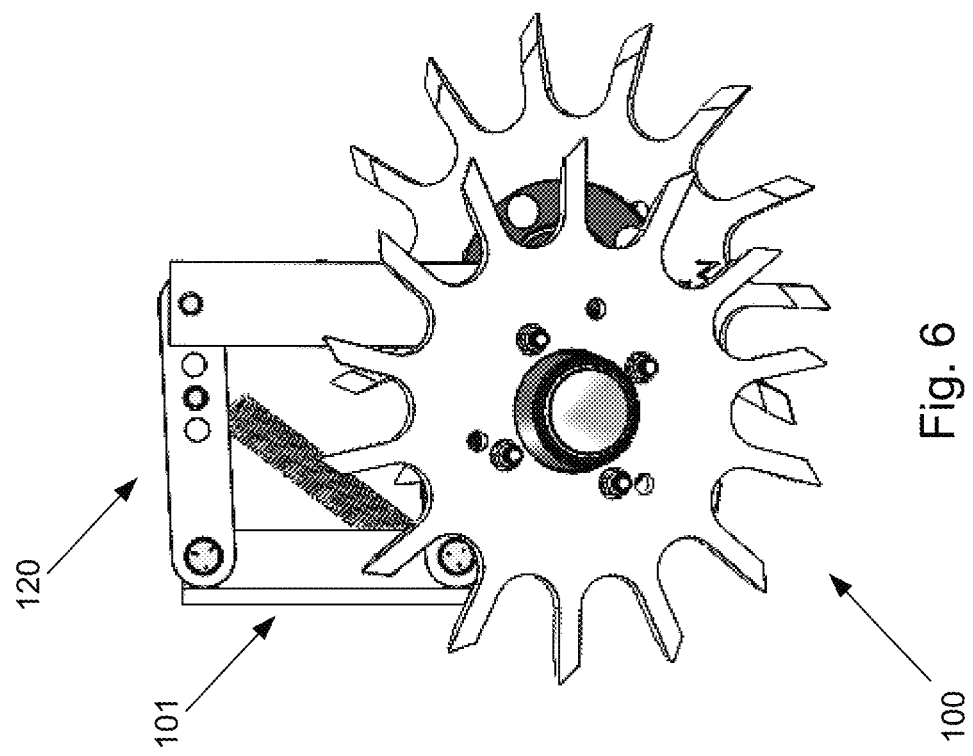
FIG. 6 provides a side view of a compact parallel arm row closer according to the first embodiment of the present invention.
Figure 9:
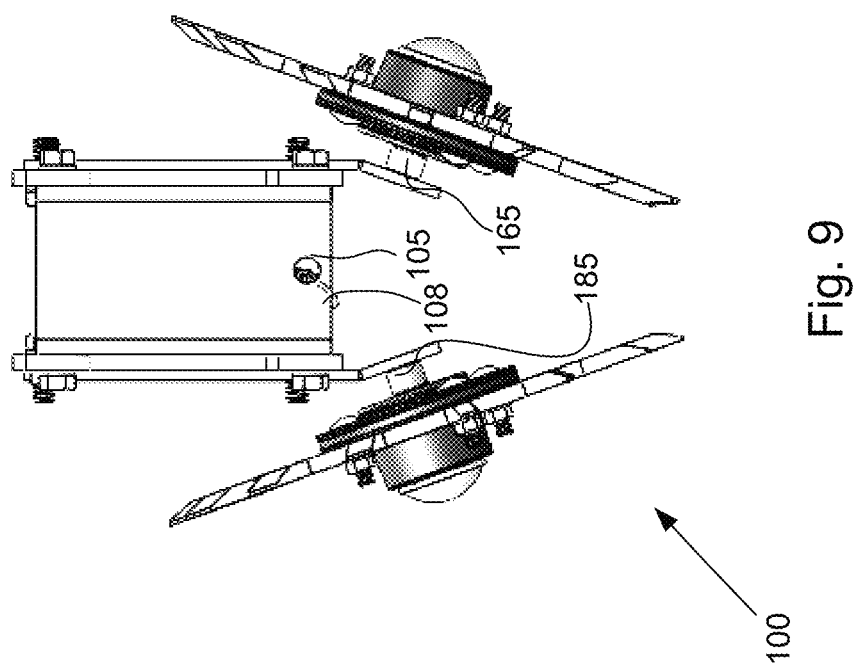
FIG. 9 provides a rear or back view of a compact parallel arm row closer according to the first embodiment of the present invention.
Figure 8:
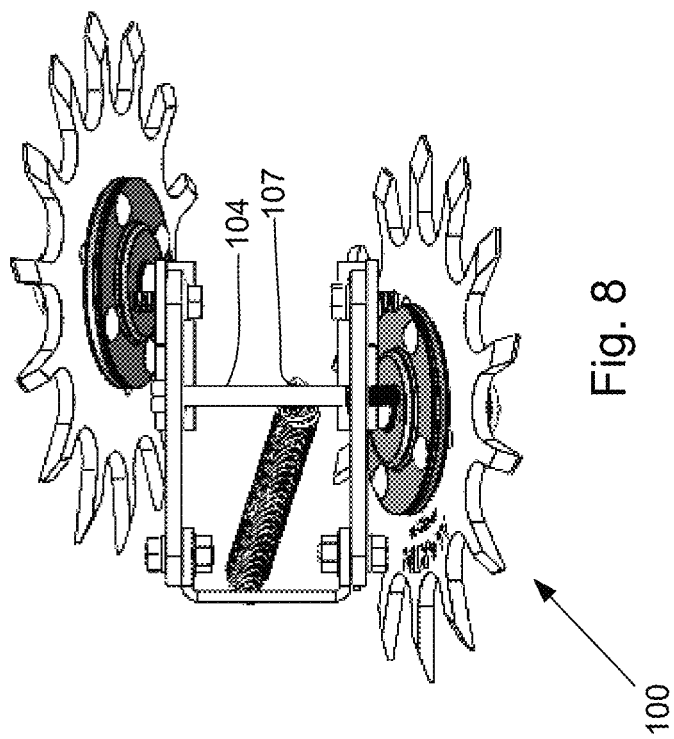
FIG. 8 provides a top view of a compact parallel arm row closer according to the first embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. The terms "row cleaner assembly" 10 and "row cleaner" may be used interchangeably when referring to generalities of configuration and/or corresponding components, aspects, features, functionality, methods and/or materials of construction, etc. thereof, whether separately employed or incorporated into a planter row unit 1, unless explicitly stated otherwise. "Row cleaner assembly 10" and "row cleaner" as used herein are not limited to any specific aspect, feature, and/or configuration thereof, and may include any row cleaner having one or more inventive feature disclosed herein unless so indicated in the following claims.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

As used herein, "fastener" may mean any suitable fastening means such as a nut and bolt, a rivet, or a pin and cotter pin. Typically, as used herein a fastener refers to a threaded bolt, which may have a hexagonal bolt head, secured by a correspondingly threaded nut having a hexagonal outer surface, wherein one or more washers may be used to permit movement of a fastened object about the bolt. In some embodiments, a locking nut may be used to further secure the nut to the bolt and to prevent the nut from backing off of the threads of the bolt.

With reference now to FIGS. 5-9, various views and illustrations of an embodiment of a compact parallel arm row closer 100 according to the present invention are provided. The compact parallel arm row closer 100 of the present invention improves over existing floating row closer and fixed row closer designs. As shown in FIG. 5, the compact parallel arm floating row closer 100 of the present invention comprises a frame mounting plate 101, parallel arm floating assemblies 120 and 140, hub frames 129 and 140, and wheel assemblies 160 and 180. The compact parallel arm floating row closer 100 improves upon the drawbacks of the fixed row closer assembly shown in FIGS. 1-4 while also providing many additional benefits.

With fixed row closers like the fixed row closer assembly of the prior art shown in FIGS. 1-4, the closer is fixed in position and does not travel or move to follow or track the terrain that the planter and assembly are moving over. Row cleaner designs, such as adjustable row cleaners as provided in U.S. Pat. No. 7,861,660, entitled ADJUSTABLE ROW CLEANER, Martin, issued Jan. 4, 2011; U.S. Pat. No. 8,794,165, entitled ADJUSTABLE ROW CLEANER, Martin, issued Aug. 5, 2014; and in U.S. Pat. No. 9,743,572, entitled ADJUSTABLE ROW CLEANER, Martin, issued Aug. 29, 2017; and such as floating row cleaners provided U.S. Pat. No. 8,631,879B1, entitled COMPACT FLOATING ROW CLEANER, Martin, issued Jan. 21, 2014; and U.S. Pat. No. 9,642,298, entitled COMPACT FLOATING ROW CLEANER, Martin, issued May 9, 2017; and U.S. Prov. Pat. App. No. 62/623,198, entitled COMPACT PARALLEL ARM ROW CLEANER, Martin et al., filed Jan. 28, 2018; each of which are incorporated by reference herein in their entirety, are similar in design to and provide some benefits compared to the fixed row closer assembly shown in FIGS. 1-4.

In some of these row cleaner systems, and in the fixed row closer assembly of the prior art shown in FIGS. 1-4, the wheels are pushed against the ground by their weight, and the frame of the row closer must be long to keep the angle of the frame at the right angle of attack. In other designs a pneumatic air cylinder may be attached to increase or decrease the pushing force of the wheels to the ground and to make the wheels more or less aggressive in engaging or digging into the ground. However, these designs change the relative angle of the cleaning wheel assemblies to the ground as they move over terrain having different elevations or height changes. Furthermore, there are at least two problems associated with existing row closer designs. First, as shown in FIGS. 1-4 they are long, and the wheels in existing designs run far behind from the planter (i.e., they extend outwards a relatively large distance from the mount attached to the planter). Second, the angle between the wheels and the ground changes when the frame swings.

With reference to FIG. 5, the compact parallel arm floating row closer 100 of the present invention is more compact than those of the prior art and can move the wheels 160 and 180 vertically, both up and down, without changing the angle between the wheels 160 and 180 and the ground. The four arms of the parallel arm floating assemblies 120 and 140 maintain the hub frames 129 and 149 in vertical and parallel to the frame mounting plate 101. In the embodiment provided in FIG. 5, the parallel arm floating assemblies 120 and 140 are secured by fasteners 123, 143, 127, and 147 to the frame mounting plate 101 and are able to move rotationally about the fastener by a bushing or bearing providing respective pivot joints or points 123, 143, 127, and 147 in cooperation with fastener/pivot joints or points 124, 128, 144, 145.

With further reference to FIG. 5, and also to FIGS. 6-9, a perspective view of a spring-biased, compact parallel arm row closer or cleaner 100 is provided. The row closer or cleaner 100 comprises a frame mounting plate 101, left arm assembly 120, right arm assembly 140, left wheel assembly 160, and right wheel assembly 180. The frame mounting plate 101, which may be mounted to the front or leading portion of a row planter for use in row cleaning operation or at the rear or trailing portion of the row planter for closing operation, comprises a right frame mount flange 102 and a left frame mount flange 103. The left arm assembly 120 is connected to the frame mounting plate 101 at the left frame mount flange 103, and the right arm assembly 140 is connected at the right frame mount flange 102. The arm assemblies 120 and 140 are able to pivot up and down about the connection points at the respective flanges 102 and 103 about left upper frame mount fastener 123, left lower frame mount fastener 127, right upper frame mount fastener 143, and right lower frame mount fasteners 147 which act as axles and pivot points for the arm assemblies 120 and 140. The left arm assembly 120 comprises a left upper arm 121 having a set of bolt openings 122, a left lower arm 125 having a set of bolt openings 126, and a left upper hub frame 129. The upper 121 and lower 125 arms maintain a parallel orientation with one another as they pivot at the connection points on the left frame mount flange 103 and this orientation is further maintained by the left upper hub frame 129. The left upper hub frame 129 stays parallel to the mounting plate 101 as it travels up and down, or is compressed and decompressed. The right arm assembly 140 comprises a right upper arm 141 having a set of bolt openings 142, a right lower arm 145 having a set of bolt openings 146, and a right upper hub frame 149. The upper 141 and lower 145 arms maintain a parallel orientation with one another as they pivot at the connection points on the right frame mount flange 102 and this orientation is further maintained by the right upper hub frame 149. The right upper hub frame 149 stays parallel to the mounting plate 101 as it travels up and down, or is compressed and decompressed. The left upper 124 and lower 128 hub frame fasteners secure the respective upper 121 and lower 125 arms to the left upper hub frame 129, and the right upper 144 and right lower 148 hub frame fasteners secure the respective right upper 141 and right lower 145 arms to the right upper hub frame 149. A laterally extending spring support arm or rod, e.g., connecting bolt 104, provides an anchor or support for the upper hook 107 of the tension spring 106 (see also FIG. 8). The frame plate 101 has an opening 105 to which the lower hook 108 of tension or bias spring 106 may be passed through and secured (see also FIG. 9). The connecting bolt 104 may be positioned at any of the corresponding upper bolt holes 122 and 142 or lower bolt holes 126 and 145 to provide for the desired spring tension. By moving the connecting bolt 104 the spring tension on the tension spring 106 may be changed to best suit the terrain, planter, and other conditions to provide for the desired ground pressure and soil engagement of the wheel assemblies 160 and 180.

There are two wheel assemblies 160 and 180, but in some configurations only one wheel may be used. The left wheel assembly 160 comprises a hub 161 disposed on the left lower hub plate 130 and which spins about an axle 165 (shown in FIG. 9), and a wheel 163 comprising wheel tines 164 and secured to the hub 161 by a set of fasteners 162. The right wheel assembly 180 comprises a hub 181 disposed on the right lower hub plate 150 and which spins about an axle 185 (shown in FIG. 9), and a wheel 183 comprising wheel tines 184 and secured to the hub 181 by a set of fasteners 182. The spaded closing wheels 163 and 183 are shown positioned offset with respect to one another, but in some applications, it may be desired to place them directly opposite one another in either a front or rear configuration. In the alternative, row cleaner wheels and coulter or tilling tool may be shown to illustrate the invention in connection with a row cleaning operation. Here, the hub plates 130 and 150 may have a plurality of mounting points for the hubs 161 and 181 and are shown in the closer 100 has having a front and rear mounting point each.

The efficient and effective design of the closer or cleaner 100 provides for a range of adjustment and configuration for closing or cleaner wheels. The connecting bolt 104 may be positioned in a number of locations as defined by the bolt holes 122, 142, 126, and 146 to provide for different levels and directions of spring tension on the left 120 and right 140 parallel arm assemblies. Additionally, the hub assemblies 160 and 180 may be positioned in one of a set of mounting locations to provide for different types and angles of row closing action. The parallel arm assemblies 120 and 140 are able to pivot up and down relative to the frame mounting plate 101 while keeping the hub frames 129 and 149 parallel to the frame mounting plate 101. This provides for a constant relative geometry for the hub assemblies 160 and 180 while providing for vertical movement as a planter traverses uneven terrain in a planting row.

Figure 10:
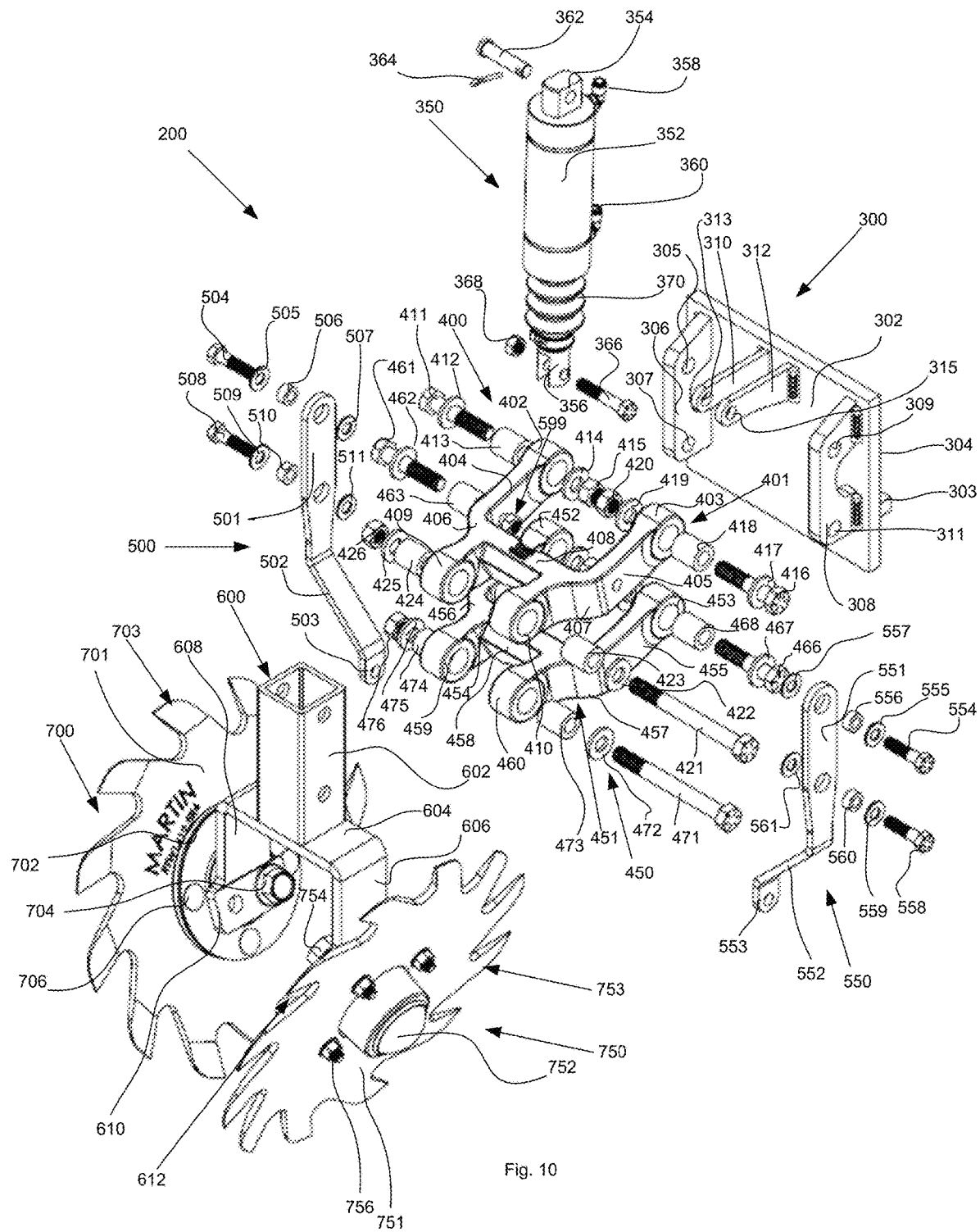
FIG. 10 provides a perspective exploded view of a frame mounting plate, parallel arm assemblies, stem assembly, and wheel assemblies for a compact parallel arm row closer according to a second, piston-driven embodiment of the present invention.

With reference now to FIG. 10, a perspective exploded view of a compact parallel arm row closer or cleaner 200 according to an embodiment of the present invention is provided. In this view, the orientation of the parallel arm floating assemblies 400 and 450 with respect to the frame mounting plate assembly 300 and the stem assembly 600 can be seen. The stem assembly 600 is positioned out a short distance from the frame mounting plate 300 by the parallel arm floating assemblies 400 and 450 and is permitted to move up and down vertically with respect to the ground by the parallel arm floating assemblies 400 and 450 while maintaining a generally parallel orientation with respect to the frame mounting plate 300 and perpendicular orientation with respect to the ground. In this manner the wheels 701 and 751 likewise move up and down vertically and the relative angular orientation of the wheels remains constant relative to the ground. In this way the intermeshing or interlinking of the wheels may be maintained so as to allow a user to arrive at a preferred setup position for most effective closing (or clearing) operation. The relative angle of elements of the parallel arm floating assemblies 400 and 450 change with respect to the frame mounting plate 300 and stem assembly 600, but the stem assembly 600 and frame mounting plate 300 maintain a substantially parallel relative orientation.

The frame mounting plate 300 has a mounting plate front 302 and mounting plate rear 304 which may have a rear flange 303. Disposed on the mounting plate front 302 are the left arm mount flange 306 having an upper mounting point 305 and lower mounting point 307, a right arm mount flange 308 having an upper mounting point 309 and lower mounting point 311, a left piston mount flange 310 having a distal end mounting point 313, and a right piston flange 312 having a distal end mounting point 315. The flanges 306 and 308 and respective mounting points are used to secure elements of the parallel arm floating assemblies 400 and 450 to the frame mounting plate 300 by fasteners such as bolts with nuts and bushings or bearings, or retaining pints with cotter pins. The frame mounting plate 300 may be secured to a planter or other device by one or more mounting points on the rear 304 or rear flange 303. The number and position of these mounting points will depend on the type of device or apparatus onto which the frame mounting plate 300 will be secured and the provided exemplary embodiment is not limiting on the invention.

The parallel arm floating assemblies 400 and 450, adjustable piston assembly 350, left piston arm assembly 500, and right arm assembly 550 provide for the vertical movement of the stem assembly 600 and wheel assemblies 700 and 750 with respect to the frame mounting plate 300. The adjustable piston assembly 350 has a piston arm and arm cover 370 with piston lower mount 356 and is secured by a piston lower fastener 366 and nut 368 to the piston arm assemblies 500 and 550. The piston 350 has a piston upper lug 354 which may receive the upper retaining pin 362 with cotter pin 364 to secure the top of the piston 350 to the piston mount flanges 310 and 312 of the frame mounting plate 300. The piston 350 may have a body 352 which may be filled with a pneumatic or hydraulic fluid and may be a pneumatic type piston such as a MARTIN SMARTCLEAN pneumatic piston, and also have an upper fluid port 358 and a lower fluid port 360, but may also be a suitable hydraulic or other piston type. These may be controlled by a system such as is described in U.S. patent application Ser. No. 15/690,269, entitled WIRELESS CONTROL SYSTEM FOR FLOATING ROW CLEANER, Martin, filed Aug. 29, 2017, which is incorporated by reference herein in its entirety.

The piston assembly 350 is disposed between the upper parallel arm assembly 400 and the lower parallel arm assembly 450 and its orientation and position are maintained by the left piston arm assembly 500 and right piston arm assembly 550. The upper parallel arm assembly 400 comprises the upper parallel arm 401 having left rear pivot 402, right rear pivot 403, left rear body member 404, right rear body member 405, left angled portion 406, right angled portion 407, middle body connecting member 408, left front pivot 409 and right front pivot 410. The upper parallel arm 401 is movably secured to the upper mounting points 305 and 309 of the respective left mounting flange 306 and right mounting flange 308 of the frame mount plate 300 such that it may rotate about the fastening means. The fastening means comprise the upper parallel arm left rear fastener 411, left rear outer washer 412, left rear spacer bearing 413, left rear inner washer 414, left rear nut 415, right rear fastener 416, right rear outer washer 417, right rear spacer bearing 418, right rear inner washer 419, and right rear nut 420. The upper parallel arm axle bolt 421, right axle bolt washer 422, right axle bolt spacer bearing 423, left axle bolt spacer bearing 424, left axle bolt washer 425, and upper parallel arm axle nut 426 secure the upper parallel arm 401 to the stem 602 of the stem assembly 600 such that the stem assembly 600 may move vertically up and down as the piston assembly 350 is compressed and decompressed. The lower parallel arm assembly 450 comprises the lower parallel arm 451 having left rear pivot 452, right rear pivot 453, left rear body member 454, right rear body member 455, left angled portion 456, right angled portion 457, middle body connecting member 458, left front pivot 459 and right front pivot 460. The lower parallel arm 451 is movably secured to the lower mounting points 307 and 311 of the respective left mounting flange 306 and right mounting flange 308 of the frame mount plate 300 such that it may rotate about the fastening means. The fasting means comprise the lower parallel arm lower rear fastener 461, left rear outer washer 462, left rear spacer bearing 463, left rear inner washer 464, left rear nut 465, right rear fastener 466, right rear outer washer 467, right rear spacer bearing 468, right rear inner washer 469, and right rear nut 470. The lower parallel arm axle bolt 471, right axle bolt washer 472, right axle bolt spacer bearing 473, left axle bolt spacer bearing 474, left axle bolt washer 475, and lower parallel arm axle nut 476 secure the lower parallel arm 451 to the stem 602 of the stem assembly 600 such that the stem assembly 600 may move vertically up and down as the piston assembly 350 is compressed and decompressed.

The upper 400 and lower 450 parallel arm assemblies are generally "U" or horseshoe shaped such that the piston may be disposed between the left (404 and 454) and right (405 and 455) rear body members of the parallel arm assemblies 400 and 450. The left piston arm assembly 500 and right piston arm assembly 550 secure the piston arm 370 to the parallel arm assemblies 400 and 450. This provides for a force to be exerted or absorbed by the piston assembly 350 on the wheel assemblies 700 and 750 as translated through the stem assembly 600 and parallel arm assemblies 400 and 450. The stem assembly 600 is disposed between the left (409 and 459) and right (410 and 460) front pivots of the upper 400 and lower 450 parallel arm assemblies and rides on the upper 421 and lower 471 axle bolts.

The left piston arm assembly 500 comprises a left piston arm upper body portion 501, left piston arm angled portion 502, and left piston arm lower portion 503, and the right piston arm assembly 550 comprises a right piston arm upper body portion 551, right piston arm angled portion 552, and right piston arm lower portion 553. The piston assembly 350, specifically the piston body 352, is secured to the left piston flange 310 and right piston flange 320 of the frame mounting plate 300 at the piston upper lug 354 by the piston upper retaining pin 362, and at the bottom by the piston lower fastener 356 to at the left piston arm lower portion 503 and right piston arm lower portion 553 of the respective left piston arm 500 and right piston arm 550. The left piston arm assembly 500 and right piston arm assembly 550 are secured to the respective upper parallel arm 401 and lower parallel arm 451 by fastening means at about the middle of the rear body members, and before the angled portion, of each of the parallel arm assemblies. The fastening means comprises left upper fastener 504, left upper outer washer 505, left upper spacer bearing 506, left upper inner washer 507, left lower fastener 508, left lower outer washer 509, left lower spacer bearing 510, left lower inner washer 511, right upper fastener 554, right upper outer washer 555, right upper spacer bearing 556, right upper inner washer 557, right lower fastener 558, right lower outer washer 559, right lower spacer bearing 560, and right lower inner washer 561 secured by piston arm nuts 599. The shape of the left 500 and right 550 piston arm assemblies provides for clearance of the upper 400 and lower 450 parallel arms while still providing for securing the piston arm assemblies 500 and 550 to the piston assembly 350.

The configuration provided in this exemplary embodiment as shown in FIG. 10 enables the piston arm 370 to extend down and retract up while keeping the piston assembly 350 in a vertical configuration. The upper parallel arm 401 and lower parallel arm 451 may rotate about their respective frame pivot openings 305, 307, 309, and 311, and are kept in a parallel orientation with respect to each other by the left piston arm assembly 500 and right piston arm 550. The stem assembly 600 also provides for the maintaining of the parallel orientation within each set of parallel arms. The angled portions 406, 407, 456 and 457 of the parallel arms 401 and 451 and the angled portions 502 and 552 of the piston arms 500 and 550 provide for the piston assembly 350 to be disposed within the "U" or horseshoe shape of the upper parallel arm assembly 400 and the lower arm assembly 450 without interfering with each assembly.

The spacer bushings, washers, and fasteners used to secure the upper 400 and lower 450 parallel arms to the frame mounting plate 300, left 500 and right 550 piston arm assemblies, and stem assembly 600 permit the stem assembly 600 to move up and down and for the upper 400 and lower 450 parallel arm assemblies to change angle with respect to the stem assembly 600 and frame mounting plate 300 as it moves without causing the stem assembly 600 to bind. Bushings used in the present invention may be replaced with bearings or other suitable means for providing for rotational movement about a fastener or pin.

The stem assembly 600 comprises a stem 602, stem upper plate 604, stem right plate 606, stem left plate 608, stem left hub plate 610, and stem right hub plate 612. The stem 602 may be made from square or round tube steel or from an other suitable material. The stem upper plate 604, stem right plate 606, stem left plate 608, stem left hub plate 610, and stem right hub plate 612 may be separate plates welded or otherwise joined together or may be formed from a pressed, stamped, or otherwise machined metal plate formed into the desired shape and welded or otherwise fastened to the stem 602. The left wheel and hub assembly 700 comprises a left closing wheel 701 with closing wheel tines 703, left hub 702 secured by left hub nut 704, and left hub fasteners 706 to secure the left closing wheel 701 to the left hub 702. The right wheel and hub assembly 750 comprises a right closing wheel 751 with closing wheel tines 753, right hub 752 secured by right hub nut 754, and right hub fasteners 756 to secure the right closing wheel 751 to the right hub 752. The closing wheels 701 and 751 may be 13" spaded closing wheels or other suitable closing wheels as needed for the planter type, type of soil, and crop being planted. The left 610 and right 612 hub mount plates of the stem assembly 600 may comprise multiple mounting points such that the left 700 and right 750 wheel and hub assemblies may be installed in an offset or directly opposing configuring.

Figure 11:
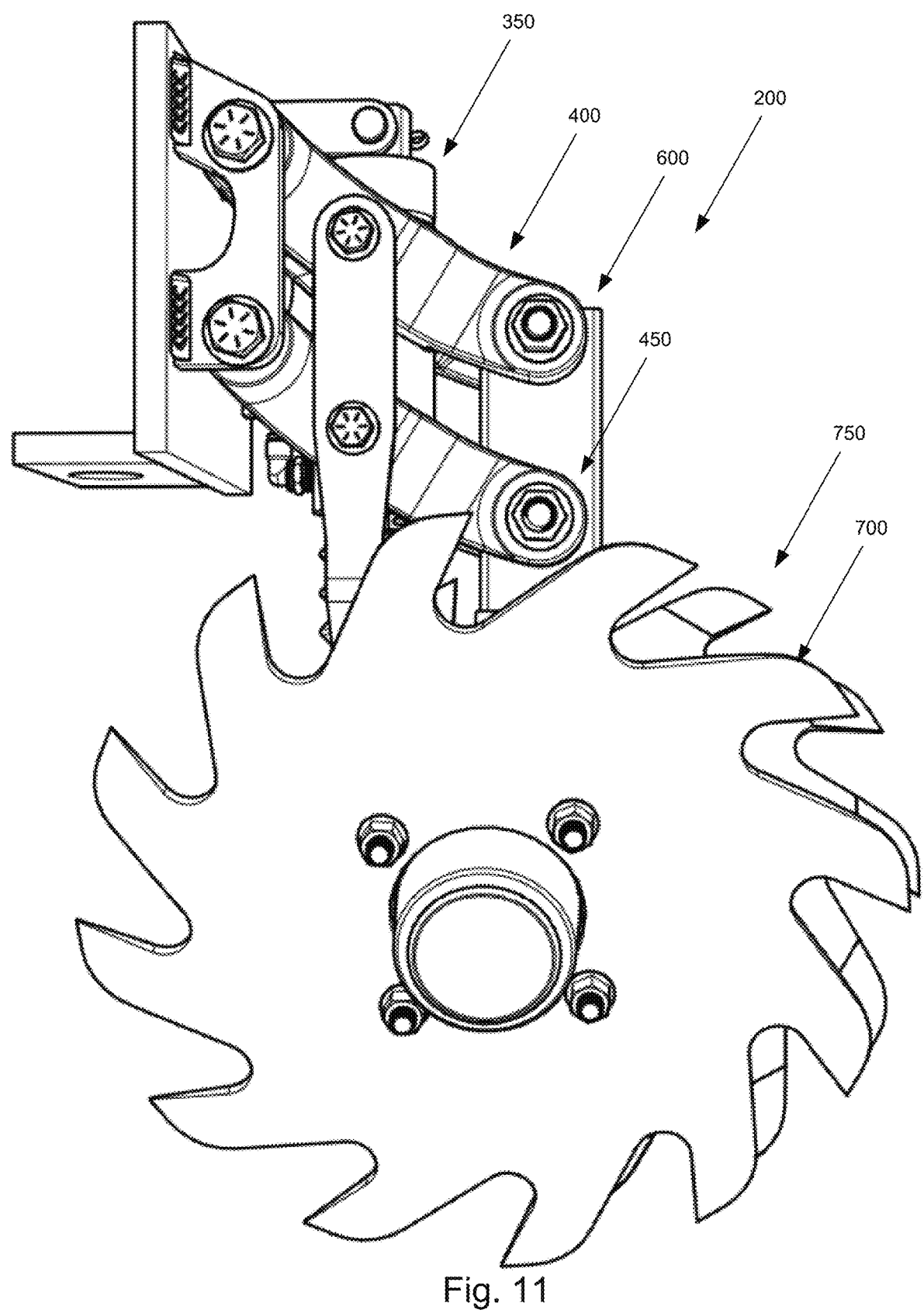
FIG. 11 provides a side view of a compact parallel arm row closer with the wheel assemblies, stem assembly, and parallel arm assemblies in a lowered or uncompressed state according to the second embodiment of the present invention.
Figure 12:
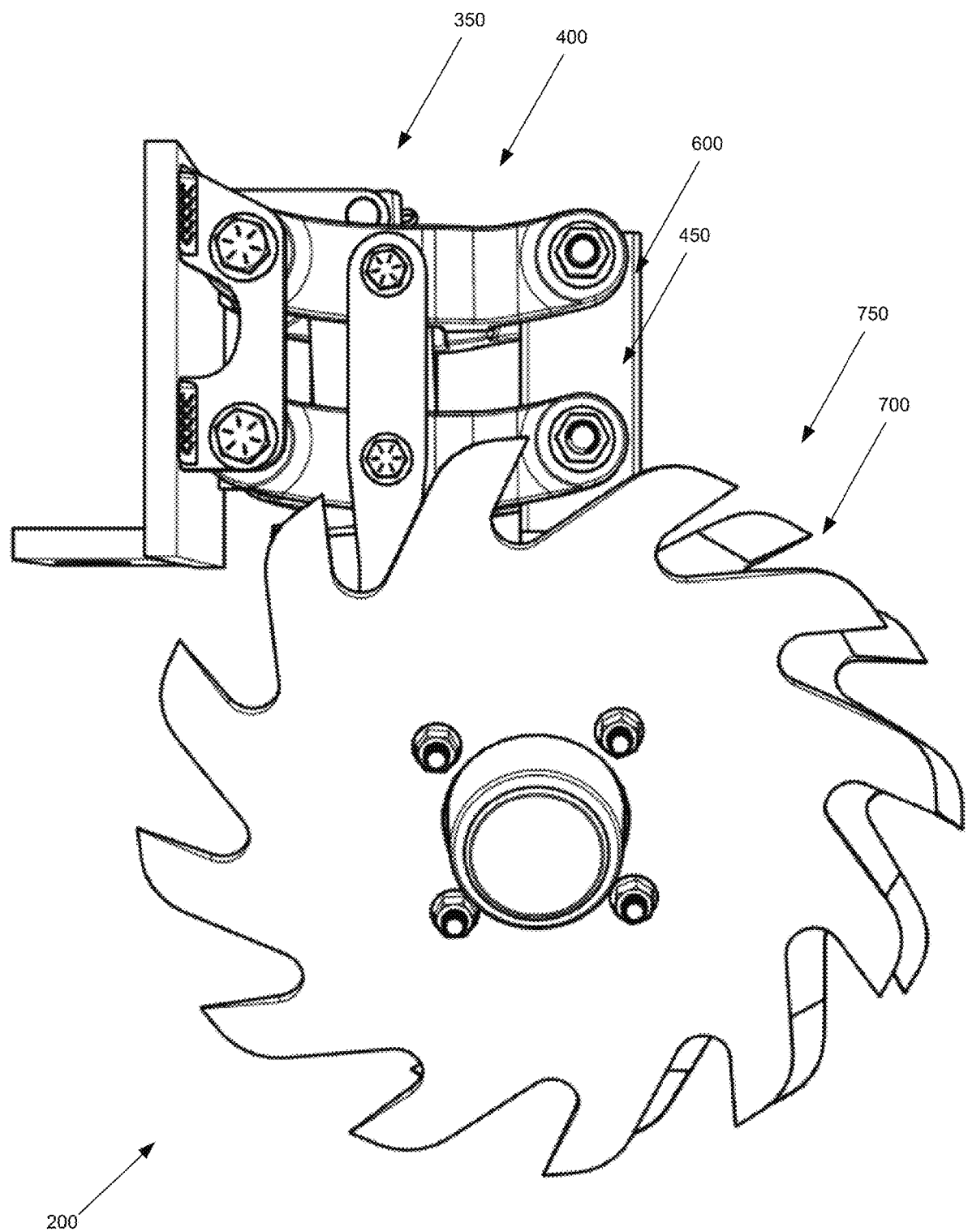
FIG. 12 provides a side view of a compact parallel arm row closer with the wheel assemblies, stem assembly, and parallel arm assemblies in a partially raised or partially compressed state according to the second embodiment of the present invention.
Figure 13:
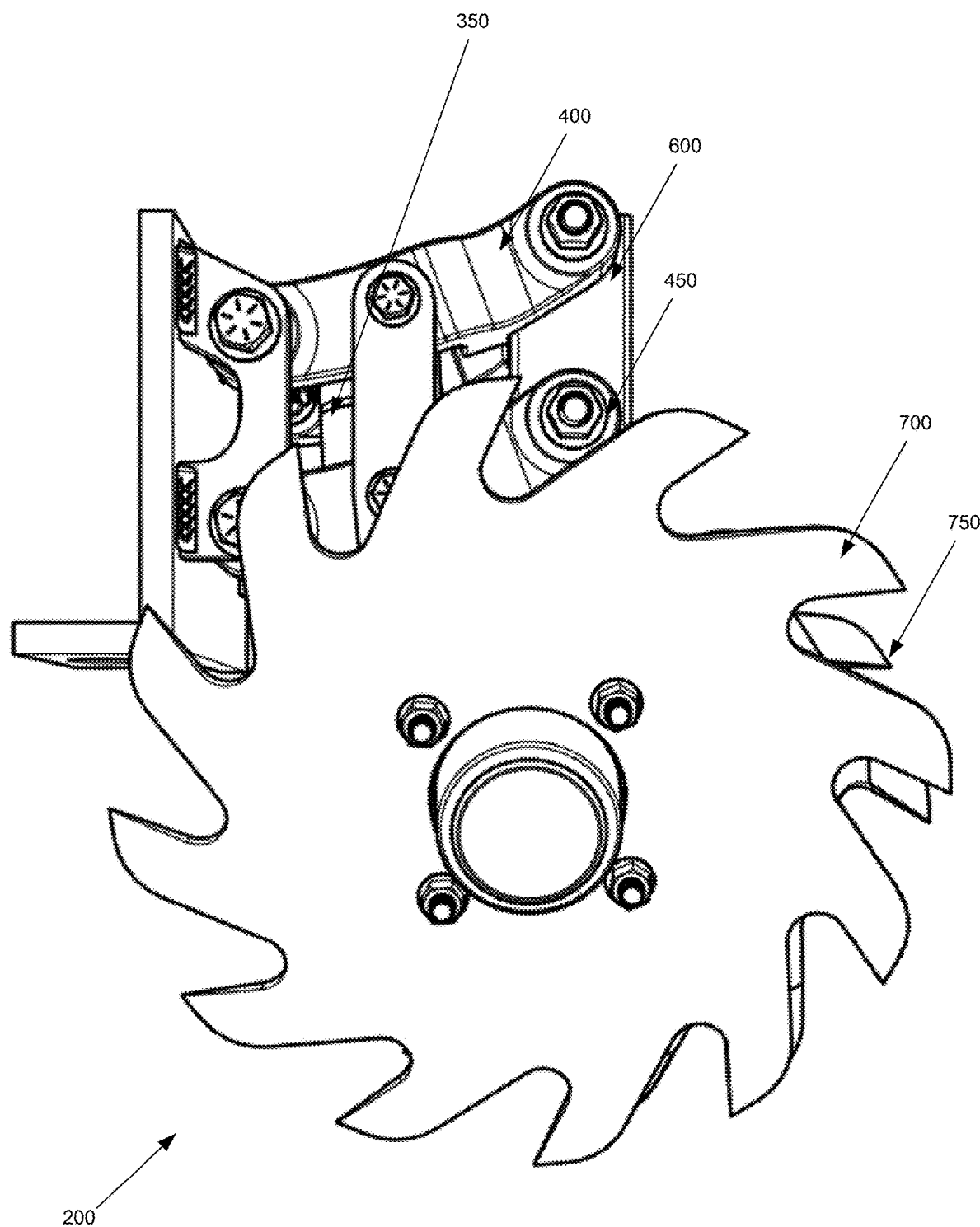
FIG. 13 provides a side view of a compact parallel arm row closer with the wheel assemblies, stem assembly, and parallel arm assemblies in a fully raised or fully compressed state according to the second embodiment of the present invention.

With reference now to FIGS. 11, 12 and 13, views of the compact parallel arm floating row closer 200 are provided. FIG. 11 provides a side view of the compact parallel arm row closer 200 with the wheel assemblies 700 and 750 and stem assembly 600, and having the parallel arm floating assemblies 400 and 450 and piston assembly 350 in a lowered or uncompressed state. FIG. 12 provides a side view of the compact parallel arm row closer 200 with the wheel assemblies 700 and 750 and stem assembly 600, and having the parallel arm floating assemblies 400 and 450 and piston assembly 350 in a partially raised or partially compressed state. It is important that the parallel arm assemblies 400 and 450 stay parallel as the stem assembly 600 travels upwards vertically and is also important that the stem assembly 600 maintain a parallel orientation with respect to the piston assembly 350 and frame mounting plate 300 so that the relative geometry of the wheel and hub assemblies 700 and 750 does not change with respect to each other or to the ground. FIG. 13 provides a side view of the compact parallel arm row closer 200 with the wheel assemblies 700 and 750 and stem assembly 600, and having the parallel arm floating assemblies 400 and 450 and piston assembly 350 in a fully raised or fully compressed state at the uppermost point of travel of each of the assemblies.

The embodiment of the compact parallel arm floating row closer 200 as provided in FIGS. 11-13 illustrates the relative movement of the elements of the frame mounting plate 300, parallel arm floating assemblies 400 and 450, piston assembly 350, and stem assembly 600 with respect to one another. The stem assembly 600 maintains a vertical orientation as it travels up and down as guided by the piston assembly 350. The parallel arm assemblies 400 and 450 change in angle relative to the other elements including the stem assembly 600, piston assembly 350, and piston arms assemblies 500 and 550, each of which maintains a relatively vertical orientation and similar relative angle over the length of travel of the piston arm 370 as it extends and retracts and the stem assembly 600 travels vertically up and down. The parallel arm assemblies 400 and 450 are stabilized by the piston arm assemblies 500 and 550, the frame mounting plate 300, and the stem assembly 600 as they rotate about the mounting points on the frame mounting plate 300 and stem assembly 600. The wheel assemblies 700 and 750 perform the row closing action for the compact parallel arm floating row closer 200 when in operation, such as when being attached to a planter or planter system 1000 as shown in FIGS. 14-18.

The vertical orientation of the piston assembly 350 provides for the parallel arm assemblies 400 and 450 to be relatively short or compact when compared prior art row closer assemblies. The angled portions of the parallel arm assemblies 400 and 450 and the piston arm assemblies 500 and 550 provide for stability and enable the piston assembly 350 to be vertically positioned while enabling the piston shaft 370 to travel over its full movement range.

Figure 14:
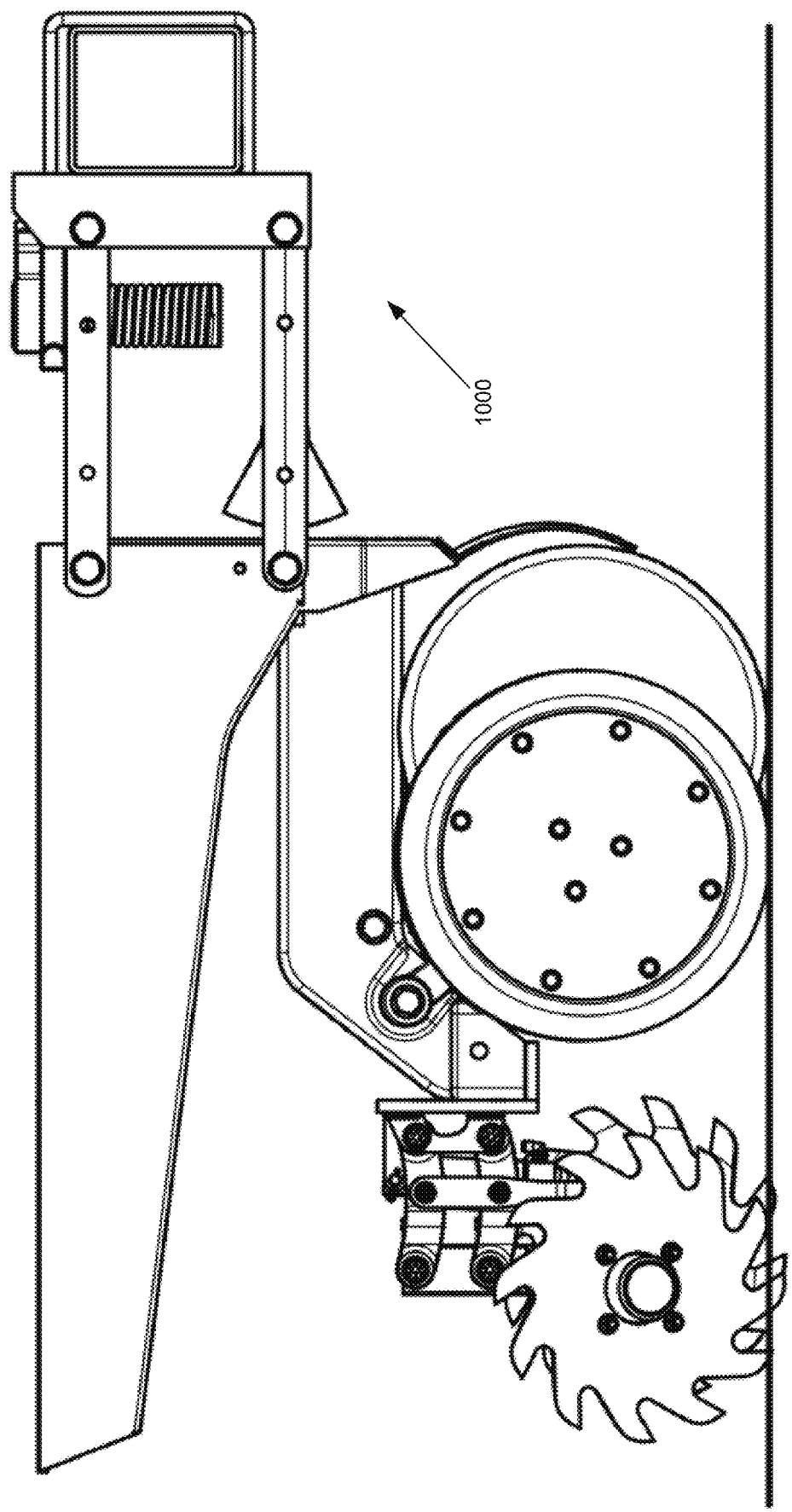
FIG. 14 provides a side view of a planter with installed compact parallel arm row closer assembly according to the second embodiment of the present invention shown in a partially raised or partially compressed state.
Figure 15:
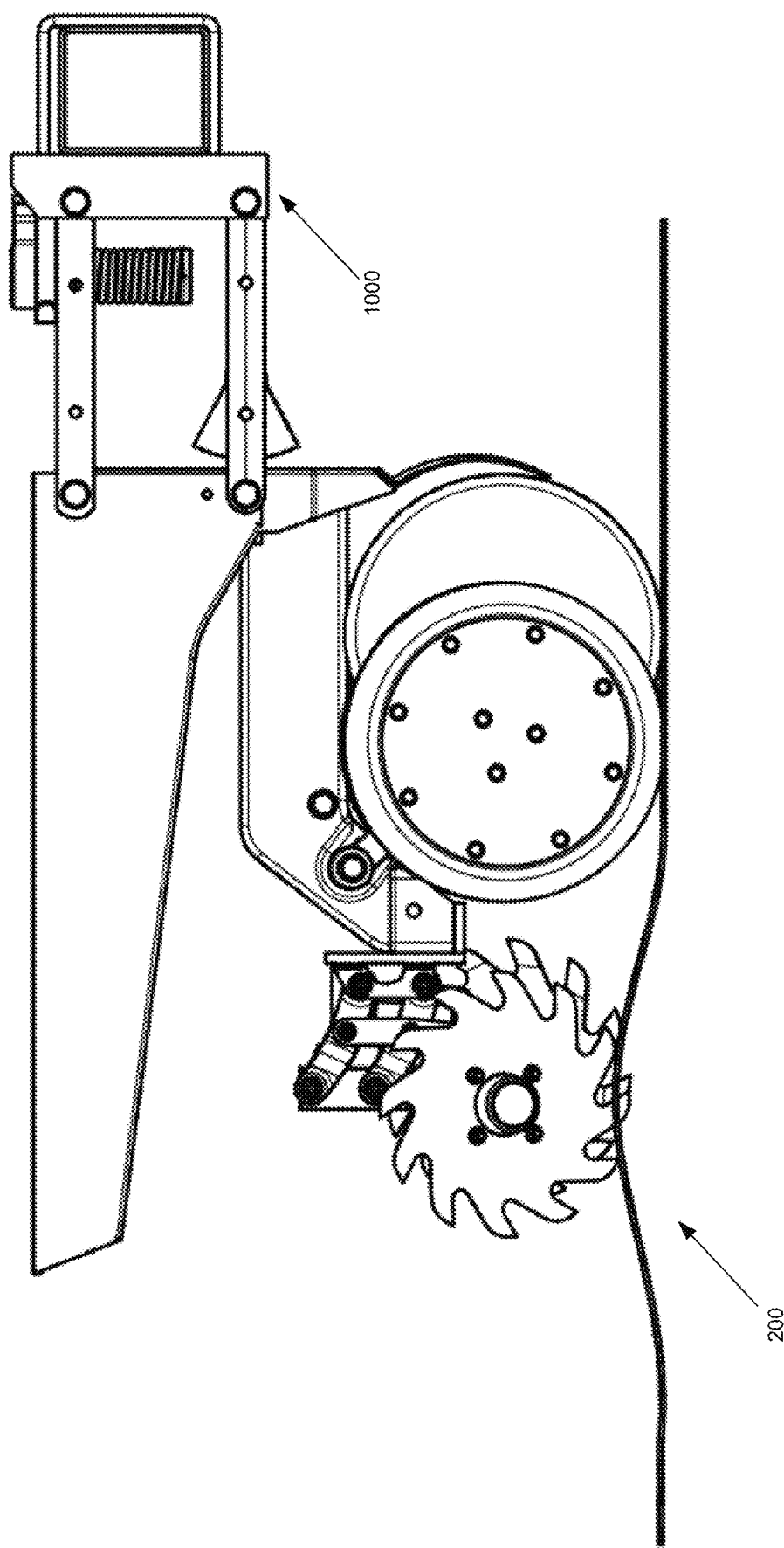
FIG. 15 provides a side view of a planter with installed compact parallel arm row closer assembly according to the second embodiment of the present invention shown in a fully raised or fully compressed state.
Figure 16:
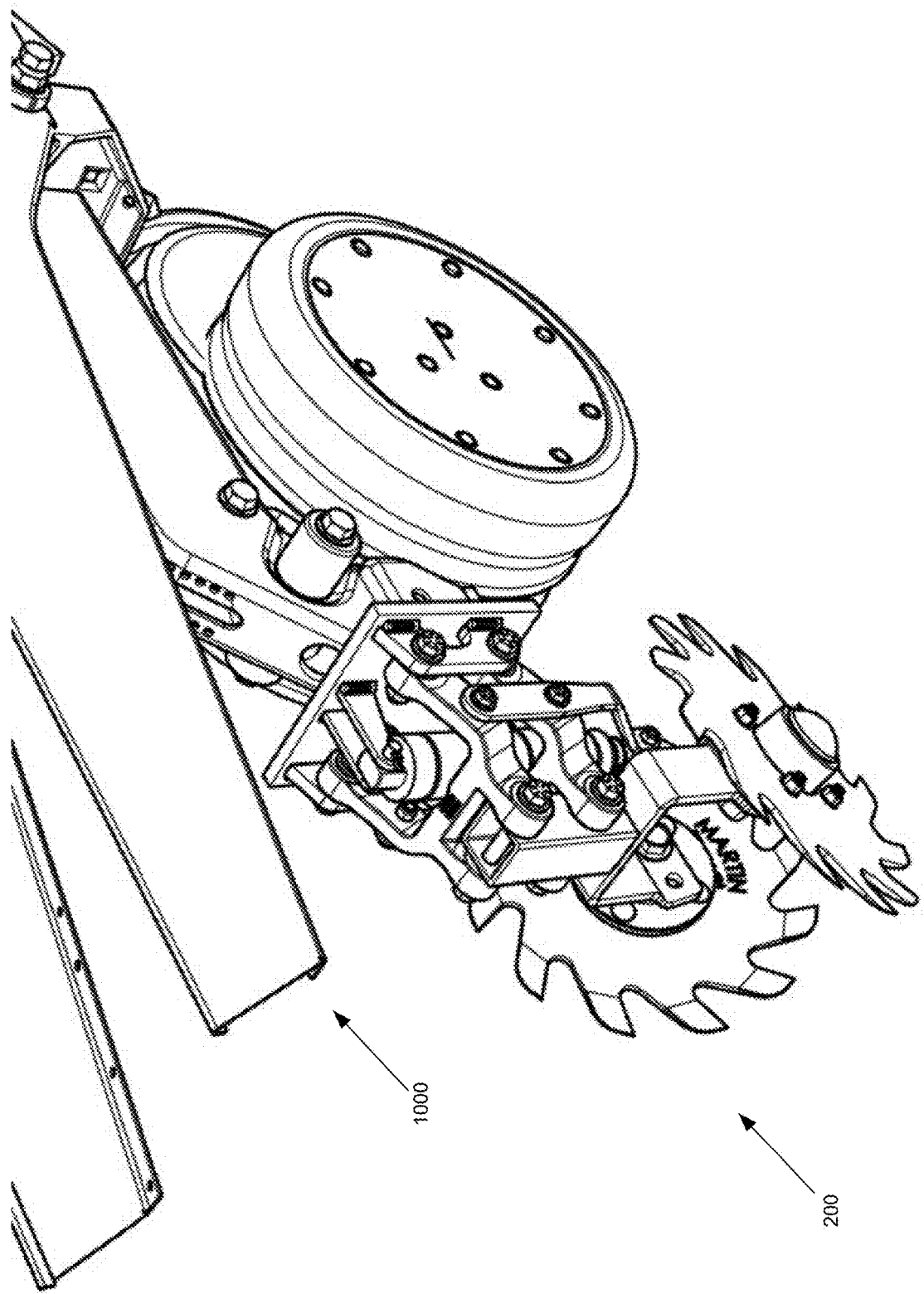
FIG. 16 provides a perspective view of a rear portion of a planter with installed compact parallel arm row closer assembly according to the second embodiment of the present invention shown in a lowered or uncompressed state.
Figure 17:
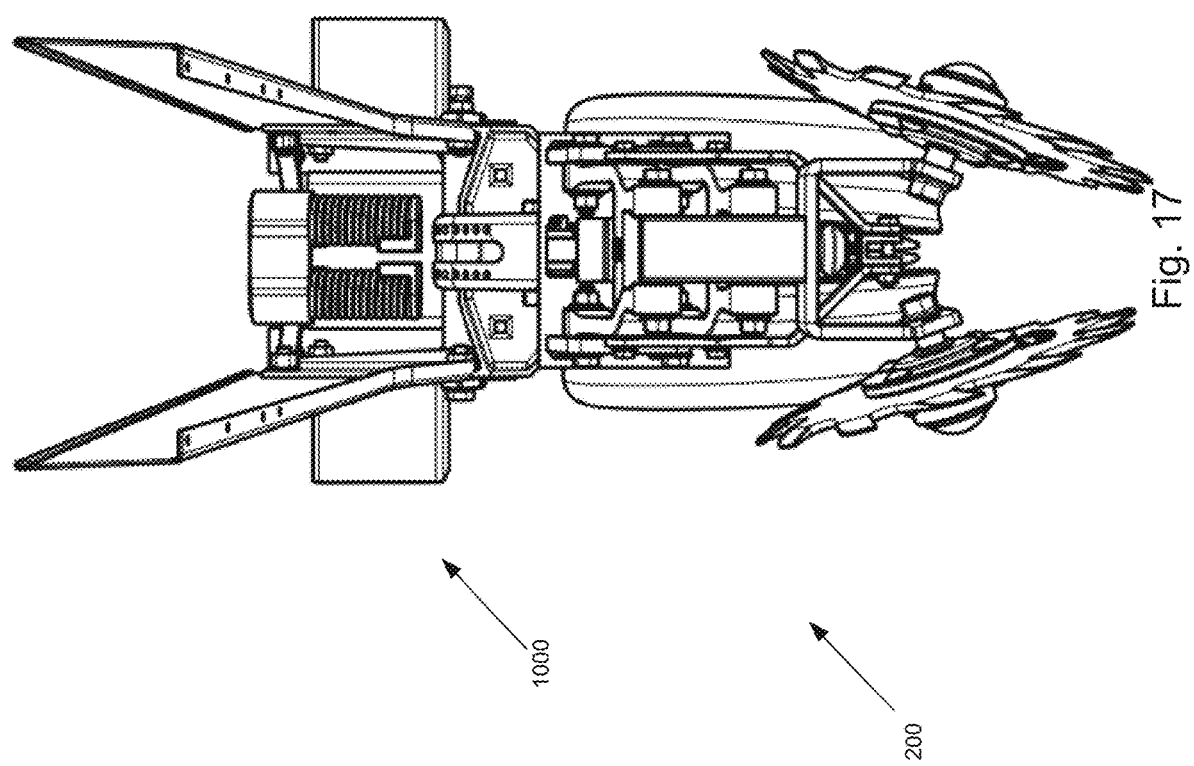
FIG. 17 provides a rear view of a planter with installed compact parallel arm row closer assembly according to the second embodiment of the present invention shown in a lowered or uncompressed state.
Figure 18:
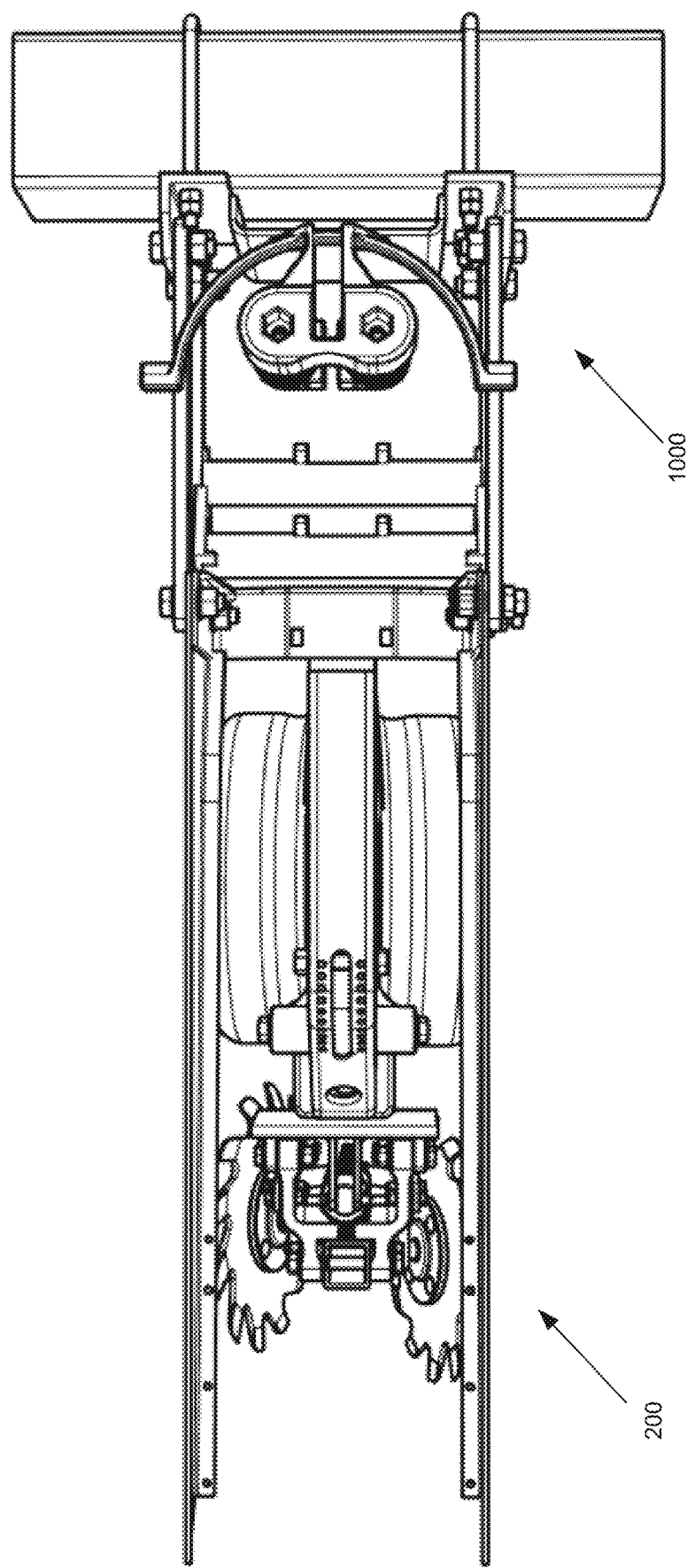
FIG. 18 provides a top view of a planter with installed compact parallel arm row closer assembly according to the second embodiment of the present invention shown in a lowered or uncompressed state.

FIG. 14 provides a side perspective view of a compact parallel arm row closer 200 in a partially raised or partially compressed state and installed on the frame of a planter 1000. FIG. 15 provides a side perspective view of a compact parallel arm row closer 200 in a fully raised or fully compressed state and installed on the frame of a planter 1000. FIG. 16 provides a perspective view of a compact parallel arm row closer 200 in a lowered or uncompressed state and installed on the frame of a planter 1000. FIG. 17 provides a front view of a compact parallel arm row closer 200 in a lowered or uncompressed state and installed on the frame of a planter 1000. FIG. 18 provides a top view of a compact parallel arm row closer 200 in a lowered or uncompressed state and installed on the frame of a planter 1000.

Figure 19:
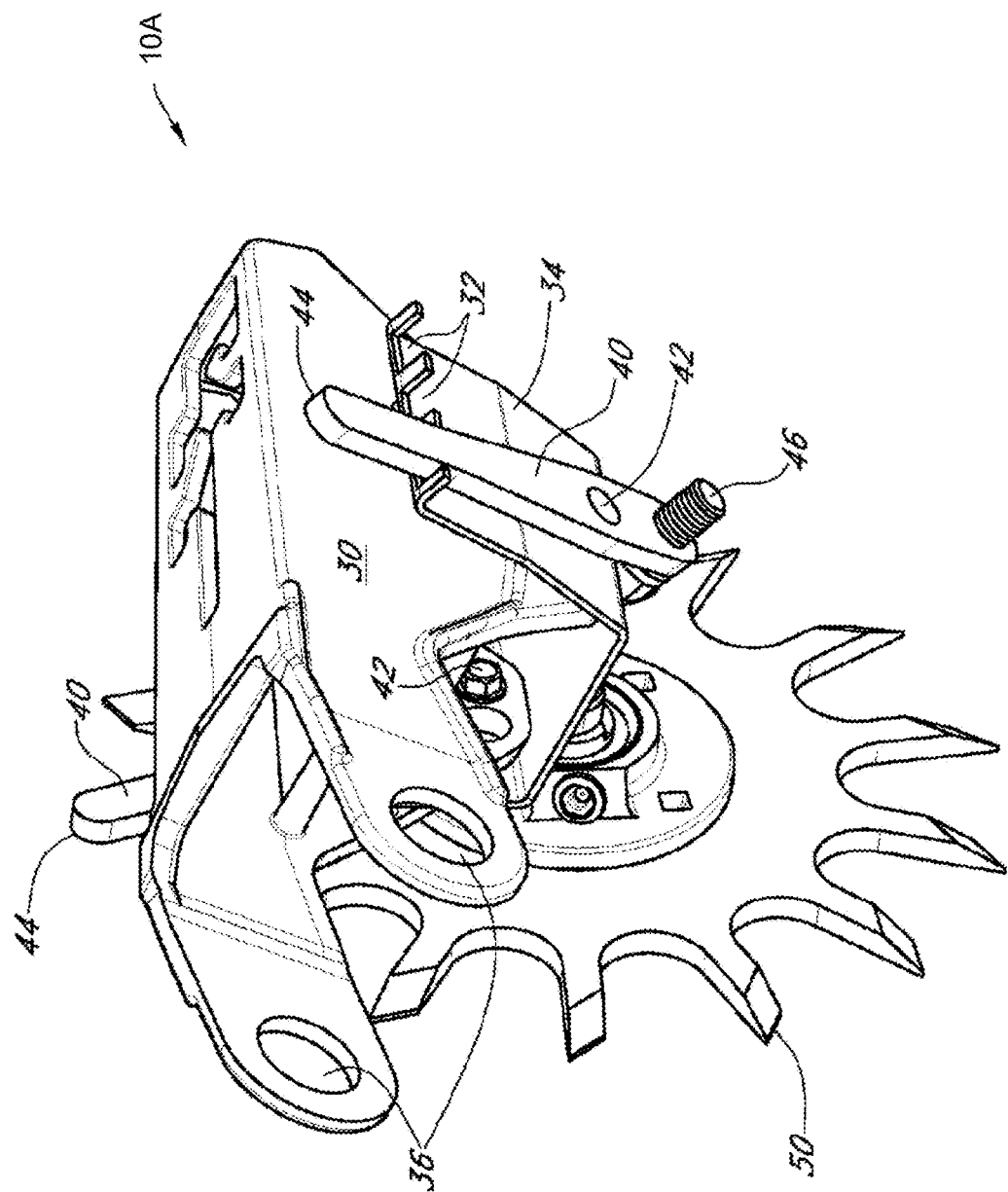
FIG. 19 provides a perspective view of a prior art closing wheel assembly with one of the closing wheels removed.
Figure 20:
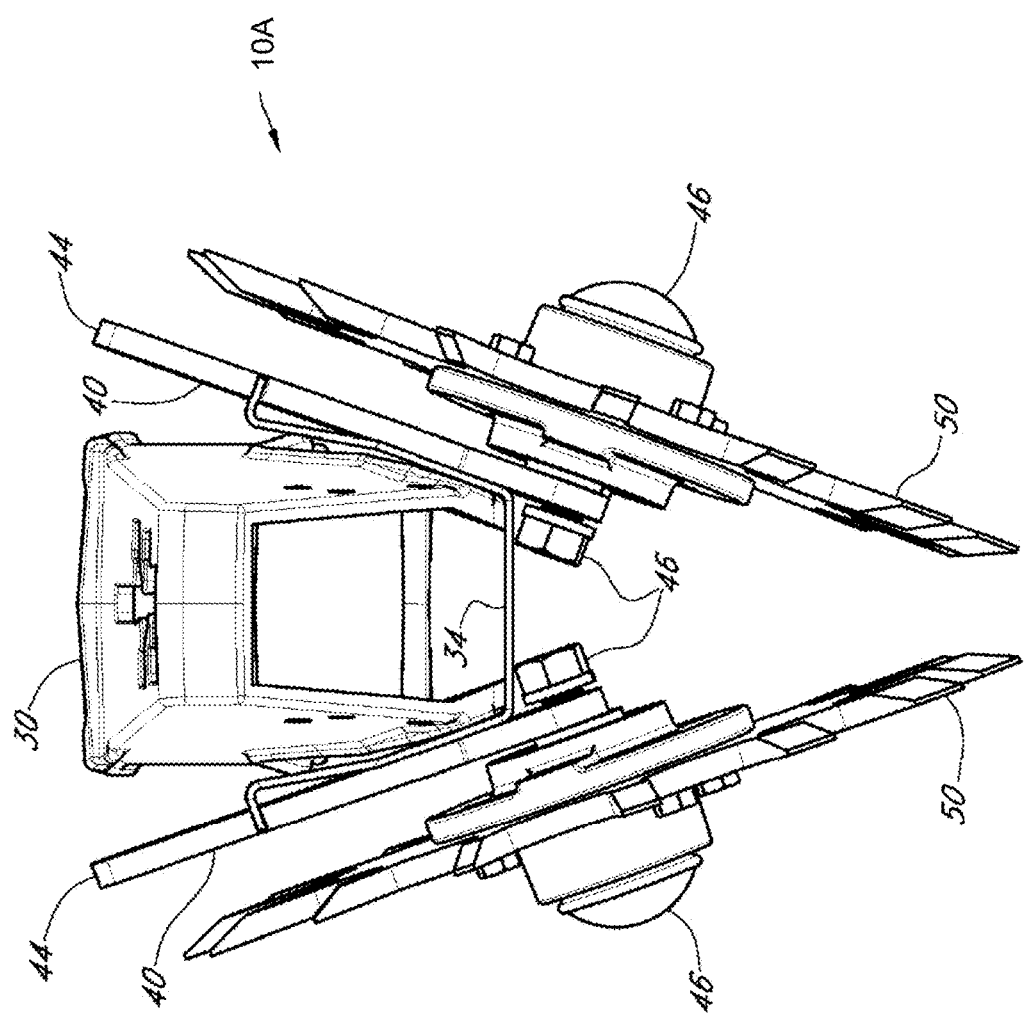
FIG. 20 provides a rear view of a prior art closing wheel assembly wherein the closing wheels are positioned at a first extreme of adjustment with the lever toward the front of the planter row unit.

Referring now to FIG. 19, a perspective view of a prior art closing wheel assembly 10A is provided. FIG. 19 provides a front perspective view of the closing wheel assembly 10A with one of the closing wheels 50 removed for clarity. In the embodiment shown in FIGS. 19-21, the closing wheel assembly 10A is adapted to be mounted upon the prior art closing wheel frame 30 disclosed in U.S. Pat. No. 5,676,073. As those practiced in the art will appreciate, the prior art closing wheel assembly 10A shown in FIG. 19 allows the operator to adjust the relative vertical position closing wheel assembly 10A (and consequently the vertical position of the closing wheels 50) with respect to the row unit frame 27, thereby adjusting the penetration depth of the closing wheels 50 into the ground surface. The apparatus designed to allow this vertical adjustment is disclosed in U.S. Pat. No. 5,676,073, which is incorporated by reference herein in its entirety. In the prior art closing wheel frame 30 is mounted to a row unit frame at the prior art closing wheel frame pivot 36. In this way, the prior art closing wheel frame 30 is pivotal with respect to the row unit frame about the prior art closing wheel frame pivot 36, which is well known to those skilled in the art.

The closing wheels 50 may be angled with respect to the horizontal and/or vertical planes. The ideal orientation of the closing wheels 50 will depend on the type of planter, the type of planter row unit 20, the type of closing wheels 50, the soil conditions, the type of seed planted, and operator preferences. In the first embodiment of the prior art closing wheel assembly shown in FIGS. 19-21, the closing wheels 50 are angled with respect to the vertical plane only, which is typical for a spiked closing wheel 50, such as that shown, in certain applications. The embodiment of the closing wheels 50 shown in FIGS. 19-21 works well in many conditions when each closing wheel 50 is angled twenty three degrees from the vertical. The angle at which the closing wheels 50 engage the ground surface when oriented as shown in FIG. 19 is substantially parallel to the furrow, but it may be orientated as depicted in FIGS. 32B and 32C, and the optimal orientation of the closing wheels 50 depend on many factors as indicated above.

Figure 32:
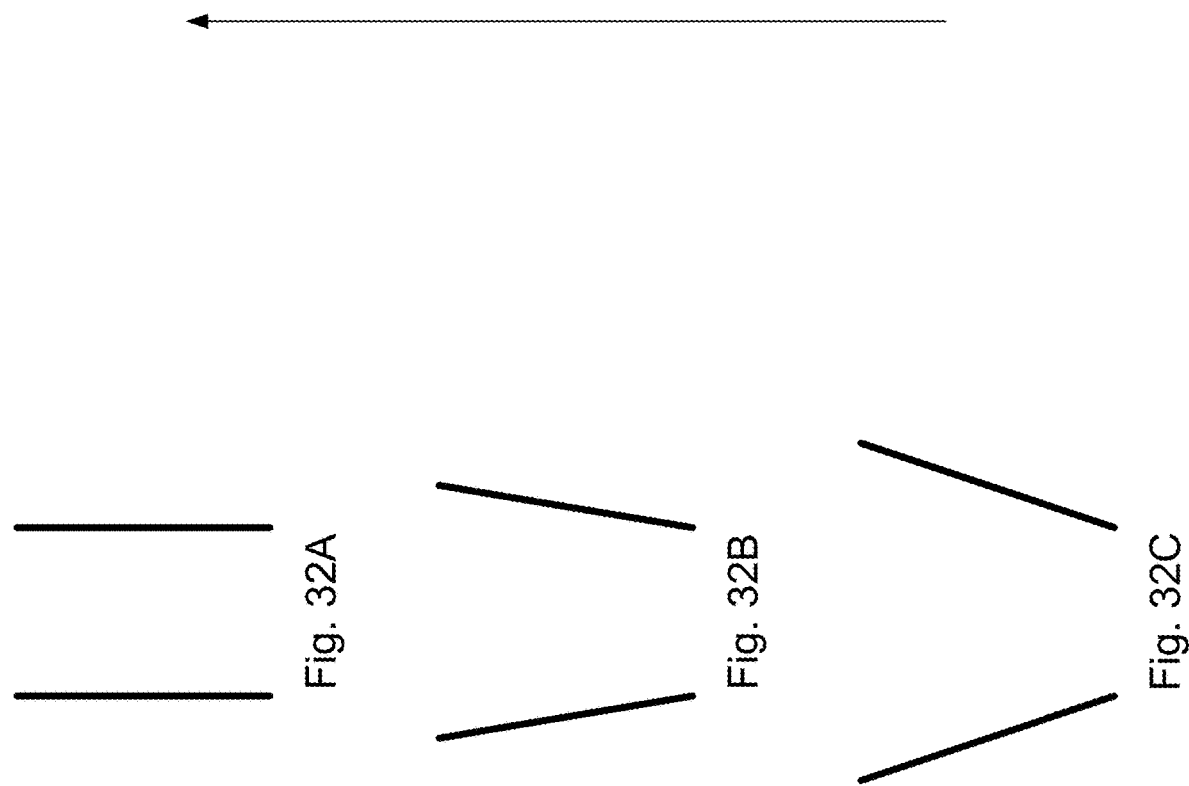
FIGS. 32A, 32B, and 32C depict the angle at which the closing wheels intersect the ground at different angles of penetration.

In FIGS. 32A-32C, the direction of travel of a planter row unit is indicated by the arrow. When the penetration depth of the closing wheels 50 is adjusted by changing the angle of the prior art closing wheel frame 30 with respect to the row unit frame about the prior art closing wheel frame pivot 36, the angle of the closing wheels 50 with respect to the furrow changes. For example, if the closing wheels 50 are angled with respect to the vertical plane, as their penetration depth is reduced, the angle at which the closing wheels 50 contact the ground surface may become more aggressive (i.e., the angle of the closing wheels 50 relative to the direction of travel may become greater), which is shown in the progression of FIGS. 32A-32C. FIG. 32A shows a typical angle at which the closing wheels 50 intersect the ground surface for certain applications, which angle corresponds to approximately one inch penetration of the closing wheels 50 into the ground surface. When the closing wheels 50 are moved from a deeper penetration setting to a lower penetration setting (i.e., pivoting the prior art closing wheel frame 30 toward the ground surface about the prior art closing wheel frame pivot 36) without making other adjustments to the orientation of the closing wheels 50, the angle at which each closing wheel 50 engages the ground surface follows the progression shown in FIGS. 32A-32C, which is exaggerated for illustrative purposes. The prior art closing wheel assembly 10A keeps the angle at which the closing wheels 50 engage the ground surface substantially constant as the penetration depth of the closing wheels 50 is varied.

In addition to the angle at which the closing wheels 50 engage the ground surface with respect to the furrow (i.e., the direction of travel), the spacing between the respective ground engagement portions of the closing wheels 50 of a pair of closing wheels 50 mounted on a single closing wheel assembly 10A affects the amount of material the closing wheels 50 move toward the furrow. As may be seen in FIG. 19, the closing wheels 50 are separated by the shortest distance at their respective bottom portions, which is the portion of the closing wheel 50 that primarily engages the ground surface. When the prior art closing wheel frame 30 is adjusted so that the closing wheels 50 penetrate the ground surface to a shallower depth (typically by moving the prior art closing wheel frame 30 away from the ground surface by pivoting the prior art closing wheel frame 30 upward about the prior art closing wheel frame pivot 36) the distance between the portions of the closing wheels 34 that engage the ground surface is increased.

Figure 21:
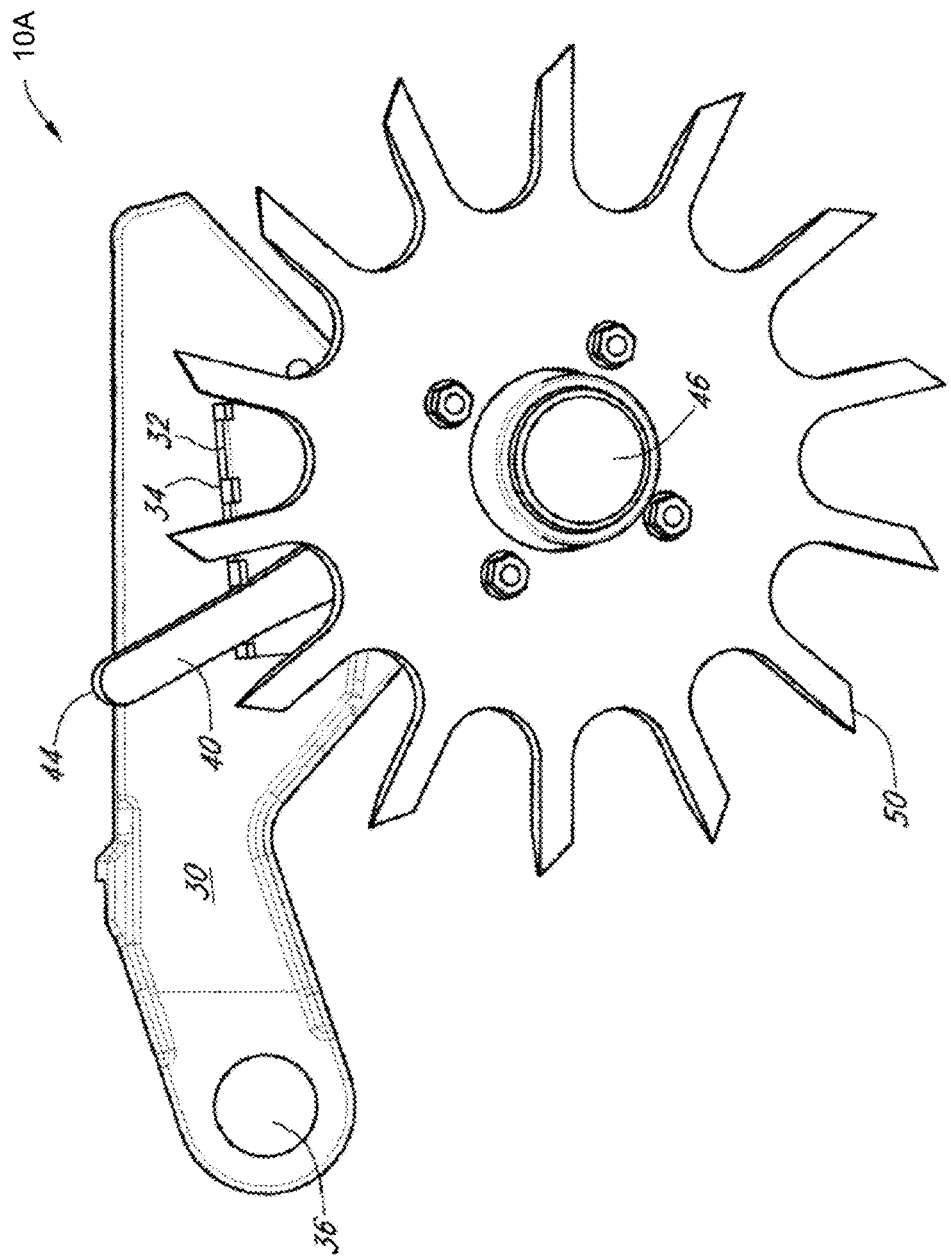
FIG. 21 provides a side view of the prior art closing wheel assembly as configured and oriented as shown in FIG. 20.

FIG. 21 the prior art closing wheel frame 30 is angled with respect to the row unit frame 27 by the same amount as shown in FIG. 19, and the levers 40 are in the same lever notches 32 in FIGS. 19 and 21. The closing wheel assembly 10A allows the operator to compensate for changes in the orientation of the closing wheels 50 with respect to the ground surface, which changes in orientation may be caused by changing the angle of the prior art closing wheel frame 30 with respect to the planter row unit. In the prior art embodiment shown in FIGS. 19-21, the closing wheel assembly 10A includes a lever notch bracket 34 that fits around a portion of the prior art closing wheel frame 30. The lever notch bracket 34 may be mechanically affixed to the prior art closing wheel frame 30. The lever notch bracket 34 is generally U-shaped as shown in the prior art frame of FIGS. 19-21. Mounted to the prior art closing wheel frame 30 and the lever notch bracket 34 are two levers 40; one on each side of the prior art closing wheel frame 30. The levers 40 are pivotally mounted to the prior art closing wheel frame 30 and lever notch bracket 34 at the lever attachment 42, which may also be a connecting point between the lever notch bracket 34 and the prior art closing wheel frame 30. Accordingly, the levers 40 are rotatable with respect to both the lever notch bracket 34 and the prior art closing wheel frame 30 about the lever attachment 42. The first end of the lever 40 forms a lever handle 44 to provide a user interface. The second end of the lever 40 provides for a position on which to mount a closing wheel 50, closing wheel mount 46. The closing wheel mount 46 may be formed as a hub that is pivotally engaged with the lever 40, or the closing wheel mount 46 may be formed as a hub that is pivotally engaged with the closing wheel 50.

The closing wheel 50 may be angled with respect to the lever 40 in the vertical and/or horizontal planes to provide for the desired orientation of the closing wheels 50 with respect to the furrow. The lever notch bracket 34 is formed with a plurality of lever notches 32 on either side thereof. The notches 32 are sized to engage and secure the lever 40 in a certain position once the operator has placed the lever in that position. That is, the notches 32 secure the position of the lever 40 once set by the operator. As the lever 40 is moved from one notch 32 to the next, the lever 40 rotates with respect to the prior art closing wheel frame 30 about the lever attachment 42. This rotation causes the orientation of the closing wheel 50 affixed to that lever 40 at the closing wheel mount 46 to change. Adjusting the orientation of the closing wheels 50 with respect to the prior art closing wheel frame 30 allows the operator to compensate for the change in orientation of the closing wheels 50 with respect to the furrow caused by adjusting the penetration depth of the closing wheels 50 when pivoting the prior art closing wheel frame 30 with respect to the row unit frame about the prior art closing wheel frame pivot 36. The spacing of the notches 32 may be configured so that the orientation difference of the closing wheel 50 when the lever 40 is moved from one notch 32 to an adjacent notch 32 compensates for the penetration depth change from one position of the closing wheel depth adjuster 38 to an adjacent position. As the angle of the prior art closing wheel frame 30 changes with respect to the ground surface, the angle at which the closing wheels 50 engage the ground surface will also change absent any compensation system (e.g., FIGS. 32A-32C). The closing wheel assembly 10A provides a compensation system that allows the operator to account for the angle change of the closing wheels 50 caused by adjusting the penetration depth thereof by changing the orientation of the closing wheels 50 with respect to the prior art closing wheel frame 30. That is, the closing wheels 50 may be adjusted independently of the prior art closing wheel frame 30 in the closing wheel assembly 10A.

Now, with reference to FIGS. 22-29, various views of improved closing wheel frame 2100 are provided. The improved closing wheel frame 2100 provides for the adjustment of the "camber", "toe-in", and/or angle of both of the closing wheels 2150 via a single lever assembly 2140 and a unified axle assembly 2170.

Figure 22:
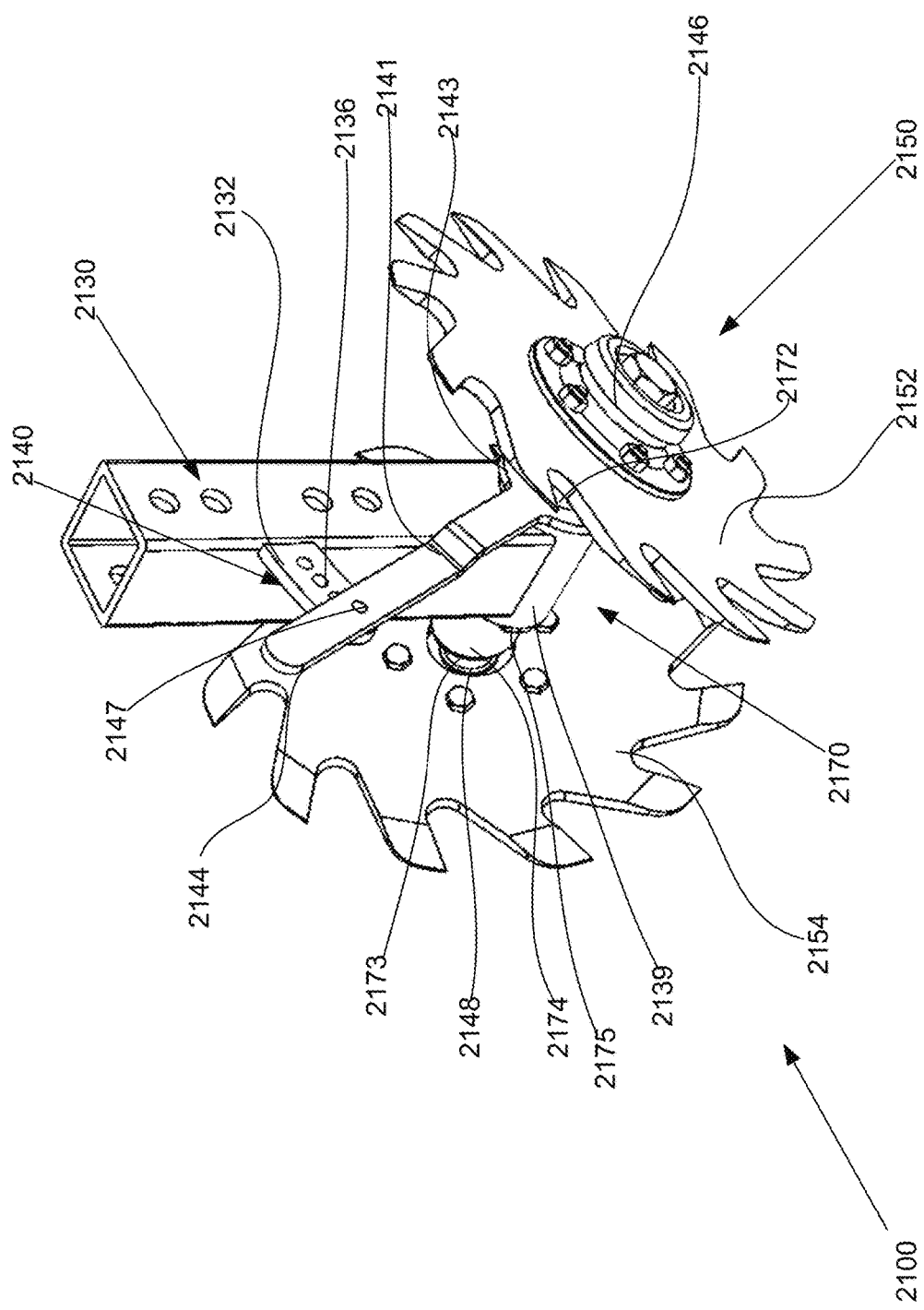
FIGS. 22-25 provide various views of an improved adjustable closing wheel assembly having a single lever assembly for adjusting the relative angle of the closing wheels on the unified axle assembly, wherein the lever is in a fully extended position and the wheels are at a neutral toe-in configuration, according to an embodiment of the present invention.

With reference to FIG. 22, a perspective view of an improved closing wheel assembly 2100 is provided. FIG. 22 provides a front perspective view of the improved closing wheel assembly 2100 comprising an adjustable closing wheel stem 2130, single lever assembly 2140, closing wheels 2150, and unified axle assembly 2170. The adjustable closing wheel stem 2130 comprises the stem 2130, the locking points arm 2132, unified axle locking points 2136, and the axle shell 2139. The unified axle assembly 2170 is a single straight axle that passes through and is supported by the axle shell 2139 which may further comprise one or more bearings, such as sleeve bearings, ball bearings, or other suitable bearings. The unified axle assembly 2170 comprises a straight, fixed axle which is a single shaft having cambered or angled ends 2172 and 2174, which may be configured and oriented to corresponding left and right sides. Closing wheels 2152 and 2154 are mounted on respective hubs 2146 and 2148, with each hub being mounted on a respective hub mount 2171 or 2173. A set of bolts and nuts or other suitable fasteners may be used to affix the closing wheels 2152/2154 on the hubs 2146 and 2148 and a single large retaining bolt may be used to secure each of hubs 2146 and 2148 to the hub mounts 2171 and 2173.

In operation, the shaft of the unified axle assembly 2170 does not rotate with the closing wheels 2150 and only moves when adjusted by the single lever assembly 2140. On each of the angled ends 2172 and 2174 are corresponding axle stubs or hub mounts 2171 and 2173 that extend outwards perpendicular to the face of each of the angled ends 2172 and 2174. The relative position of the unified axle assembly 2170 with the adjustable closing wheel stem 2130 is controlled by the single lever assembly 2140. The single lever assembly 2140 comprises the angled arm 2141, which may be angled or bent such that the arm 2141 may be moved in a direction parallel to the unified axle assembly 2170 to provide for unlocking of a pin or extension 2147 in the upper arm 2144 from the unified axle locking points 2136. The upper arm 2144 may be moved outwards to disengage the pin 2147 from the locking points 2136 to provide for the arm to pivot about the arm ring 2143 which is secured to the unified axle assembly 2170. This provides for a user to manipulate the single lever assembly 2140 to change the relative angle of the closing wheels 2150 to the adjustable closing wheel stem 2130 via the unified axle assembly 2170. In a normal configuration, wherein the single lever assembly 2140 is in a fully forward position furthest from the adjustable closing wheel stem 2130, the closing wheels 2150 and angled ends 2172/2174 with corresponding hub mounts 2171/2173 are in a positive camber position with a neutral toe-in, shown in FIGS. 22-25. Retracting the single lever assembly 2140 or moving the single lever user interface into a rearward position closest to the adjustable closing wheel frame 2130 causes the relative toe-in of the closing wheels 2150 to increase and is shown in FIGS. 26-29.

Figure 29:
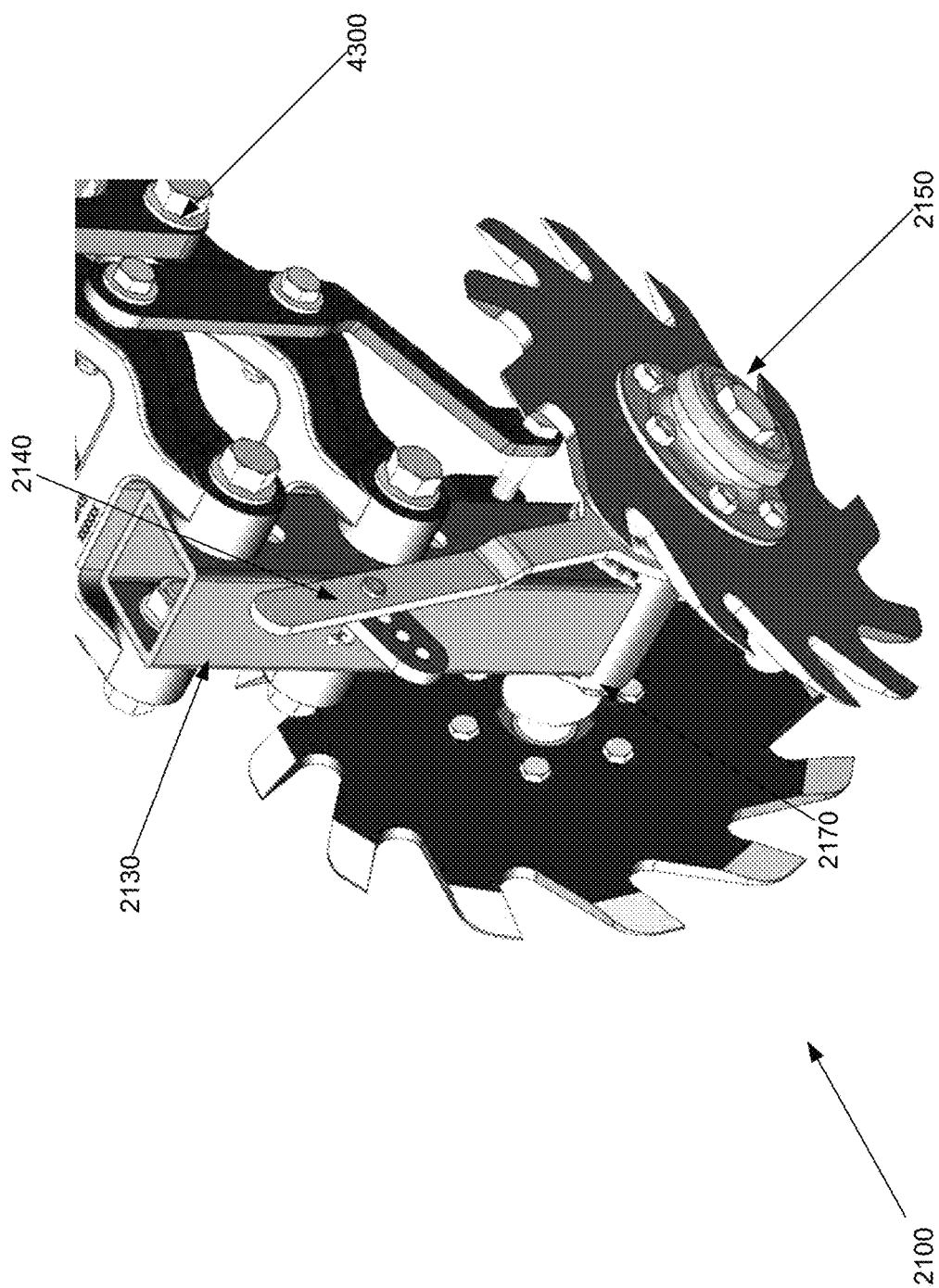
Figure 30:
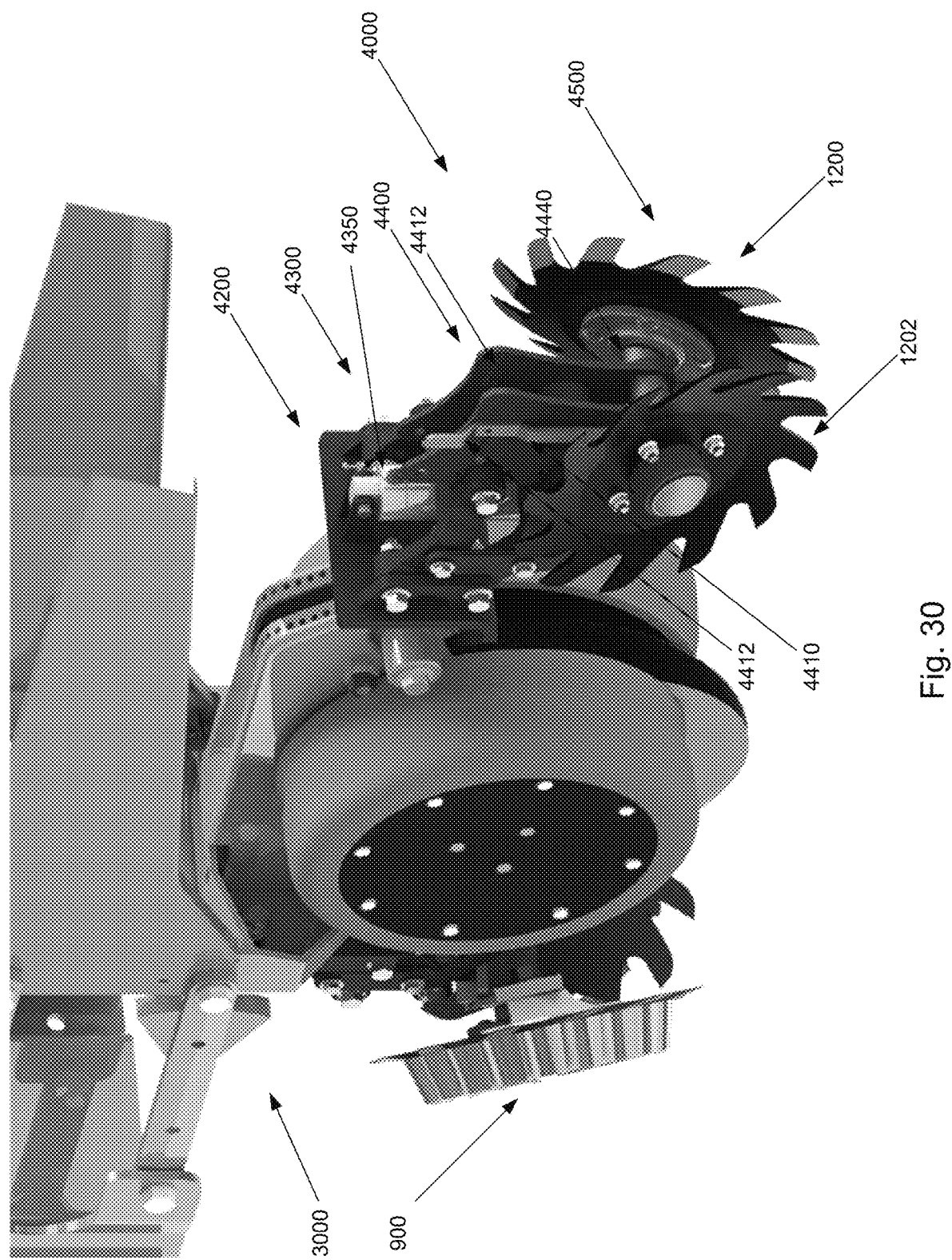
FIG. 30 provides a rear perspective view of an improved row closer wheel in a row closing configuration with a planter according to an embodiment of the present invention.
Figure 31:
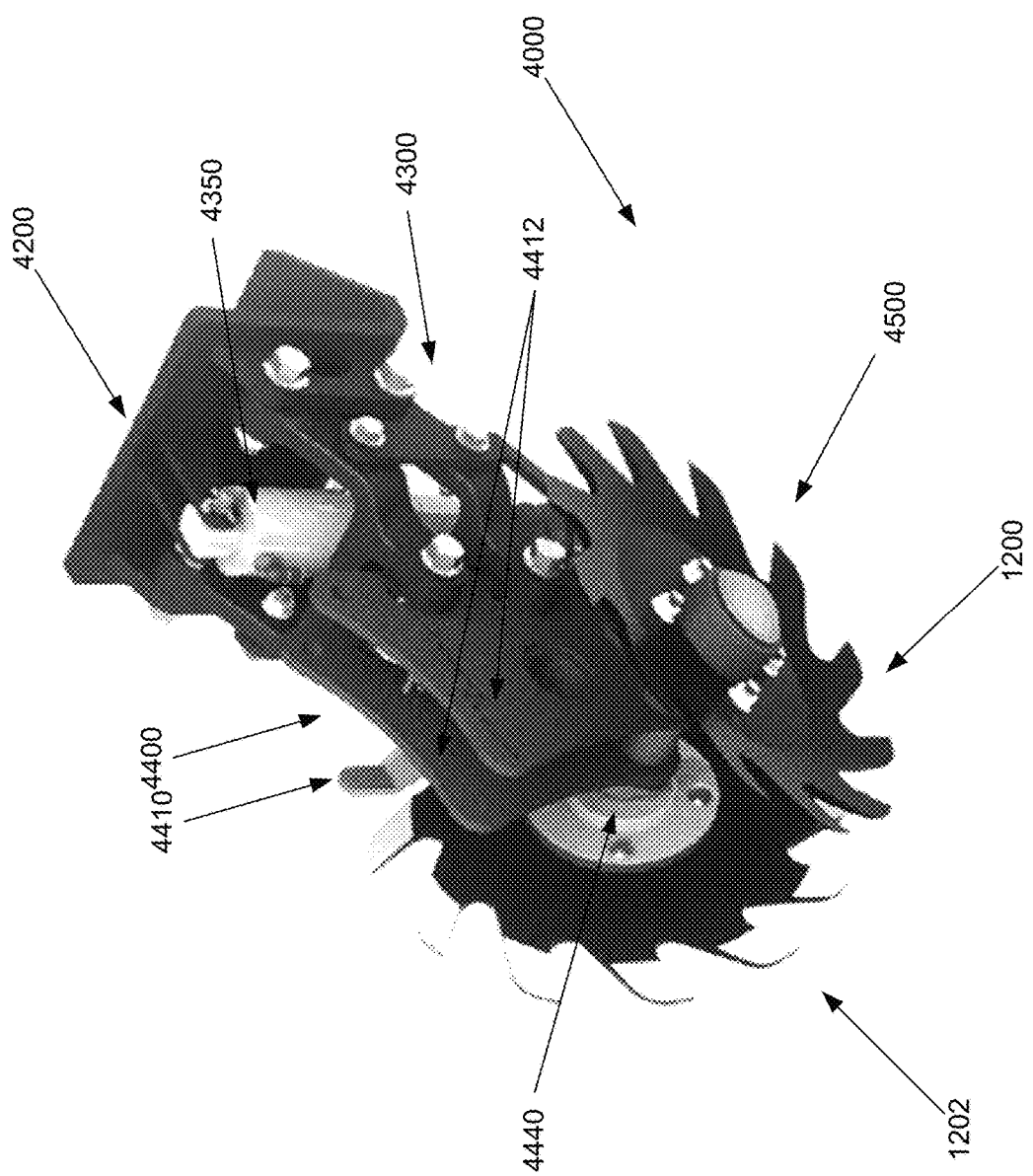
FIG. 31 provides a perspective view of an improved row closer wheel on a row closer frame according to an embodiment of the present invention.

In the embodiments shown in FIGS. 22-25 (single lever assembly 2140 fully extended, toe-in neutral position) and FIGS. 26-29 (single lever assembly 2140 fully retracted, positive toe-in position), the improved closing wheel assembly 2100 is adapted to be mounted upon the parallel arm assembly 4300 and use the razor cutting wheels for closing wheels 2150, such as is shown in FIGS. 30-31 and described in U.S. patent application Ser. No. 16/041,666, ROW CLEANER/CLOSING WHEEL, Martin, filed Jul. 20, 2018; U.S. Prov. Pat. App. 62/803,420, IMPROVED ROW CLEANER/CLOSING WHEEL, Martin, filed Feb. 8, 2019; U.S. patent application Ser. No. 16/252,298, COMPACT PARALLEL ARM ROW CLEANER, Martin, filed Jan. 18, 2019; and in U.S. Prov. Pat. App. 62/741,438, COMPACT PARALLEL ARM ROW CLOSER AND ROW CLEANER, Martin, filed Oct. 4, 2018, each of which are incorporated herein by reference in their entirety. The improved closing wheel assembly 2100 shown in FIGS. 22-31 allows the operator to adjust the relative camber of the closing wheels 2150 with respect to the adjustable closing wheel stem 2130 and to each other, thereby adjusting the penetration depth and/or angle of the closing wheels 2150 into the ground surface.

The closing wheels 2150 may be angled with respect to the horizontal and/or vertical planes. The ideal orientation of the closing wheels 2150 will depend on the type of planter, the type of planter row unit, the type of closing wheels 2150, the soil conditions, the type of seed planted, and operator preferences. In the embodiment of the closing wheel assembly shown in FIGS. 22-25, the closing wheels 2150 are angled with respect to the vertical plane, which may be typical for a razor closing wheel 2152/2154, such as that shown, in certain applications. In this orientation, the closing wheels 2150 are in a positive camber but a neutral toe-in position. The embodiment of the closing wheels 2150 shown in FIGS. 22-25 works well in many conditions when each closing wheel 2150 may be angled twenty to thirty degrees from the vertical, and in a preferred embodiment are angled twenty-three degrees from the vertical. The angle at which the closing wheels 2150 engage the ground surface when oriented as shown in FIG. 22 is substantially parallel to the furrow, but it may be orientated as depicted in FIGS. 32B and 32C, and the optimal orientation of the closing wheels 2150 depend on many factors as indicated above.

In FIGS. 32A-32C, the direction of travel of a planter row unit is indicated by the arrow. When the penetration angle of the closing wheels 2150 is adjusted by changing the angle of the unified axle assembly 2170 with respect to the adjustable closing wheel stem 2130 by manipulating the single lever assembly 2140 into one of the unified axle locking points 2136, the angle of the closing wheels 2150 with respect to the furrow changes. For example, if the closing wheels 2150 are angled with respect to the vertical plane, as their relative toe-in angle is increased, the angle at which the closing wheels 2150 contact the ground surface may become more aggressive (i.e., the angle of the closing wheels 2150 relative to the direction of travel may become greater), which is shown in the progression of FIGS. 32A-32C. FIG. 32A shows a typical angle at which the closing wheels 2150 intersect the ground surface for certain applications.

When the closing wheels 2150 are moved from a shallower relative toe-in setting to a higher relative toe-in setting (i.e., changing the angle of the unified axle assembly 2170 with respect to the adjustable closing wheel stem 2130 by manipulating the single lever assembly 2140 into a further rearward unified axle locking point 2136) without making other adjustments to the orientation of the closing wheels 2150, the angle at which each closing wheel 2152/2154 engages the ground surface follows the progression shown in FIGS. 32A-32C, which is exaggerated for illustrative purposes. The improved closing wheel assembly 2100 keeps the angle at which the closing wheels 2150 engage the ground surface substantially constant in one direction as the toe-in angle of the closing wheels 2150 is varied.

In addition to the angle at which the closing wheels 2150 engage the ground surface with respect to the furrow (i.e., the direction of travel), the spacing between the respective ground engagement portions of the closing wheels 2150 of a pair of closing wheels 2150 mounted on the improved closing wheel assembly 2100 affects the amount of material the closing wheels 2150 move toward the furrow. As may be seen in FIGS. 26-29, the closing wheels 2150 are separated by the shortest distance at their respective bottom portions, which is the portion of the closing wheels 2152/2154 that primarily engages the ground surface. When the single lever assembly 2140 is used to adjust the relative position of the unified axle assembly 2170 with respect to the adjustable closing wheel stem 2130 so that the closing wheels 2150 penetrate the ground surface to a shallower depth (typically by moving the single lever assembly 2140 away from the ground surface by pivoting the arm 2144 upward about the ring 2143) the distance between the portions of the closing wheels 2152/2154 that engage the ground surface is increased.

Figure 23:
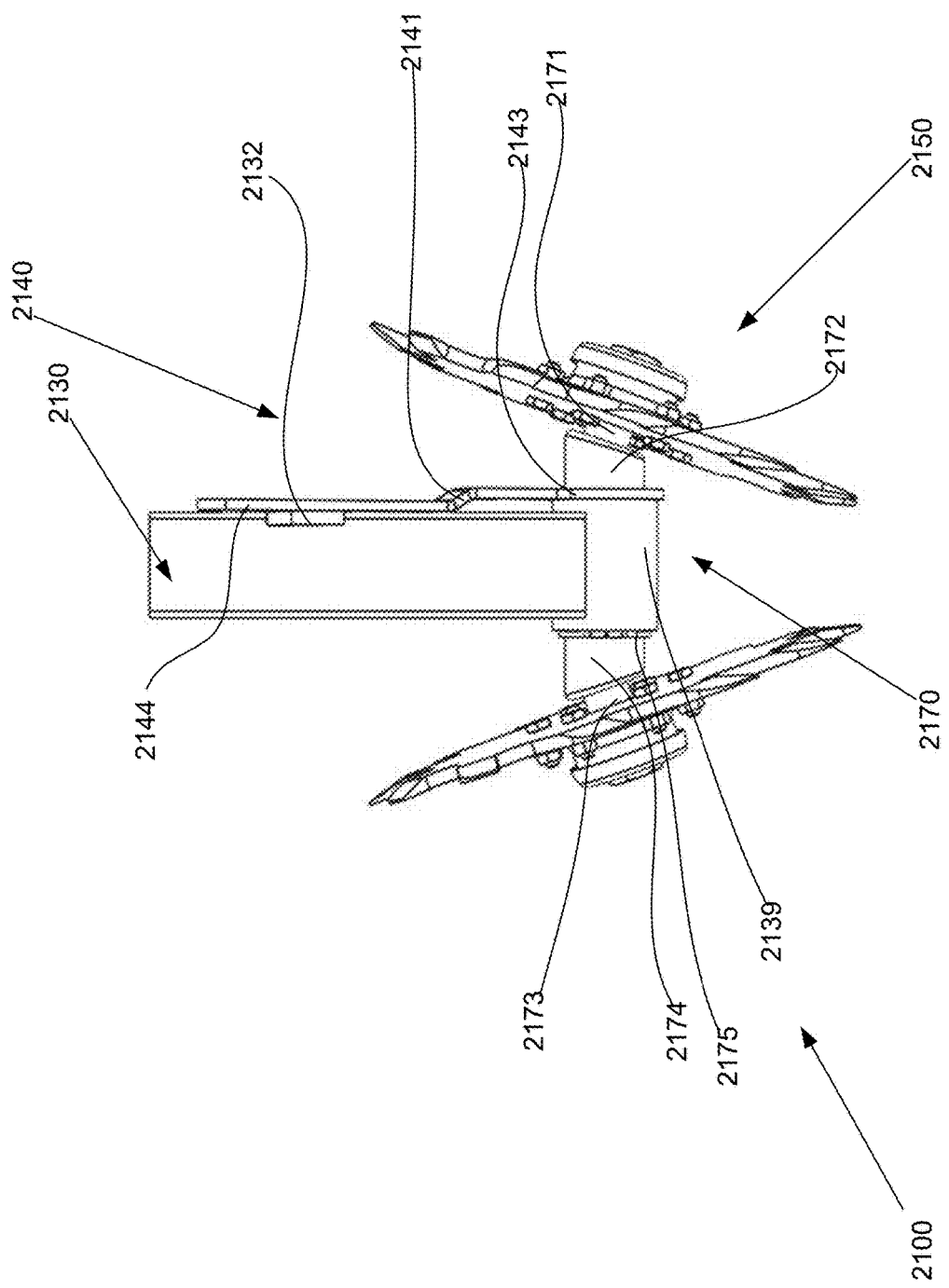
Figure 24:
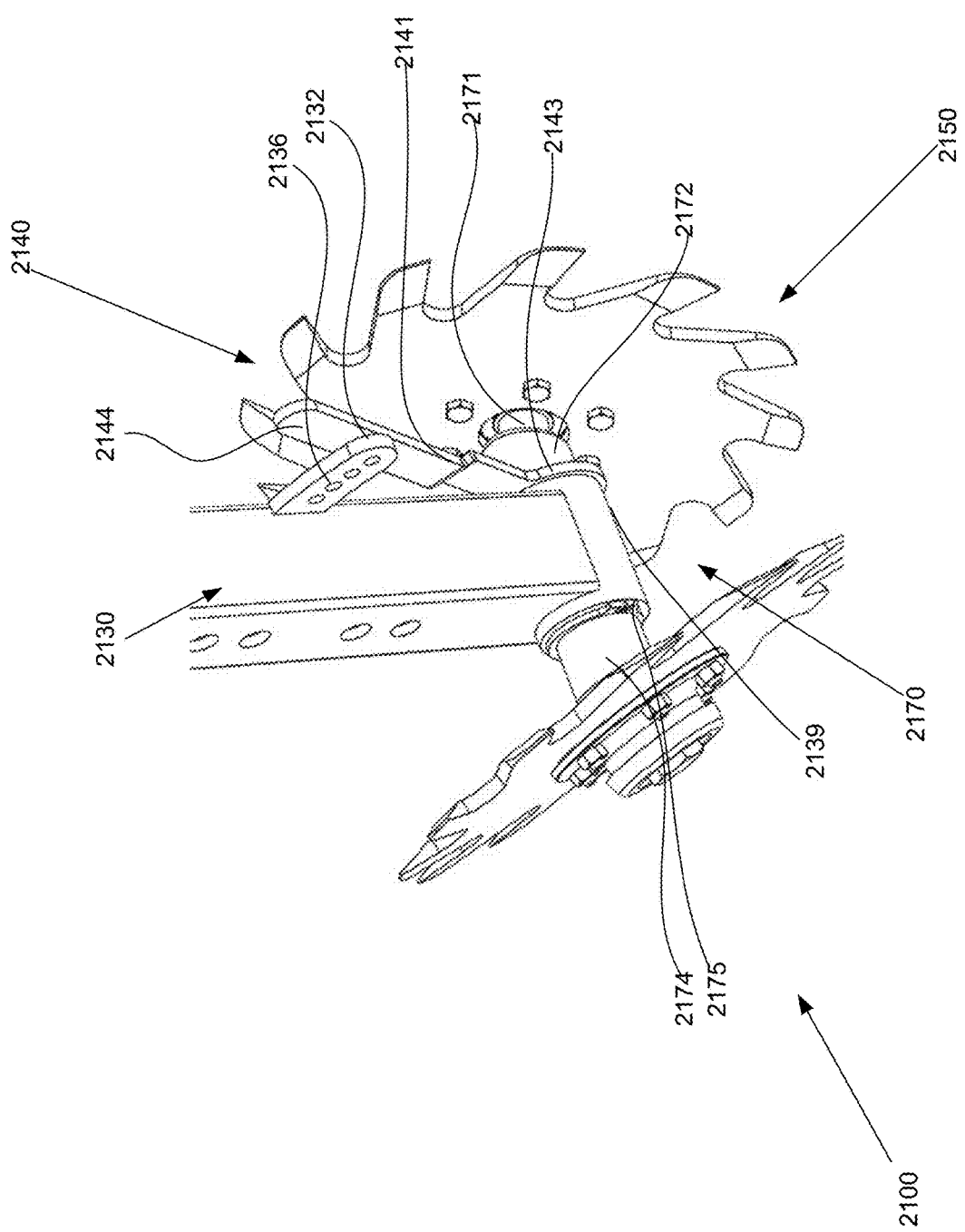
Figure 25:
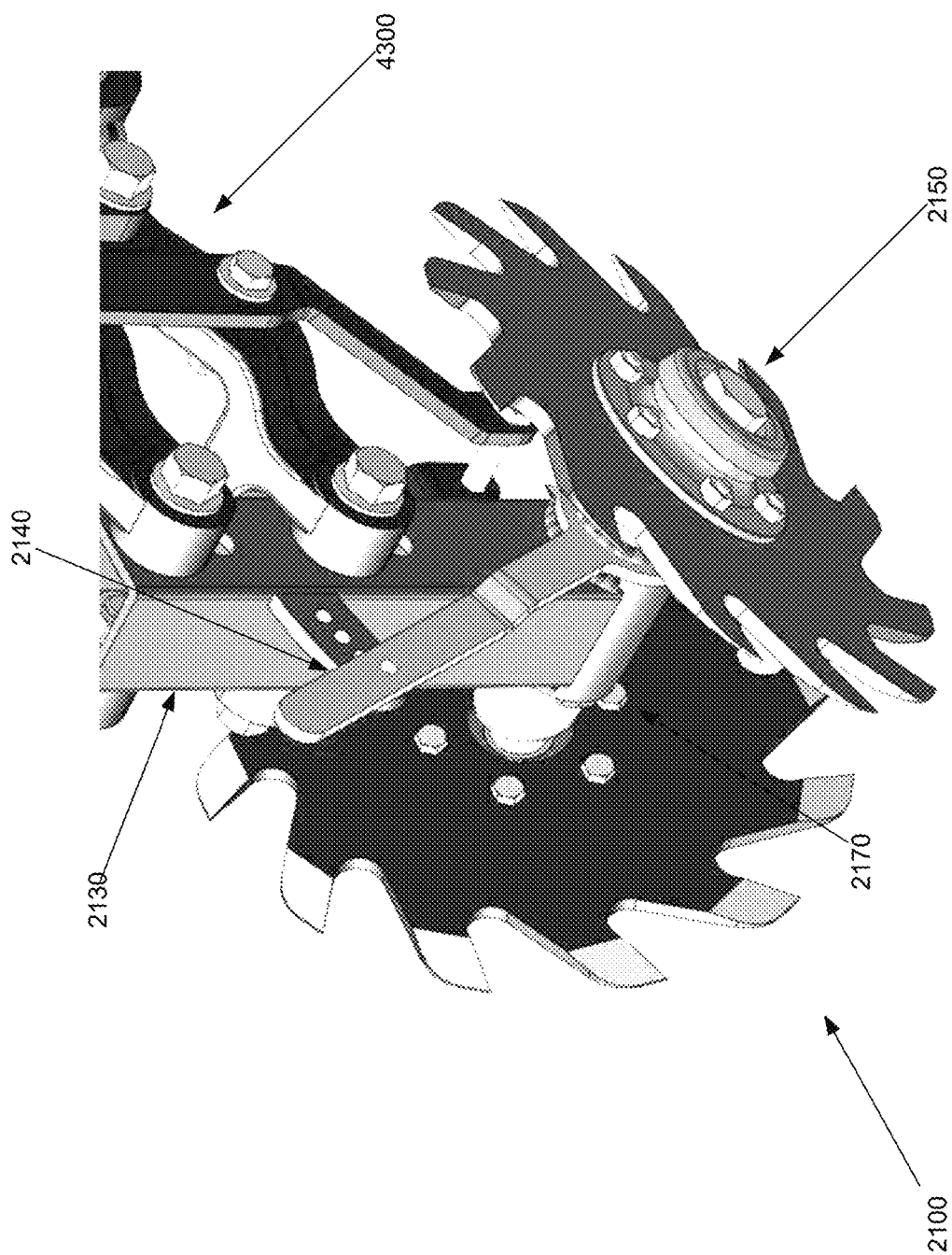
Figure 26:
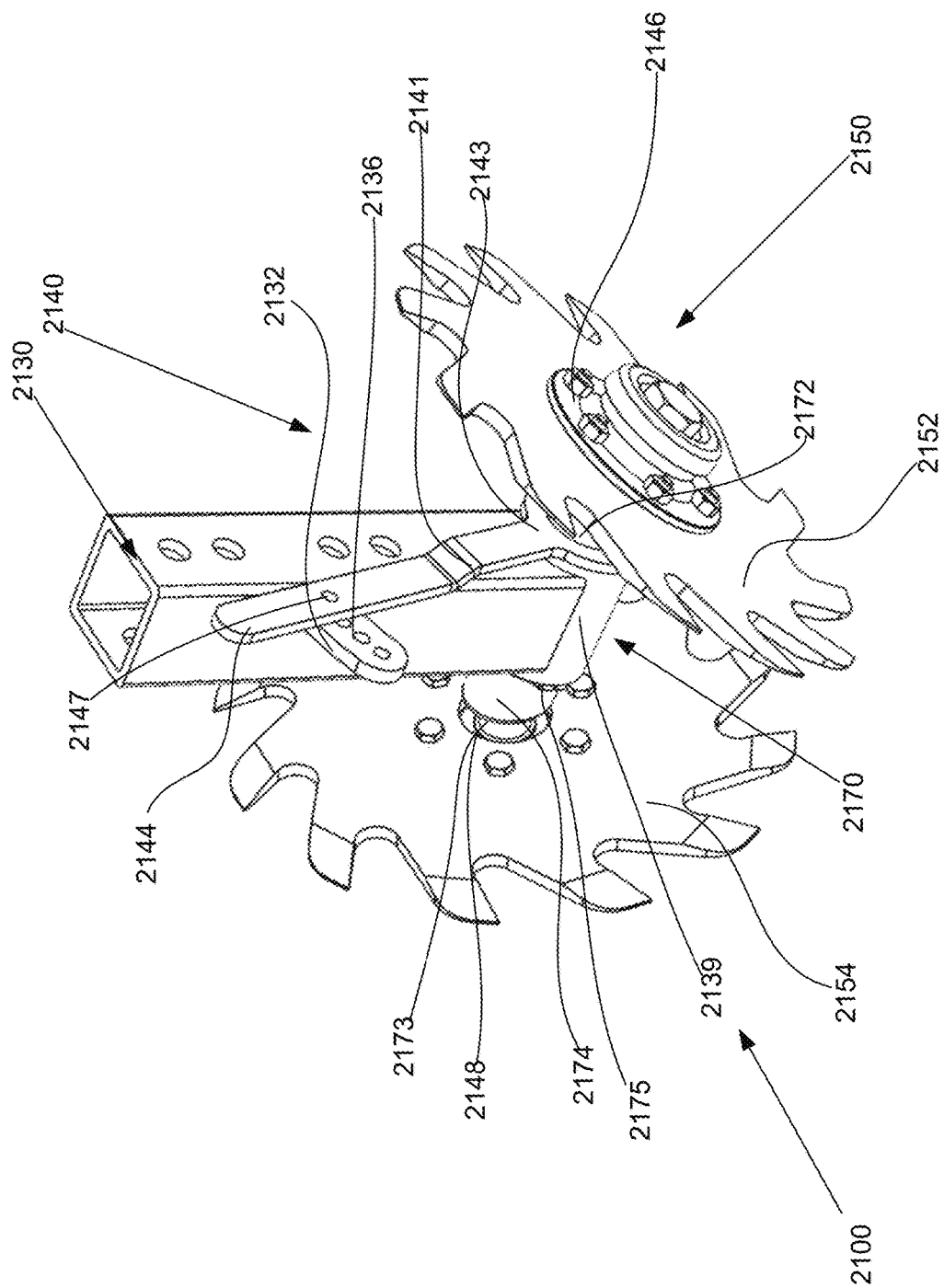
FIGS. 26-29 provide various views of an improved adjustable closing wheel assembly having a single lever assembly for adjusting the relative angle of the closing wheels on the unified axle assembly, wherein the lever is in a fully retracted position and the wheels are at a positive or aggressive toe-in configuration, according to an embodiment of the present invention.

With respect to FIGS. 23-25 the unified axle assembly 2170 is angled with respect to the adjustable closing wheel stem 2130 by the same amount as shown in FIG. 22, and the single lever assembly 2140 is in the same lever notch or unified axle locking point 2136. The improved closing wheel assembly 2100 allows the operator to compensate for changes in the orientation of the closing wheels 2150 with respect to the ground surface, which changes in orientation may be caused by changing the angle of the adjustable closing wheel stem 2130 with respect to the planter row unit.

As shown in FIGS. 22-29, the improved closing wheel assembly 2100 includes a lever notch bracket or locking points arm 2132 that extends out from the front of the adjustable closing wheel stem 2130 at a position above the axle frame 2139. The locking points arm 2132 may be mechanically affixed to the adjustable closing wheel stem 2130. The locking points arm 2132 is generally an extension or protrusion as shown in the frame of FIGS. 22-29, but may also be an area of a set of axle locking points 2136 as shown in FIGS. 30-31. Mounted to the unified axle assembly 2170 at the ring 2143 is the single lever assembly 2140. A c-clip or locking ring 2175 may be used to secure the unified axle assembly 2170 in the axle frame 2139. The single lever assembly 2140 is pivotally mounted to the unified axle assembly 2170 at the lever ring 2143, which may also be a connecting point between the single lever assembly 2140 and the unified axle assembly 2170. Accordingly, the single lever assembly 2140 is rotatable with respect to the adjustable closing wheel stem 2130 about the lever ring 2143 but is fixed in relative position to the unified axle assembly 2170.

The first end or upper arm 2144 of the lever arm 2141 forms a lever handle to provide a user interface. The second end of the lever arm 2141, the lever ring 2143, provides for a position on which to mount secure the single lever assembly 2140 to the unified axle assembly 2170.

The closing wheels 2150 may be angled with respect to the single lever assembly 2140 in the vertical and/or horizontal planes to provide for the desired orientation of the closing wheels 2150 with respect to the furrow. The locking points arm 2132 is formed with a plurality of axle locking points 2136 that may be detents, openings, passthroughs, or other means adapted to provide for the extension or pin 2147 to be removably secured therein. The locking points 2136 are sized to engage and secure the pin 2147 of the lever arm 2141 in a certain position once the operator has placed the lever 2141 in that position. That is, the locking points 2136 secure the position of the lever arm 2141 once set by the operator. As the lever arm 2141 of the single lever assembly 2140 is moved from one notch, detent, or locking point 2136 to the next, the lever 2141 rotates with respect to the adjustable closing wheel stem 2130 about the lever ring 2143. This rotation causes the orientation of the closing wheels 2150 affixed to the unified axle assembly and controlled by the single lever assembly 2140 to change. Adjusting the orientation of the closing wheels 2150 with respect to the adjustable closing wheel stem 2130 allows the operator to compensate for the change in orientation of the closing wheels 2150 with respect to the furrow caused by adjusting the penetration depth of the closing wheels 2150 when adjusting or moving the adjustable closing wheel stem 2130 with respect to the row unit frame.

Figure 27:
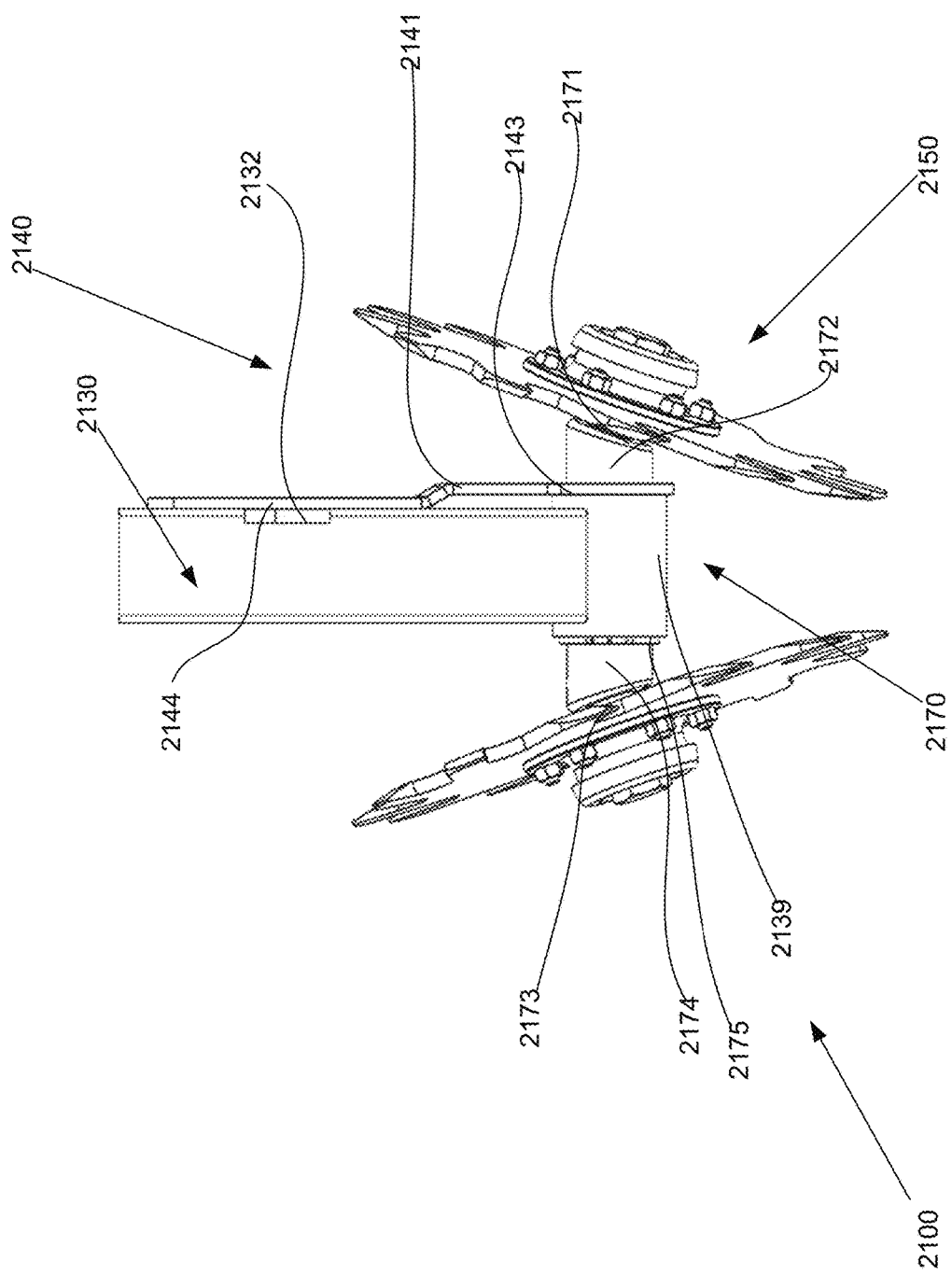
Figure 28:
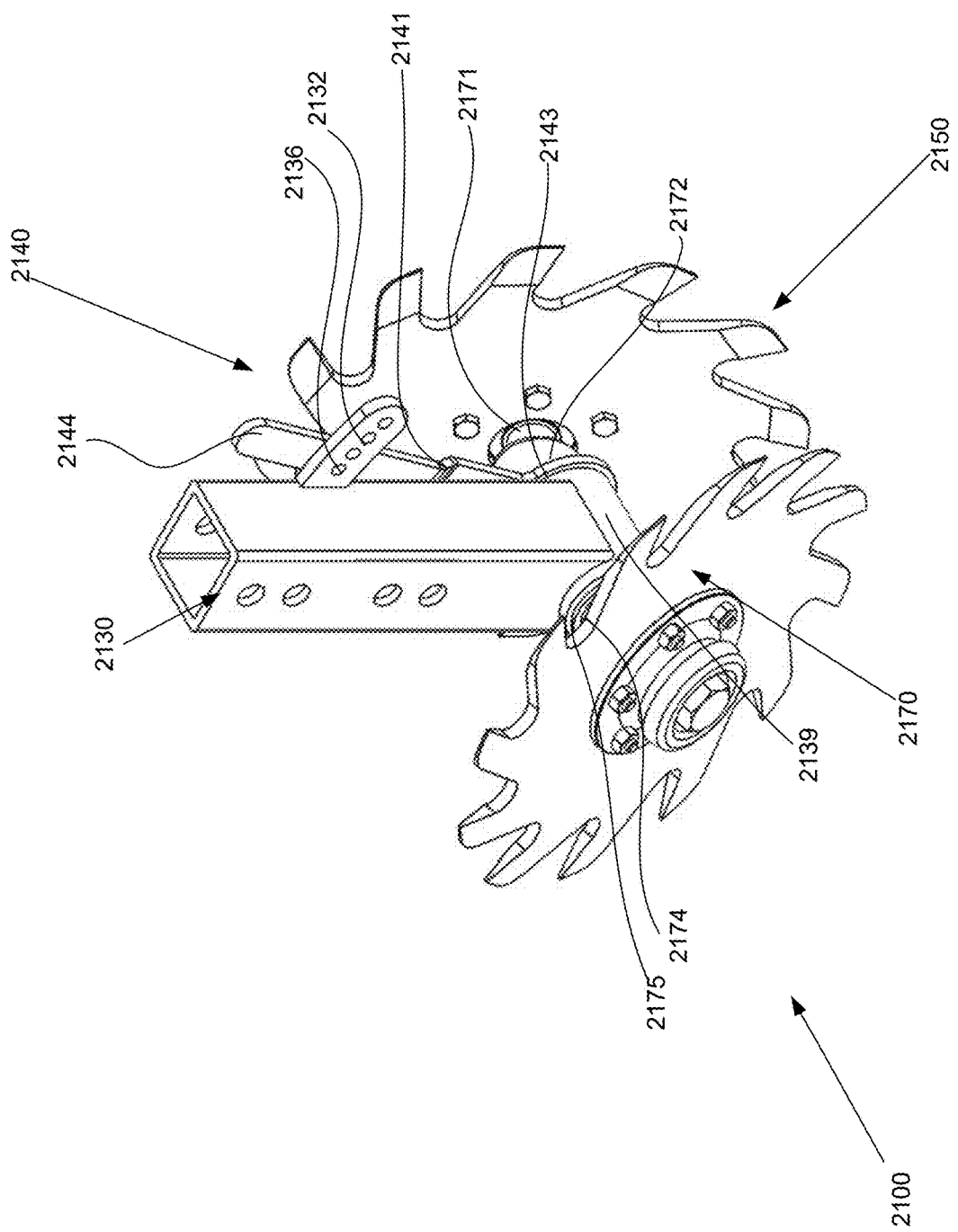

With reference now to FIGS. 30 and 31, perspective views of row closer wheels 1200 and 1202 installed on a row closer frame 4000 as part of a planter assembly 3000 are provided. The row closer frame assembly 4000 comprises a frame mounting plate 4200, a parallel arm assembly 4300 with a height adjustment cylinder 4350, and a stem assembly 4400. The height adjustment cylinder 4350 may be a pneumatic or hydraulic cylinder or may be an actuator, worm drive, or other suitable mechanism for adjusting the height and angle of the parallel arm assembly 4300. The frame mounting plate 4200 is adapted to secure the row closer frame assembly 4000 to the planter assembly 3000. The stem assembly 4400 comprises left and right plates secured to the front of the parallel arm assembly and further comprises a single axle 4440, which may be a unified axle assembly 2170 as shown in FIGS. 22-29 herein. The axle 4440 may be angled at each end to provide for the angled mounting of the hubs of the wheel assemblies 4500. The single adjustment arm 4410 may be used to adjust the amount of toe-in or the relative angle of each wheel 1200 and 1202 to each other and is secured in one of a plurality of locking points, indents, or passthroughs 4412 similar to the locking points 2136 of the locking point arm 2132 shown in FIGS. 22-29. A row cleaning assembly 900, as shown in FIG. 27, may also be used with the planter assembly 3000 to clean the row before the furrow with the seed trough is dug by the planter assembly 3000 and subsequently closed by the closing assembly 4000.

Elements of the row closer frame assembly 4000 shown in FIGS. 30-31 and the closing wheel assembly 2100 shown in FIGS. 22-28 may be used with, combined with, or integrated into the row closer/cleaner 100 shown in FIGS. 5-9 and/or with the row closer/cleaner 200 shown in FIGS. 10-18 and as illustrated in FIG. 29. Additionally, the row closer frame assembly 4000 shown in FIGS. 30-31, the closing wheel assembly 2100 shown in FIGS. 22-28, the row closer/cleaner 100 shown in FIGS. 5-9, and the closer/cleaner 200 shown in FIGS. 10-18 may be combined and used with the closing wheel frame assembly 7000 shown in FIGS. 33-39 and as described hereinbelow.

In one exemplary embodiment, the invention provides a closing wheel assembly comprising: a laterally adjustable closing wheel stem comprising a set of lateral position settings adapted to receiving a position locking member to hold the closing wheel stem in place, the closing wheel stem adapted to be securely supported by a closing wheel assembly support; a pair of closing wheels respectively attached in rotatable fashion to a pair of hubs and secured to the hubs by fastening means; a common or unified axle for supporting the pair of hubs and pair of closing wheels, the common axle securely attached to the closing wheel stem and having an axis essentially perpendicular to the ground when mounted for operation; a lever coupled to the common axle to provide adjustable positioning of the pair of closing wheels relative to the ground; wherein the pair of hubs are angled to provide a toe-in configuration of the oppositely facing closing wheels to allow closing wheels to be adjustably angled by operation of the single lever assembly in either or both of vertical and/or horizontal planes to provide a desired orientation of the closing wheels with respect to the furrow.

The closing wheel assembly may be further characterized in one or more of the following manners: wherein the lever includes a ring portion connected to the common axle; further comprising a lever position member comprising a plurality of locking points adapted to receive a pin, protrusion or other locking means provided on the lever to hold the lever in place and to maintain a desired orientation of the closing wheels; wherein the closing wheel stem includes a rotational support or shell for receiving and supporting the common axle; wherein the closing wheel stem is both laterally (vertically) adjustable and adapted for angular adjustment relative to a front/back orientation of the planter to provide further orientation adjustment of the pair of closing wheels; wherein the closing wheel stem is mounted to a set of parallel linkage arms configured to provide a degree of vertical freedom of movement of the closing wheel assembly; further comprising a piston mechanically coupled to the closing wheel stem and adapted to provide a degree of vertical freedom of movement of the closing wheel assembly.

With reference now to FIGS. 33-39, various views of a row closing/planting system 5000 using a firming wheel frame 8000 and closing wheel frame assembly 7000 according to an embodiment of the present invention on a row planting unit 6000. The firming wheel frame 8000 and closing wheel frame assembly 7000 are installed on the row planting unit 6000 using existing bracketry mounting points to provide for the installation of the firming wheel frame 8000 and closing wheel frame assembly 7000 without modification to the row planting unit 6000. The shape or geometry of the firming wheel frame 8000 is designed such that it may be installed on the row planting unit 6000 while providing for access to and use of the factory adjustment features 6010 of the row planting unit 6000. Additionally, the shape or geometry of the closing wheel frame assembly 7000 is such that it may be used below the row planting unit 6000 without interfering with operation of the row planting unit 6000.

Figure 33:
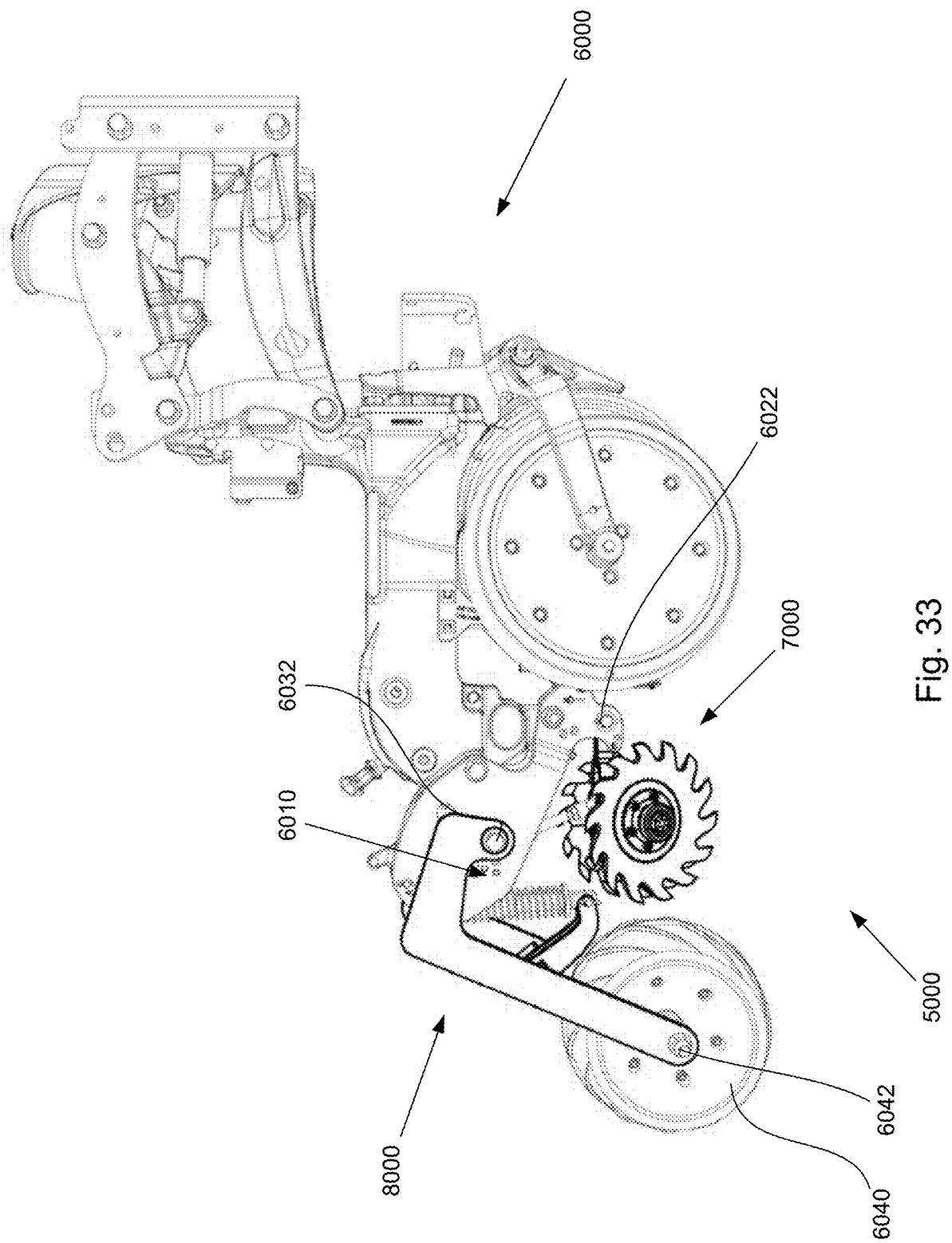
FIGS. 33-39 provide various views of a row closing/planting system using a firming wheel frame and closing wheel frame assembly according to an embodiment of the present invention on a row planting unit.

With reference to FIG. 33, the firming wheel frame 8000 is installed or attached to the rear of the row planter unit 6000 at the attachment points 6032, where it may be secured by a fastening means, such as by a nut and a bolt, to the row planter unit 6000 in a manner to provide for rotational movement about the attachment point 6032. This provides for movement of the firming wheel 6040 at the end of the firming wheel frame 8000 to allow the firming wheel 6040 to follow changes in ground elevation or angle while the row planter unit 6000 is in operation. The closing wheel frame assembly 7000 is installed or attached underneath the row planter unit 6000 and forward of the firming wheel frame 8000 at the attachment point 6022 where it is secured by a fastening means, such as by a nut and a bolt, to the row planter unit 6000. The closing wheel frame assembly 7000 is secured in a manner to provide for rotational movement about the attachment point 6022 such that the closing wheels may follow changes in ground elevation or angle while the row planter unit 6000 is in operation.

Figure 34:
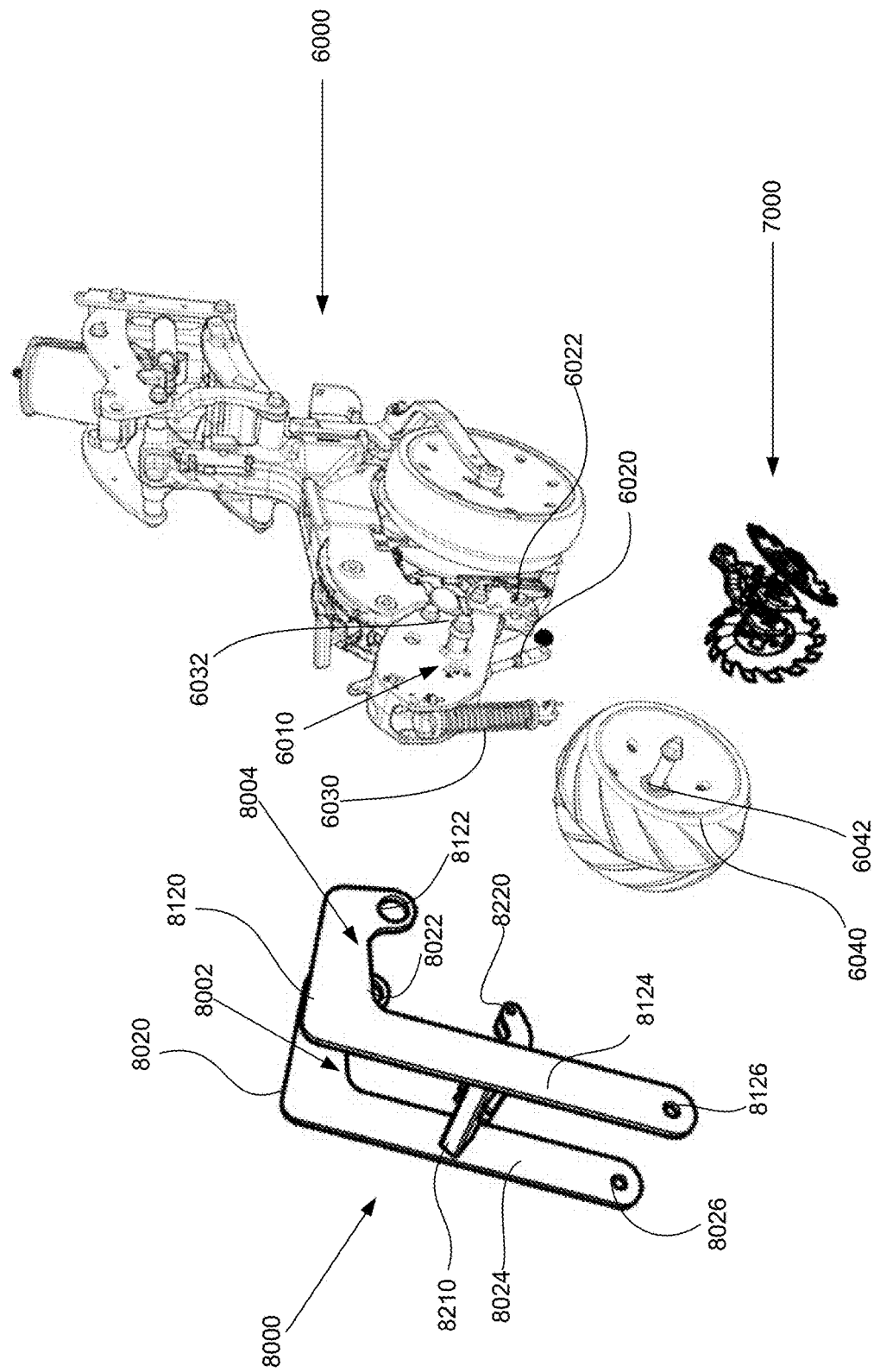
Figure 35:
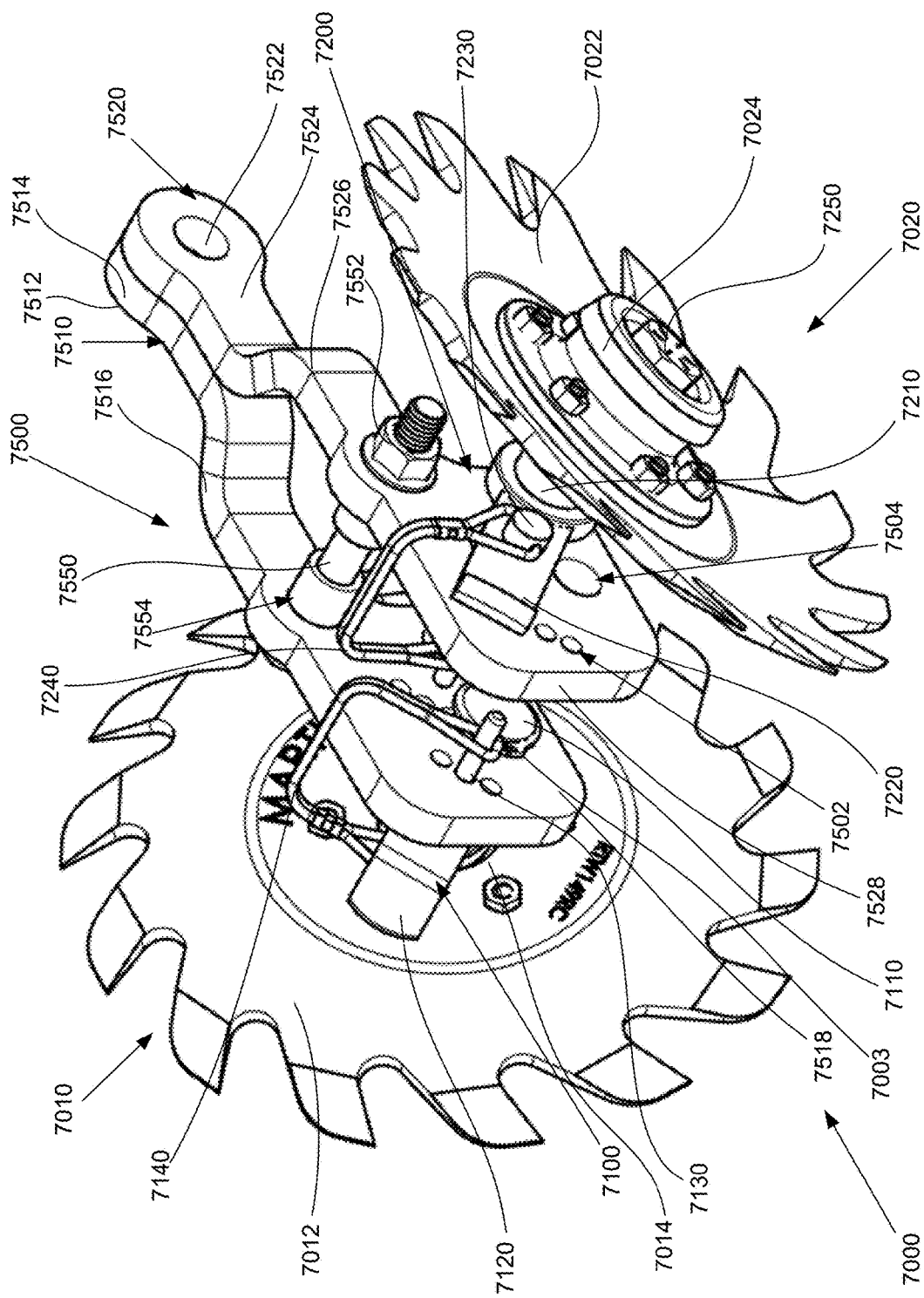
Figure 36:
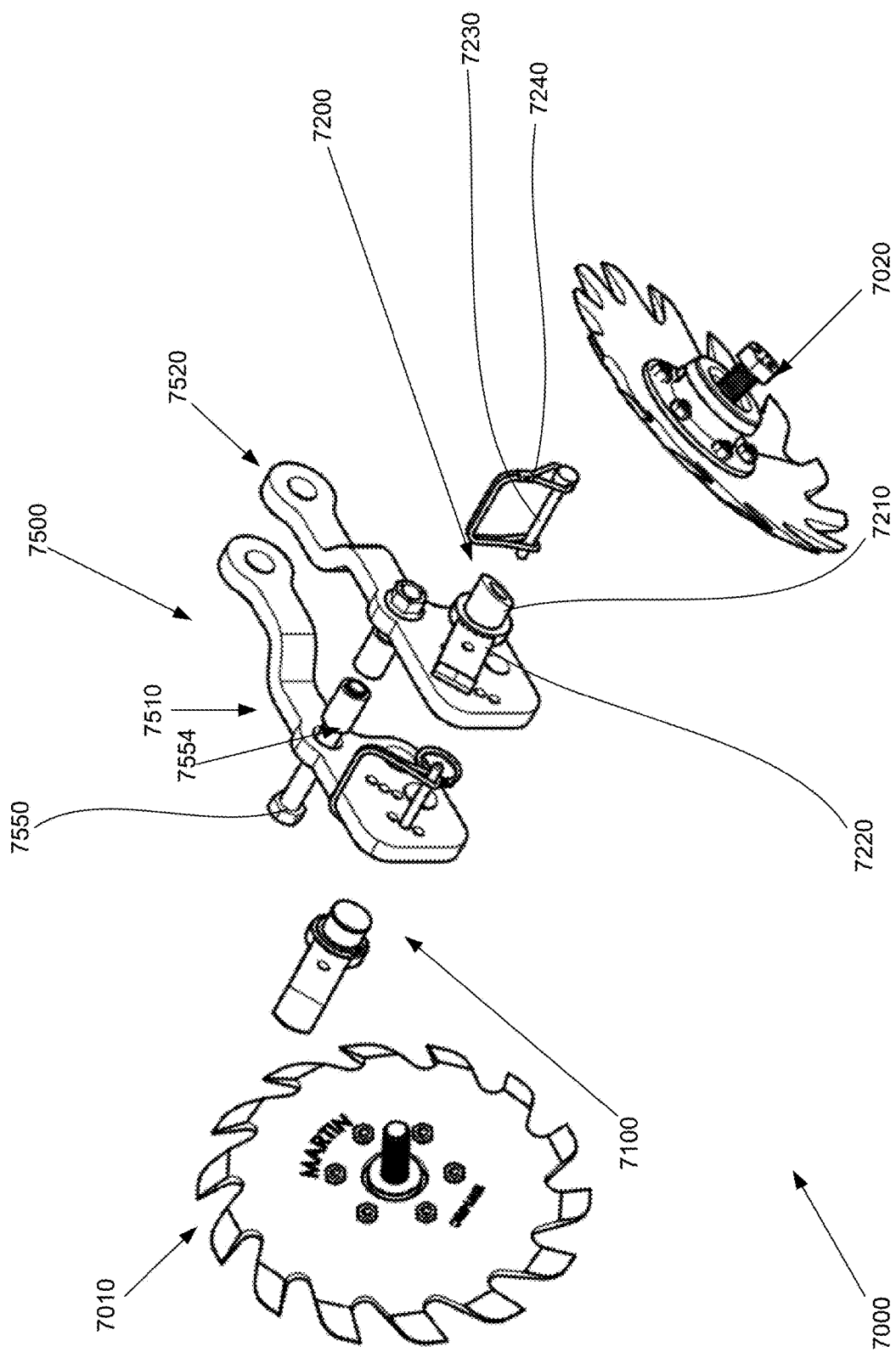
Figure 37:
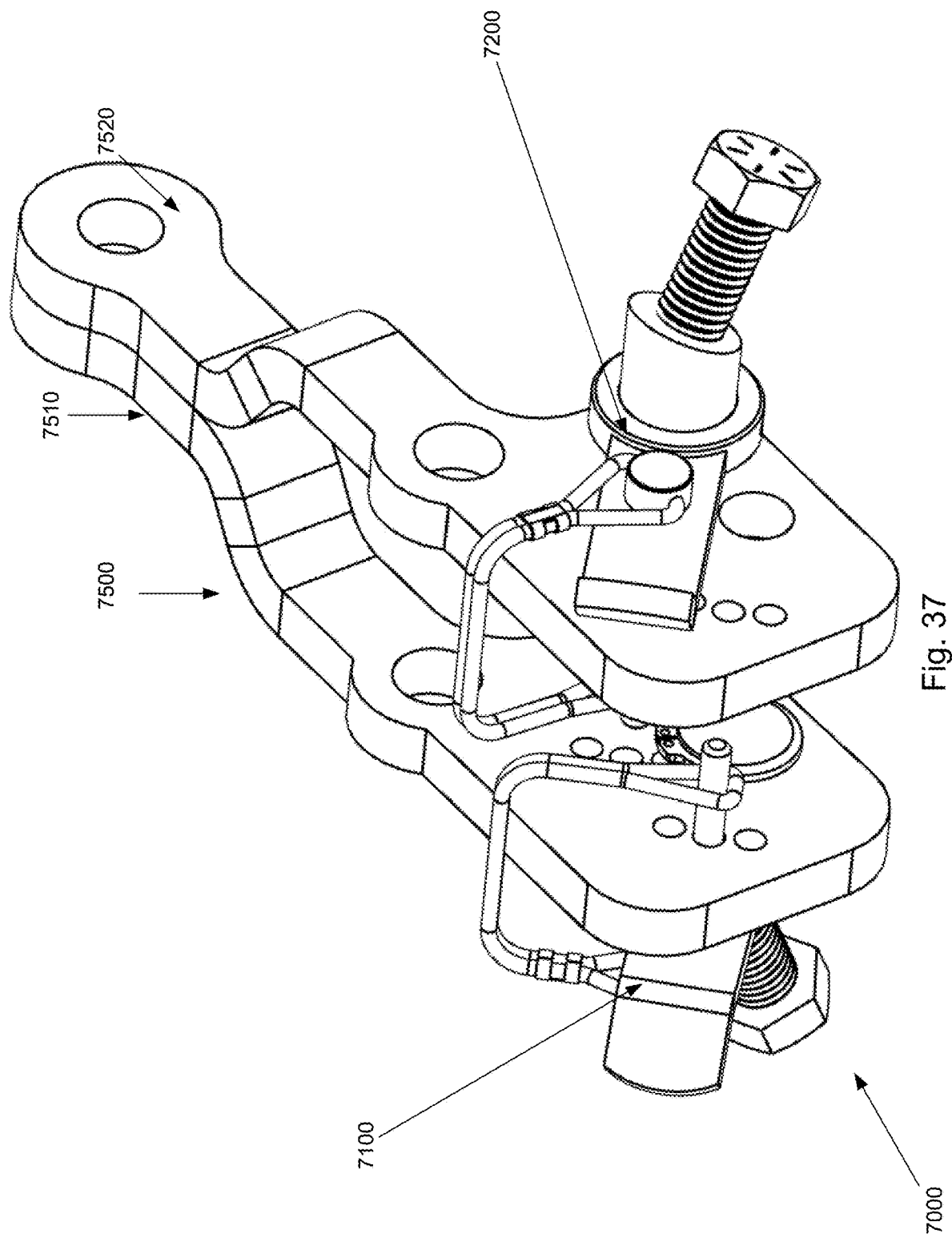
Figure 38:
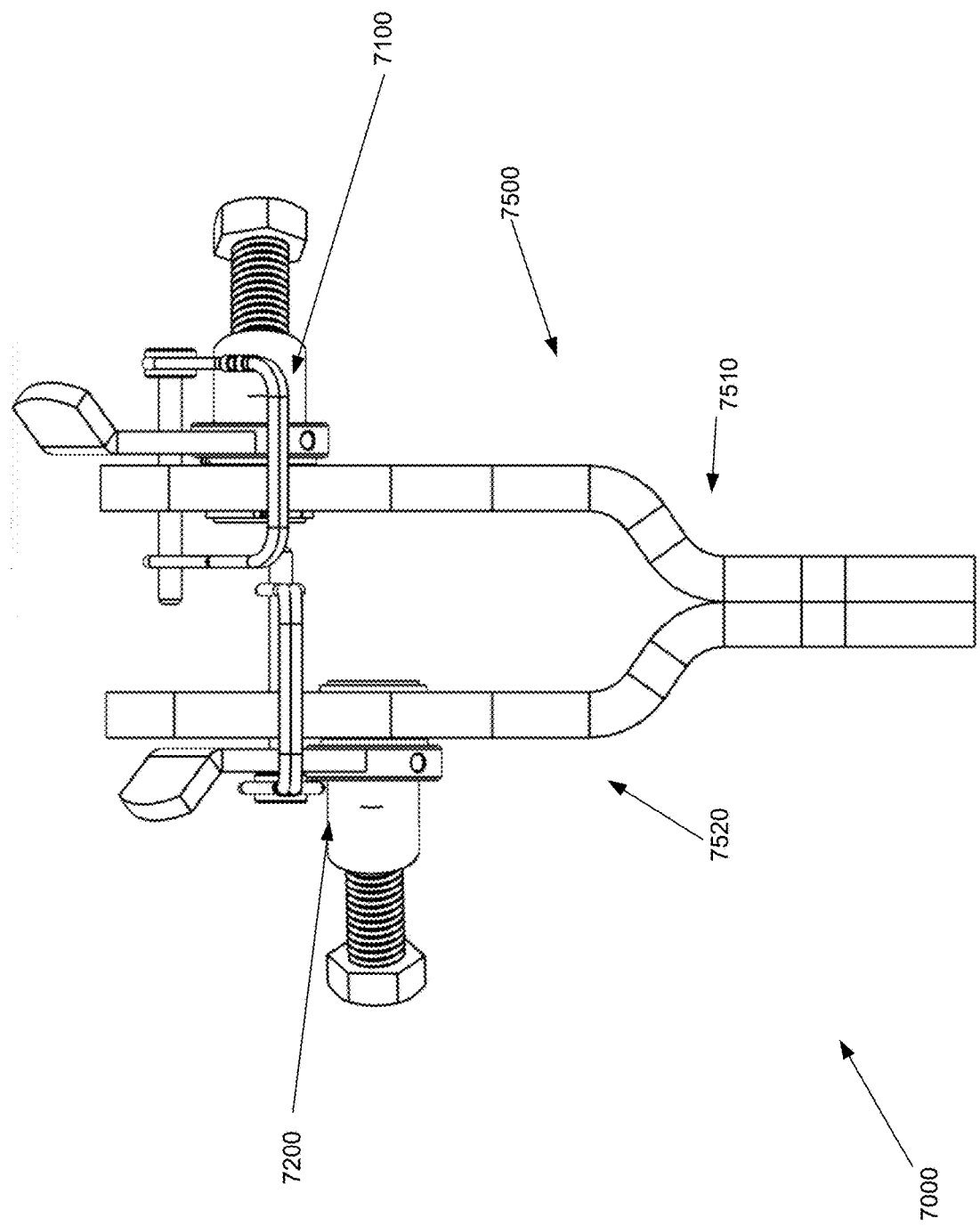
Figure 39:
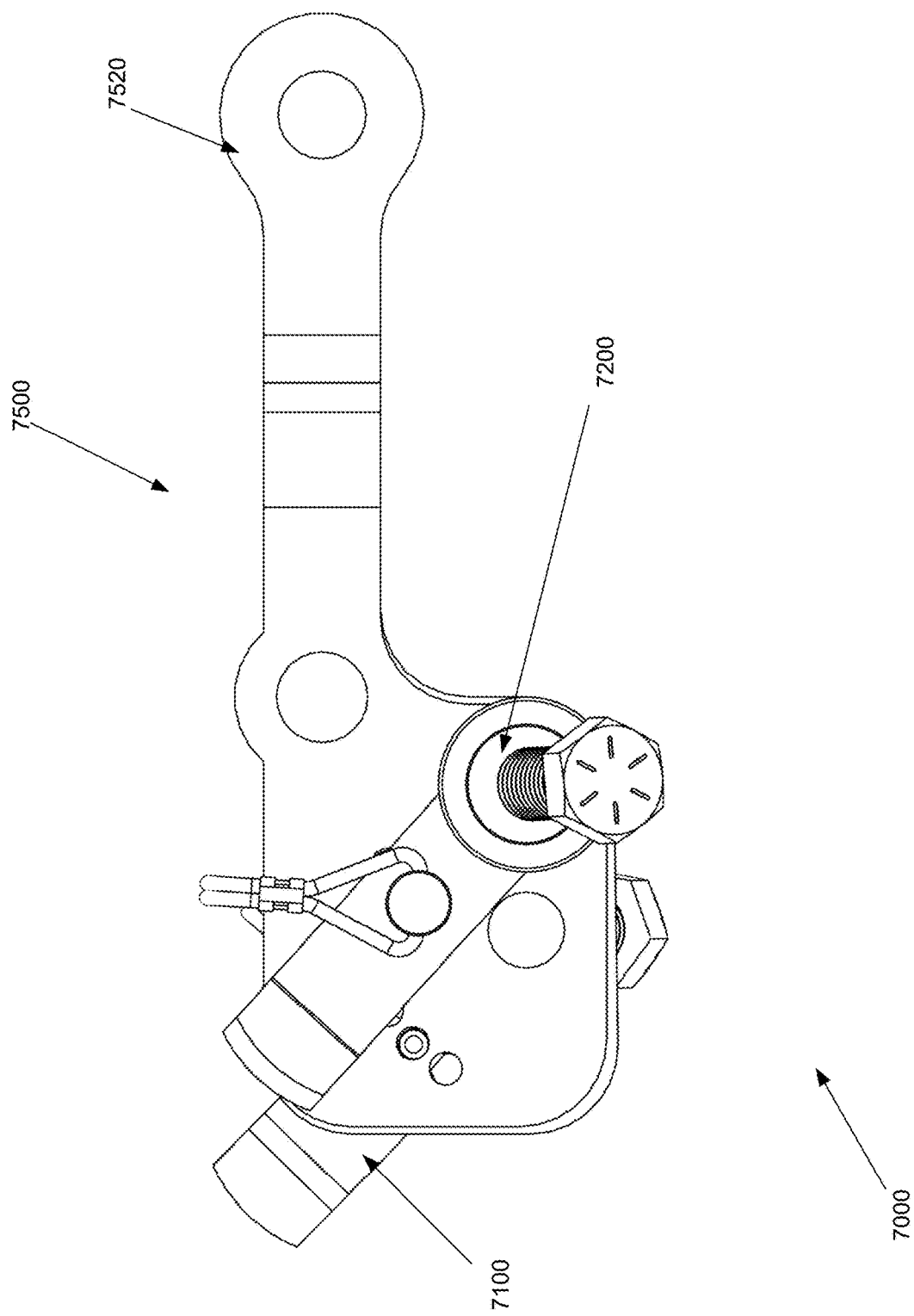

With reference to FIG. 34, a perspective view of components of the row closing/planting system 5000 are shown. Specifically, the firming wheel frame 8000 is shown separate from the row planter unit 6000 and in detail. The firming wheel frame 8000 comprises a first arm 8002 and a second arm 8004 which are disposed parallel to each other and each is disposed on one side of the row planter unit 6000. Apertures or openings 8022 and 8122 provide for the mounting of the firming wheel frame 8000 to the row planter unit 6000 at the mounting points such a mounting point 6032 such that the firming wheel frame 8000 may rotatably move about the mounting point 6032 when secured by a suitable fastening means such as a nut and threaded stud, a bolt, or a single bolt with a nut and washers. Bends 8020 and 8120 in the respective first arm 8002 and second arm 8004 angle the frame over factory adjustment features on the row planter unit 6000 providing for user access to and operation of those adjustment features.

Wheel arms 8024 and 8124 extend out from the row planter unit 6000 to position the firming wheel 6040 clear of the closing wheels and closing wheel frame assembly 7000. The firming wheel 6040 is attached to the frame 8000 at the mounting points 8026 and 8126 by to the axle 6042 by suitable fastening means. A brace 8210 provides structural support to the firming wheel frame 8000 and keeps each of the first arm 8002 and second arm 8004 properly positioned and oriented with respect to each other, the firming wheel 6040, and to the row planter unit 6000. A suspension 6030, which may be a shock absorber and spring suspension, an air suspension, or an actuator, is attached to the firming wheel frame 8000 at the suspension arm 8220. The suspension 6030 provides the proper downward pressure on the firming wheel 6040 and also provides for the adjustment of the travel, rate-of-travel, and pressure for the firming wheel 6040.

With reference now to FIGS. 35-39, views of the closing wheel frame assembly 7000, with and without closing wheel assemblies 7010 and 7020 are provided. The closing wheel frame assembly 7000 comprises a closing wheel frame 7500 having a first frame arm 7510 and a second frame arm 7520. The first frame arm 7510 has a proximal end 7514 with an attachment point 7512 for securing the first frame arm 7510 to the mounting point 6022 of the row planter unit 6000. This may also secure the first frame arm 7510 to the second frame arm 7520 or the arms may be welded together or may be formed from a single piece of material. A bend 7516 positions the first arm 7510 out from a common central plane to provide for securing an adjustment actuator 6020 to the axle or bolt 7550. Bushings or collars 7554 may be used with the bolt 7550 and a nut 7552 to secure the adjustment actuator 6020 to the closing wheel frame 7500. The bend 7516 also provides access to the wire lock 7140 and pin 7130 of the adjustment assembly 7100. The second frame arm 7520 has a proximal end 7524 with an attachment point 7522 for securing the second frame arm 7520 to the mounting point 6022 of the row planter unit 6000. This may also secure the second frame arm 7520 to the first frame arm 7510. A bend 7526 positions the first arm 7520 out from a common central plane to provide for securing the adjustment actuator 6020 to the axle or bolt 7550. The bend 7526 also provides access to the wire lock 7240 and pin 7230 of the adjustment assembly 7200. The adjustment actuator 6020 is used to adjust the position of the closing frame 7500 and/or the pressure or level of engagement of the wheel assemblies 7010 and 7020 with the ground or soil.

A first closing wheel assembly 7010 comprises a closing wheel 7012 and a closing wheel hub 7014, and a second closing wheel assembly 7020 comprises a closing wheel 7022 and a closing wheel hub 7024. The first closing wheel assembly 7010 is secured to first adjustment assembly 7100 of the first arm 7510 and the second closing wheel assembly 7020 is secured to the second adjustment assembly 7200 of the second arm 7510.

As in the common axle adjustment assemblies shown in FIGS. 22-31, the angle of the closing wheel assemblies 7010 and 7020 may be adjusted by the respective adjustment assembly 7100 and adjustment assembly 7200 to change the angle of engagement of the closing wheels 7012 and 7022 with the soil or ground as desired. Increasing the angle, toe-in, or camber of the wheels relative to their engagement with the ground may be said to provide a more "aggressive" engagement with the soil which is desirable in moist or wet soil conditions. Having a less "aggressive" engagement with the soil may be desirable in drier soil conditions. Additionally, the closing wheel assemblies 7010 and 7020 and the adjustment assemblies 7100 and 7200 may be installed at one of a plurality of mounting points 7504. This provides for the closing wheel assemblies 7010 and 7020 and the adjustment assemblies 7100 and 7200 to share a common axis or to be mounted in an offset configuration to provide benefits in different soil conditions. Mounting the closing wheel assemblies 7010 and 7020 and the adjustment assemblies 7100 and 7200 in an offset configuration provides for improved row closing action for a seed trough our furrow in certain soil conditions, such as with wet, moist, or clumping soils.

The adjustment assembly 7200 comprises an adjustment lever and collar 7220 secured to a shaft 7210 which may be held in place by a locking ring, such as the locking ring 7003. Changing the angle of the lever and collar 7220 changes the angle of engagement of the wheel assembly 7020 with the ground and may be set by placing the pin 7230 in one of the plurality of locating holes 7502 and securing the pin 7230 with the wire lock 7240. The adjustment assembly 7100 comprises an adjustment lever and collar 7120 secured to a shaft 7110 which may be held in place by a locking ring, such as the locking ring 7003. Changing the angle of the lever and collar 7120 changes the angle of engagement of the wheel assembly 7010 with the ground and may be set by placing the pin 7130 in one of a plurality of locating holes, such as locating holes 7502, and securing the pin 7130 with the wire lock 7140. The angle of each of the adjustment assemblies 7100 and 7200 may be adjusted independently to provide for optimal soil engagement and closing action for varying soil conditions.

Figure 40:
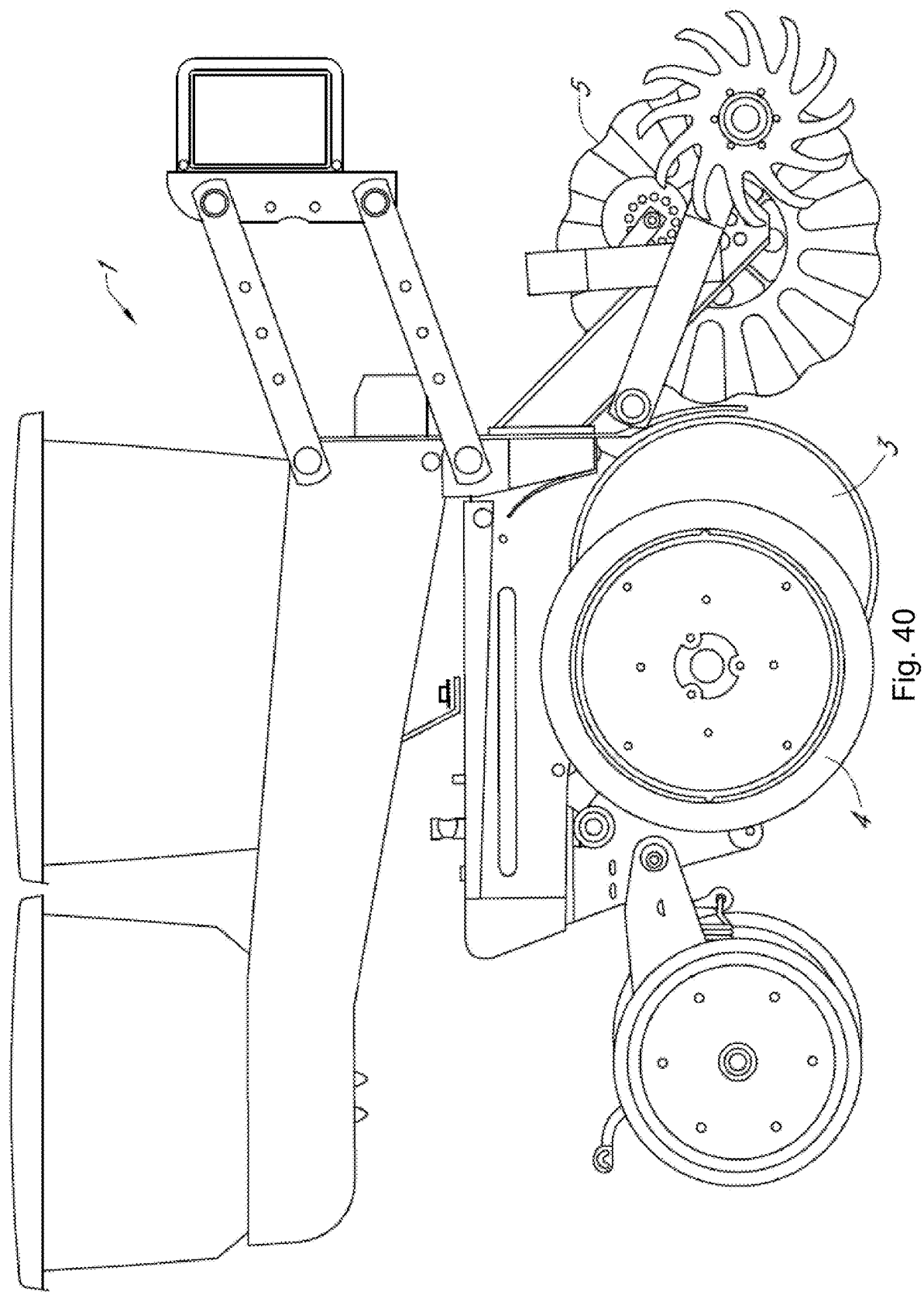
FIG. 40 illustrates a planter row unit mountable upon a tool bar as found in the prior art.
Figure 41:
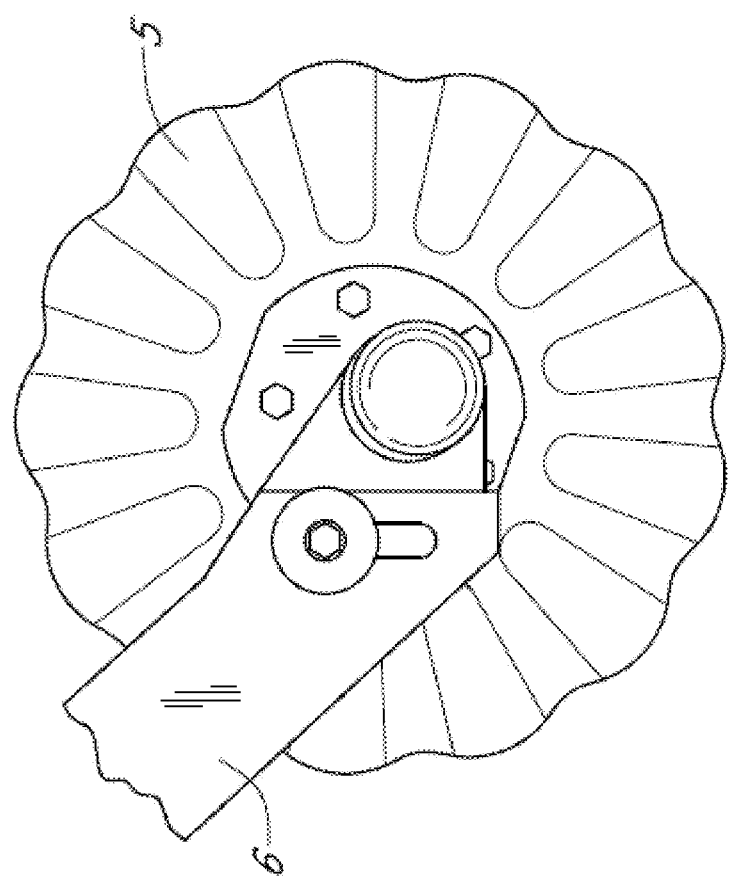
FIG. 41 provides a side view of a coulter and tool arm as found in the prior art.
Figure 42:
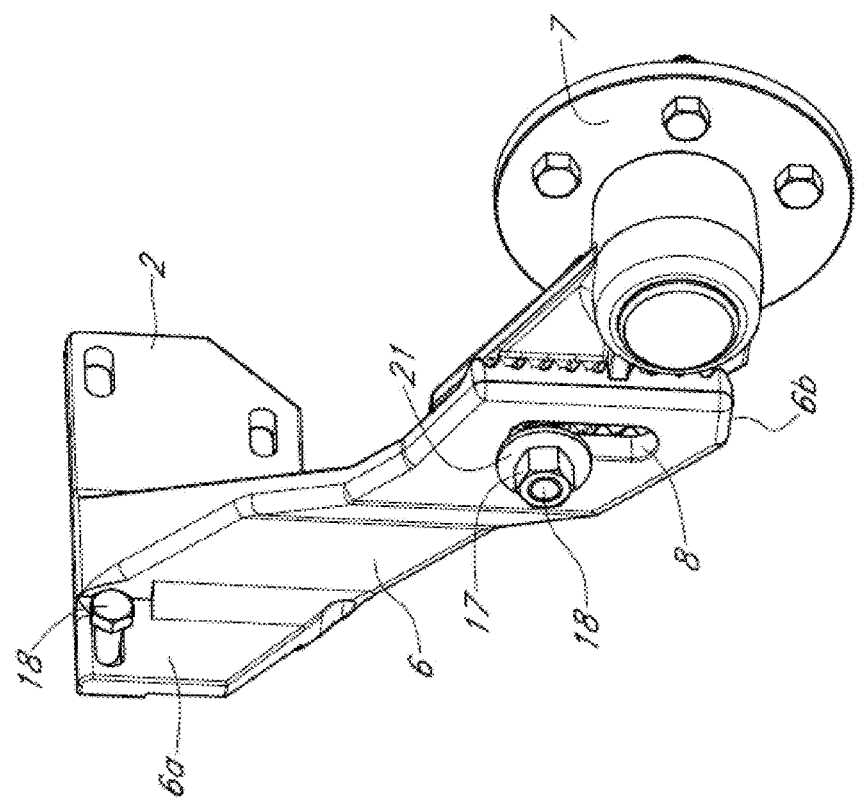
FIG. 42 provides a frontal perspective view of a tool arm mounted to a front plate as found in the prior art.
Figure 45:
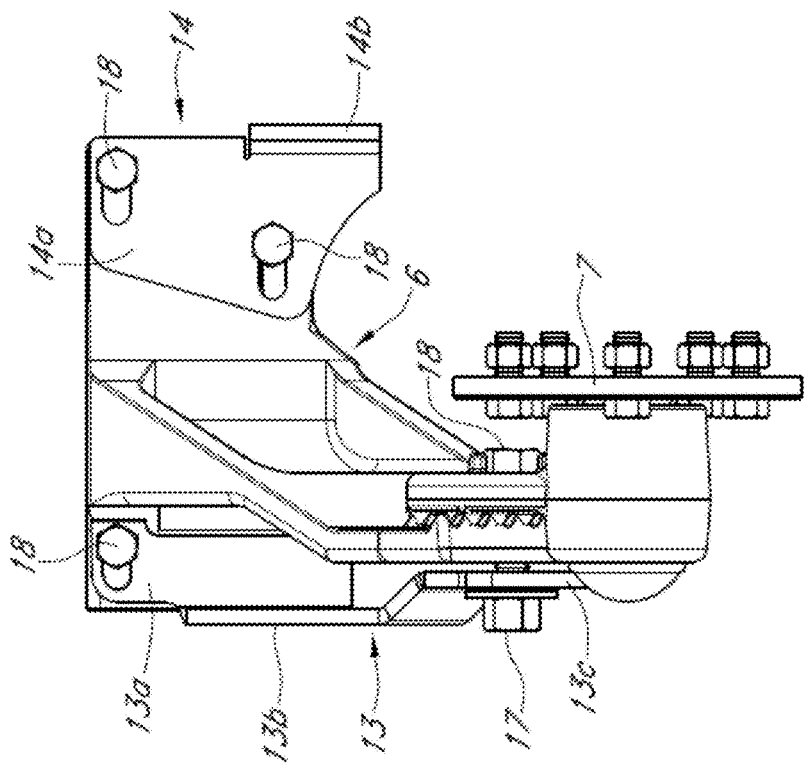
FIG. 45 provides a front view of FIG. 44.

Referring now to the drawings, wherein like reference numerals designate identical or corresponding parts throughout the several views, FIGS. 40, 41, and 42 illustrate the prior art. FIG. 40 is a planter row unit 1, as is well known in the art and upon which the present art floating row cleaner unit and components of wireless control system may be mounted. FIG. 41 is a side view of a prior art coulter 5 and tool arm 5 over which the row cleaner assembly 10 may be mounted. FIG. 42 illustrates a view of the coulter 5 and tool arm 6 as shown in FIG. 40 with the planter row unit 1 removed for clarity. As referred to hereinbelow, the planter row unit is attached to a planter 1402 with is operated conventionally as by a tractor 1404. The operator of the tractor 1404, as described in detail below, operates the wireless control system such as by way of a wireless-connected computing/communications device, e.g., smart phone, tablet, notebook, laptop, PDA, or other suitable device, to improve performance of the floating row cleaner attachment. As operators often have with them such computing/communications devices, the operator cabin of the tractor need not have any additional displays, control or other devices that take up space in the crowded area. The wireless control system components are located at the planter unit.

With respect to the row cleaning attachment as deployed in a conventional row planter unit 1, the coulter 5 illustrated in FIGS. 41 and 42 uses a tool arm 6 to attach the coulter 5 in a relatively fixed, but adjustable position at the front of the planter row unit 1. For farmers desiring a planter for narrow row spacing, less than thirty inches and preferably as narrow as fifteen inches, single-arm, row unit mounted coulters 5, such as those shown in the various figures herein, are preferable. Double arm mounted coulters (not shown herein) are well known in the prior art but are of limited application for planter row units 1 configured for narrow row spacing. Furthermore, although applicant has illustrated the present art using a coulter 5, the present art is not limited as such. Other working tools or accessories may be mounted in place of the coulter 5 to work in combination with the planter row unit 1, as is well known to those skilled in the art.

As illustrated in FIG. 42, the tool arm 6 is affixed to the front plate 2 of the planter row unit 1 at the tool arm first end 6a by three bolts 18 passing through corresponding apertures 19 formed in the tool arm first end 6a and in the front plate 2 in conjunction with three nuts 17 and washers 21. A rotatable hub 7 is typically mounted at the tool arm second end 6b, which is opposite the front plate 2. A working tool, such as a coulter 5, may be mounted to the hub 7 such that the working tool may rotate with respect to the tool arm 6 and planter row unit 1. The working tool in FIG. 42 has been removed to better illustrate the tool arm 6.

As shown herein, the configuration of the tool arm 6 illustrated in FIGS. 42-47 is a two-piece design, with the tool arm first end 6a forming one piece and the tool arm second end 6b forming the second piece. The vertical position of the tool arm second end 6b may be adjusted with respect to the tool arm first end 6a, and consequently with respect to the planter row unit 1. The tool arm first end 6a and tool arm second end 6b interface one another at an interface rack 24 adjacent a slotted aperture 8 fashioned in a distal portion of the tool arm first end 6a. A bolt 18 passing through the slotted aperture 8 and a corresponding aperture 19 in the tool arm second end 6b, washer 21, and nut 17 fixes the position of the tool arm first end 6a with respect to the tool arm second end. This type of vertical adjustment between the tool arm second end 6b and tool arm first end 6a is well known to those skilled in the art and will not be described in further detail herein for purposes of clarity. The tool arm 6 extends from the front plate 2 so that the coulter 5 engages the ground prior to the planter row unit 1 during operation, which is most clearly shown in FIGS. 46-47. Other tools may be mounted to the hub 7 on the tool arm second end 6b, such as spiked wheels, compactions wheels, or any other tool known to those skilled in the art.

Figure 43:
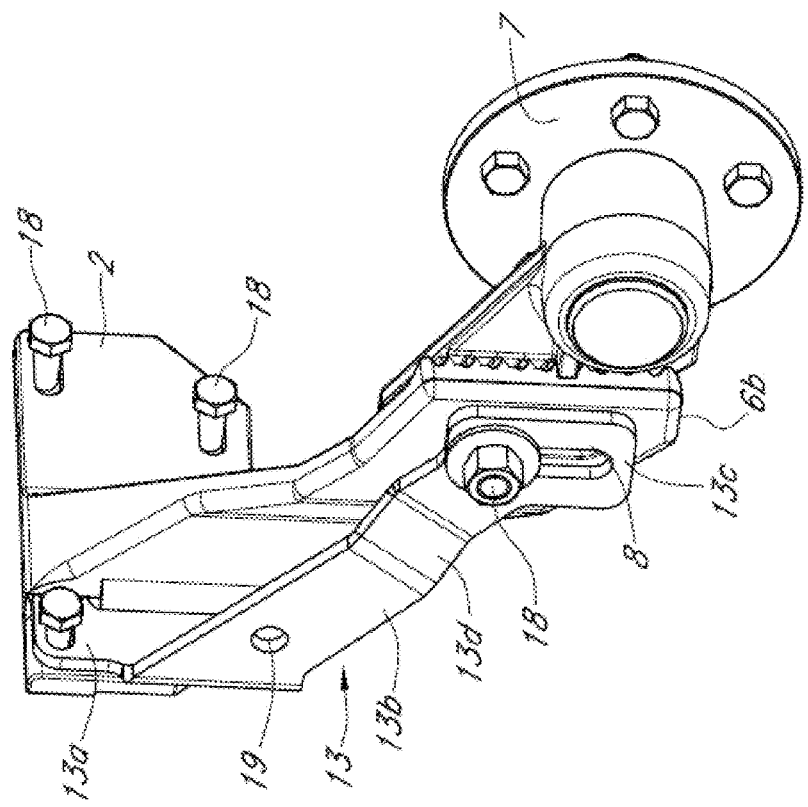
FIG. 43 provides a frontal perspective view of a tool arm with an exemplary embodiment of a tool arm row cleaner mount of the present art attached.

The exemplary embodiment of a tool arm row cleaner mount 13 (which is one component of the row cleaner mounting assembly) is shown affixed to the front plate 2 in FIG. 43. The tool arm row cleaner mount 13 of the exemplary embodiment is affixed to the front plate 2 via a nut 17, bolt 18, washer 21, and corresponding apertures 19 in the tool arm row cleaner mount 13 and the front plate 2. However, in other embodiments not pictured herein the tool arm row cleaner mount 13 is integrally formed with the front plate 2 or affixed to the front plate using other structures or methods than nuts 17, bolts 18, and washers 21. The nut 17 and bolt 18 used to mount the tool arm row cleaner mount 13 to the front plate 2 may simultaneously affix the tool arm 6 to the front plate 2, as is shown in FIG. 43.

The tool arm row cleaner mount 13 as shown in the exemplary embodiment includes a front plate portion 13a that is affixed to and abuts the front plate 2. A row cleaner frame portion 13b is integrally formed with the front plate portion 13a and oriented substantially perpendicularly thereto in the exemplary embodiment. The row cleaner frame portion 13b is adapted for pivotal engagement with a row cleaner frame 11, which engagement will be described in detail below. An angled portion 13d is integrally formed with the row cleaner frame portion 13b and angled with respect thereto. In the exemplary embodiment the angle between the row cleaner frame portion 13b and the angled portion 13d is approximately forty-five degrees, but may be greater or less in other embodiments not pictured herein. A tool arm portion 13c is integrally formed with the angled portion 13d and angled with respect thereto such that the tool arm portion 13c is substantially parallel to the row cleaner frame portion 13b in the exemplary embodiment of the tool arm row cleaner mount 13. The tool arm row cleaner mount 13 and various elements thereof may have different orientations/relationships depending on the planter row unit 1. In other embodiments, the tool arm row cleaner mount will only include a front plate portion 13a and row cleaner frame portion 13b.

Figure 44:
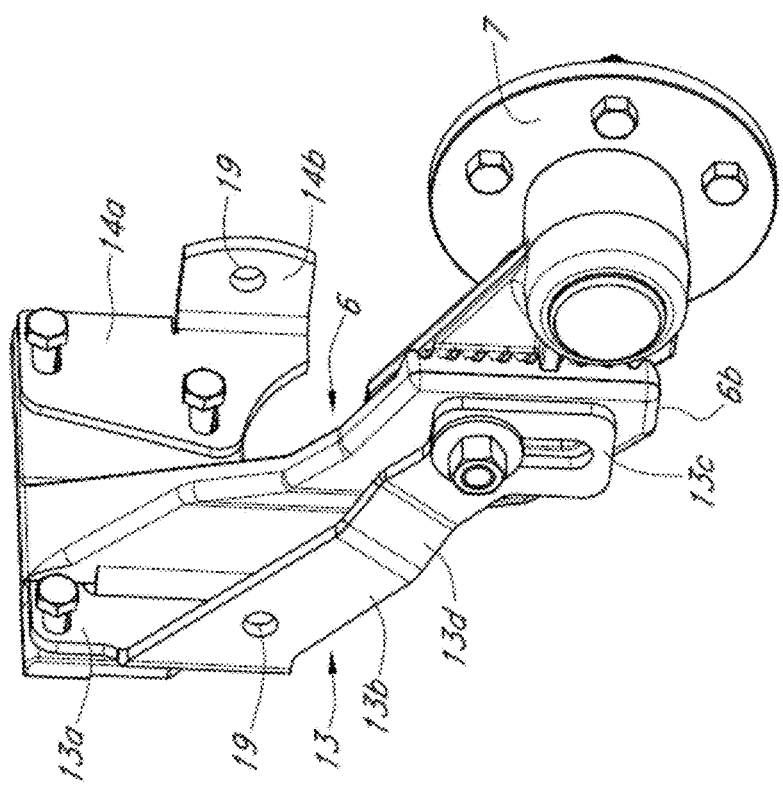
FIG. 44 provides a frontal perspective view of a tool arm with a tool arm row cleaner mount and row cleaner frame mounting plate of the present art attached.

As illustrated in FIG. 44, a row cleaner frame mounting plate 14 may be mounted to the front plate 2. The row cleaner frame mounting plate 14 of the exemplary embodiment is affixed to the front plate 2 via a plurality of nuts 17 and bolts 18 and corresponding apertures 19 in the tool arm row cleaner mount 13 and the front plate 2. However, as with the tool arm row cleaner mount 13, in other embodiments not pictured herein the row cleaner frame mounting plate 14 is integrally formed with the front plate 2 or affixed to the front plate using other structures or methods than nuts 17 and bolts 18. The nuts 17 and bolts 18 used to mount the row cleaner frame mounting plate 14 to the front plate 2 may simultaneously affix the tool arm 6 to the front plate 2, as is shown in FIG. 44.

The row cleaner frame mounting plate 14 as shown in the exemplary embodiment includes a front plate member 14a that is affixed to and abuts the front plate 2. A row cleaner frame member 14b is integrally formed with the front plate member 14a and oriented substantially perpendicularly thereto in the exemplary embodiment. The row cleaner frame member 14b is adapted for pivotal engagement with a row cleaner frame 11, which engagement will be described in detail below.

Figure 46:
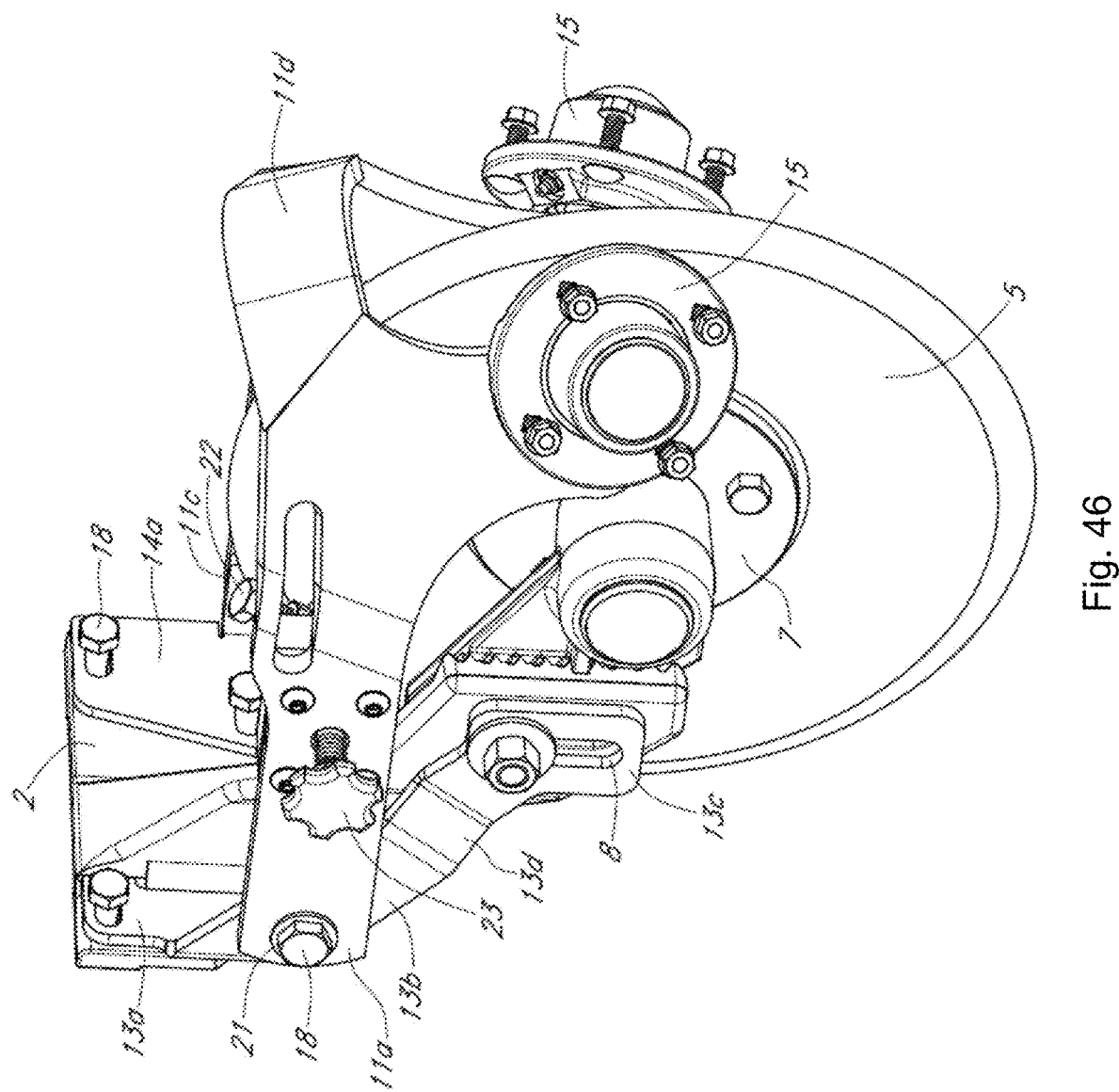
FIGS. 46 and 46A provide frontal perspective views of the apparatus shown in FIG. 44 with a row cleaner frame affixed thereto, and respectively with and without a coulter attached.
Figure 46A:
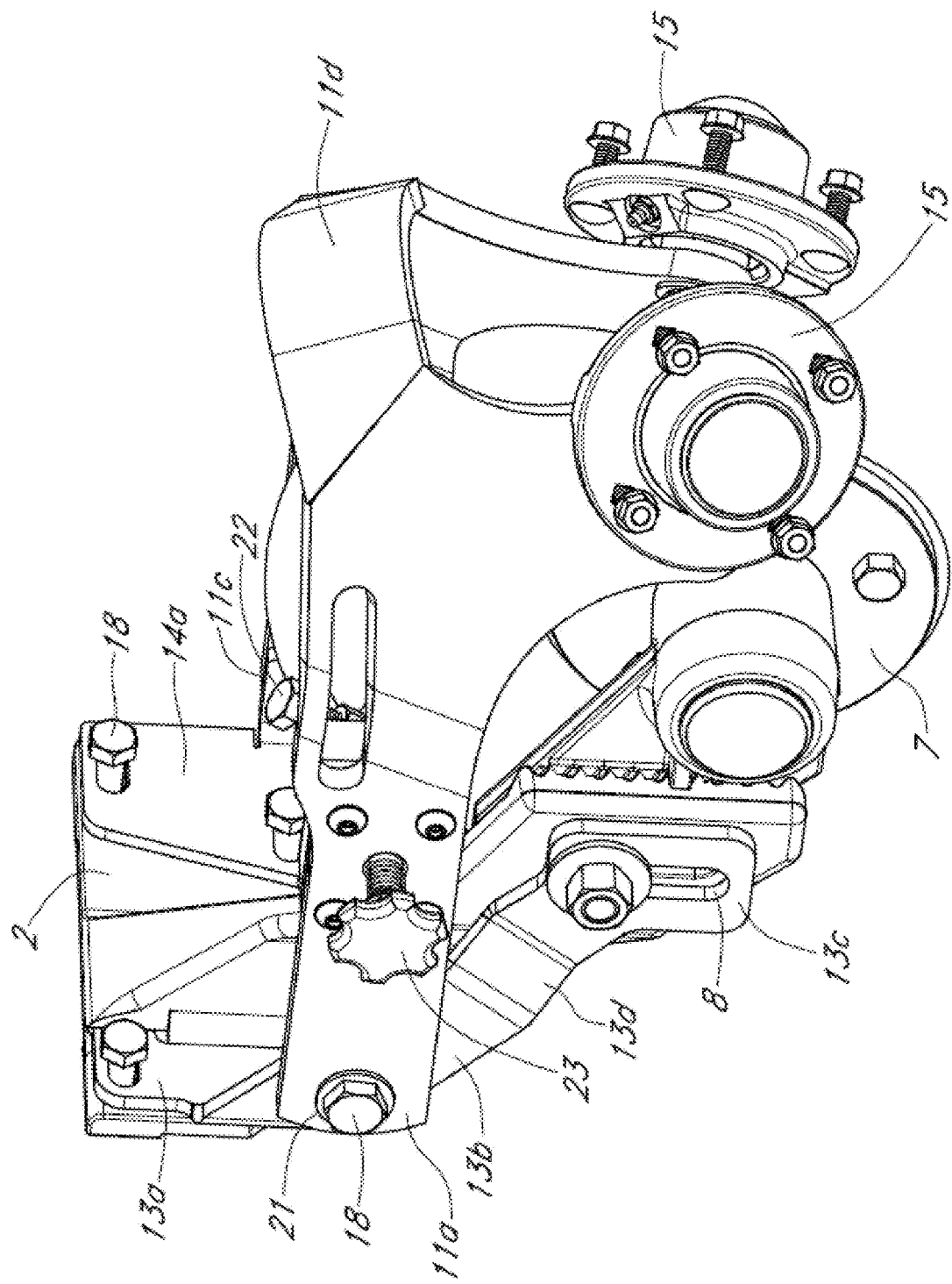

As shown in FIGS. 46 and 46A, a row cleaner frame, typically having either a generally U- or V-shape, may pivotally attach to the tool arm row cleaner mount 13 at the row cleaner frame portion and to the row cleaner frame mounting plate 14 at the row cleaner frame member 14b. In the exemplary embodiment, these pivotal attachments are achieved through an aperture 19 formed in the row cleaner frame portion 13b and another formed in the row cleaner frame member 14b that correspond to apertures 19 formed in the row cleaner frame 11. Nuts 17, bolts 18, and washers 21 are used to secure the row cleaner frame 11 to the tool arm row cleaner mount 13 and row cleaner frame mounting plate 14. However, in other embodiments not pictured herein, other structures and/or methods may be used to pivotally attach the row cleaner frame 11 to the tool arm row cleaner mount 13 and/or row cleaner frame mounting plate 14.

Figure 48:
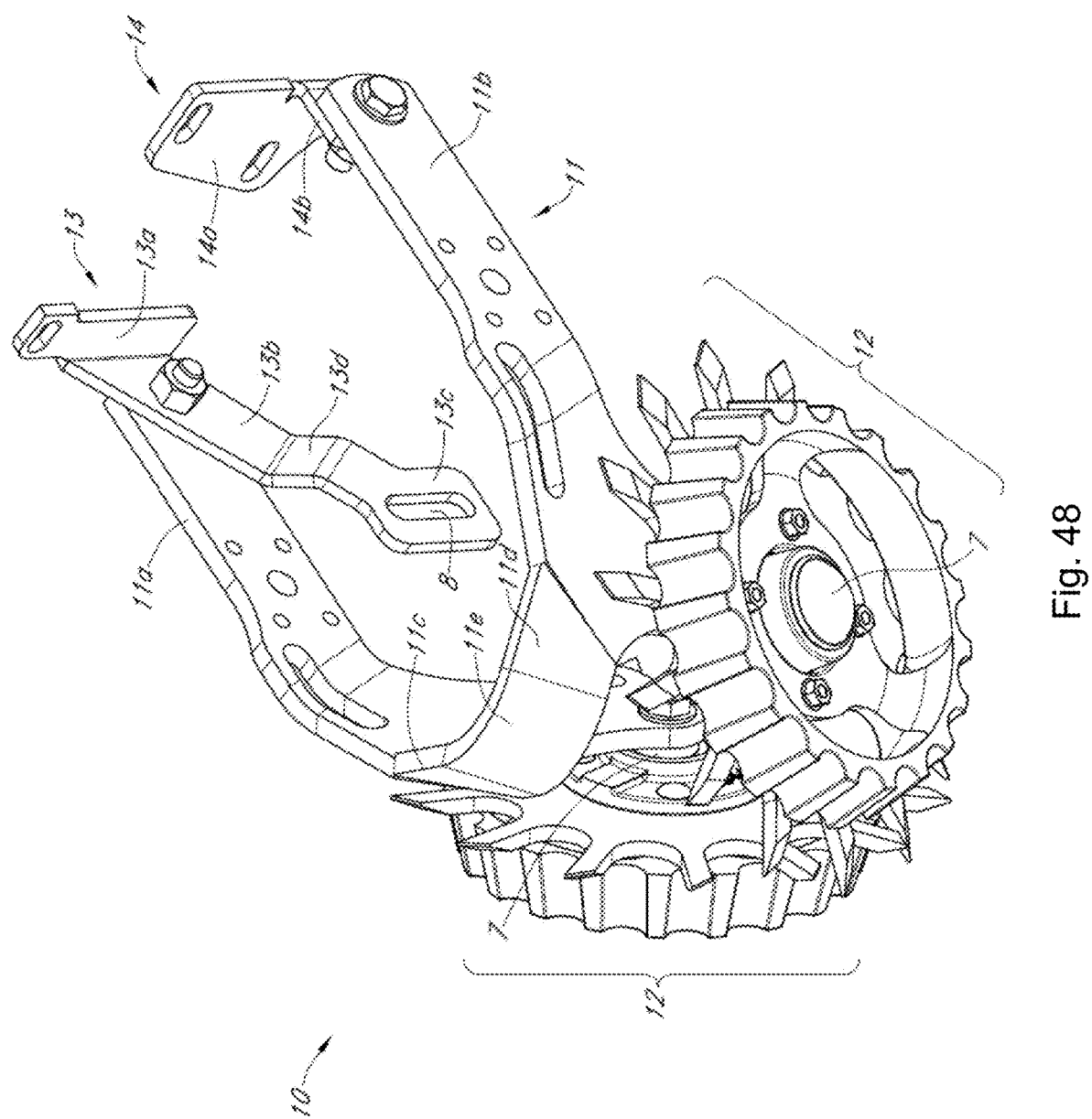
FIG. 48 provides a perspective view of the exemplary embodiment of a row cleaner assembly.
Figure 49:
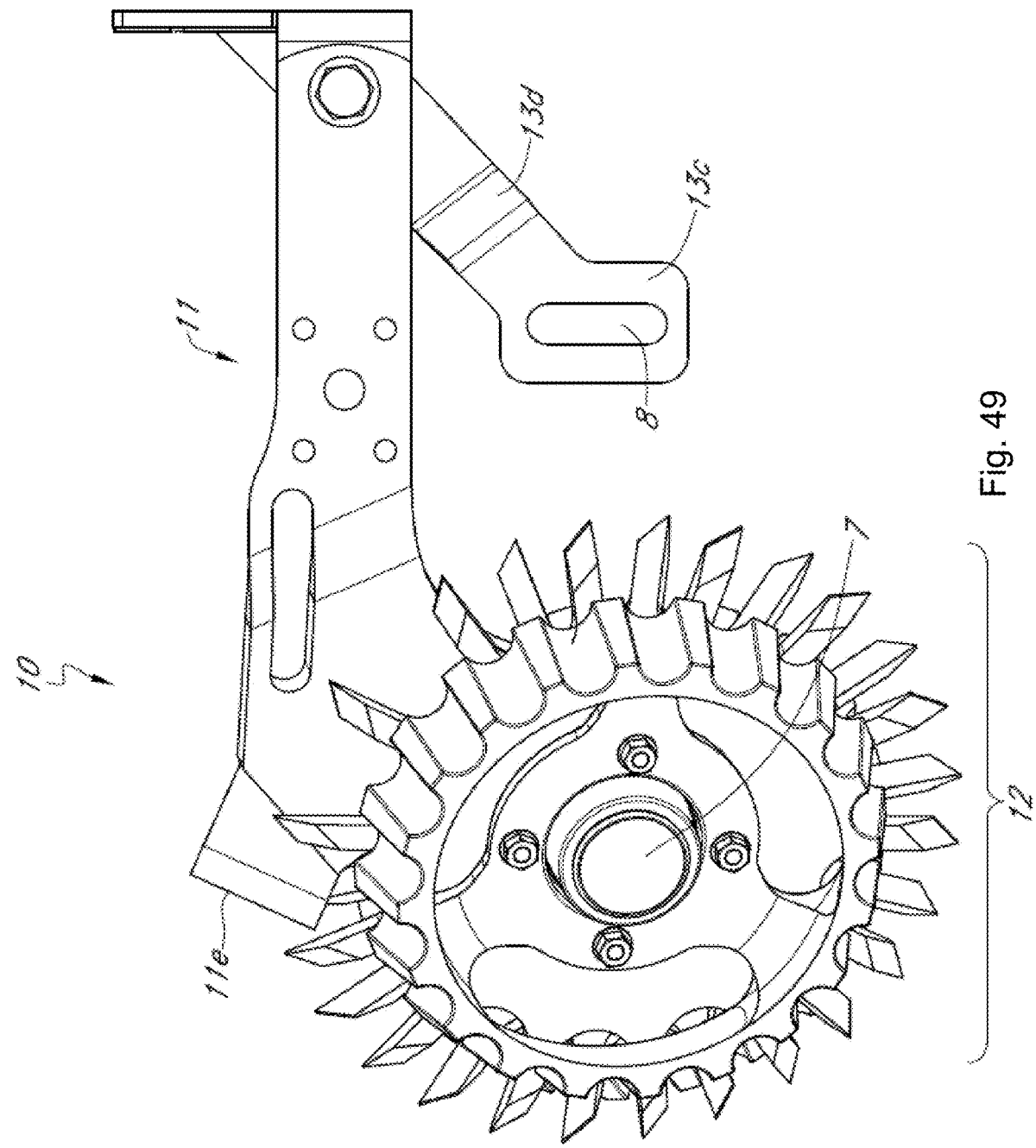
FIG. 49 provides a side view of the exemplary embodiment of a row cleaner assembly.
Figure 50:
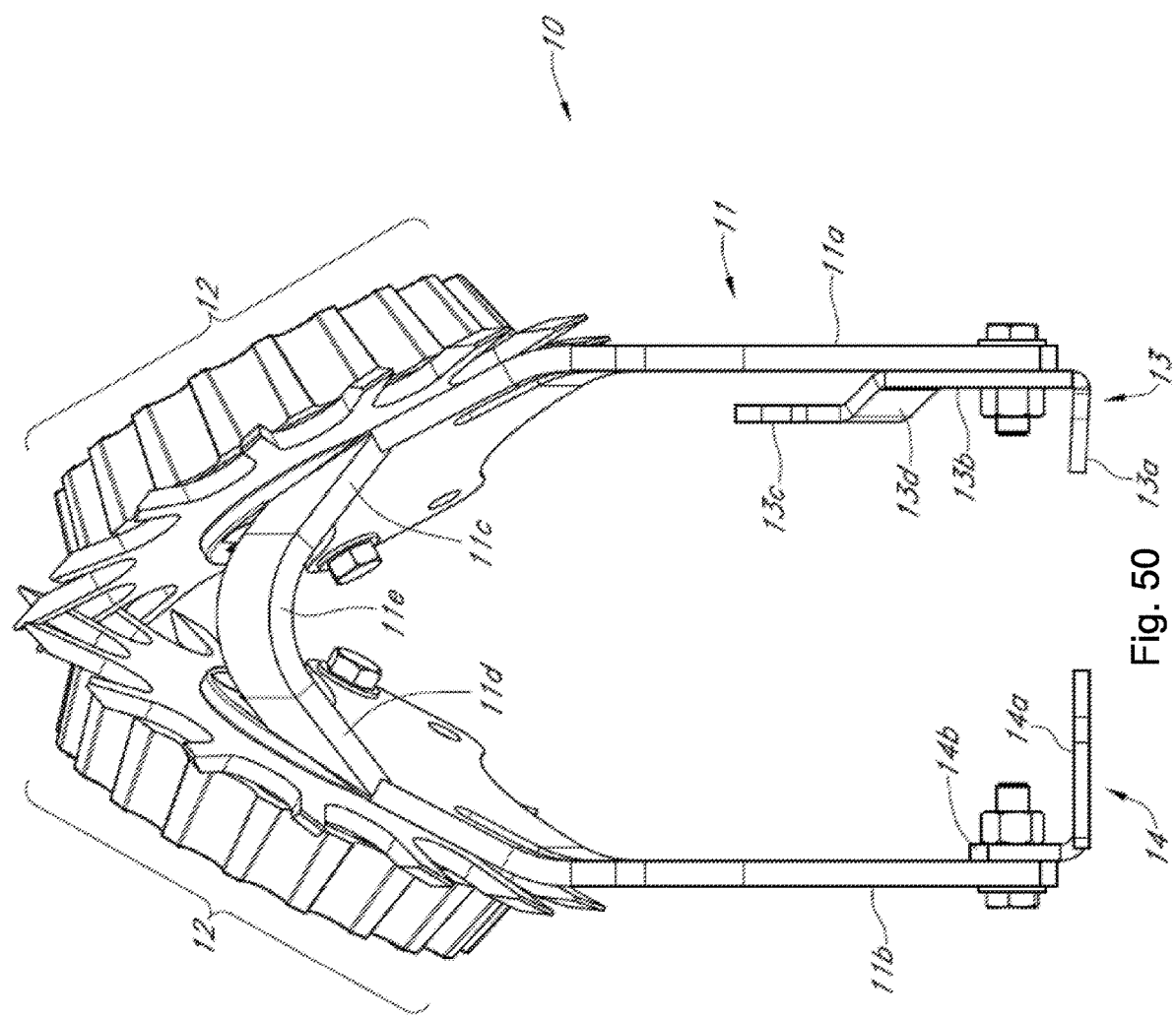
FIG. 50 provides a top view of the exemplary embodiment of a row cleaner assembly.

The row cleaner frame, which is shown in detail in FIGS. 48-50, is generally symmetrical with respect to a vertically oriented plane and extends from the front plate 2 in the same direction as the tool arm 6 (see FIG. 11). A first side 11a is pivotally attached to the tool arm row cleaner mount 13 and a second side 11b is pivotally attached to the row cleaner frame mounting plate 14. In the exemplary embodiment of the row cleaner assembly 10, the first and second sides 11a, 11b include sections that are substantially straight and sections that are angled, which are best shown in FIG. 50. The angle between the straight section and angled section of the first and second sides 11a, 11b will vary from one embodiment to the next, and in the exemplary embodiment is approximately twenty-five degrees. However, the precise angle in no way limits the scope of the row cleaner assembly 10.

Integrally formed with the first side 11a is a first side angled portion 11c, which is angled approximately twenty degrees with respect to the first side 11a. Integrally formed with the second side 11b is a second side angled portion 11d, which is angled approximately forty-five degrees with respect to the second side 11b. Affixed to and integrally formed with both the first and second side angled portions 11c, 11d is a curved portion 11e. In the exemplary embodiment, both the first and second sides 11a, 11b include hubs 7 pivotally mounted thereto to which row cleaner wheels 12 may be attached. The row cleaner frame 11 is configured such that it may be mounted over a coulter 5, wherein the coulter 5 and the row cleaner wheels 12 may simultaneously engage the ground surface (see FIGS. 46 and 47), and wherein the vertical position of the row cleaner frame 11 may change independently of the position of the tool arm 6.

The vertical position of the row cleaner frame 11 may be adjusted with respect to that of the tool arm 6 using an apparatus such as that described in U.S. Pat. No. 5,697,455 as well as in U.S. Pat. No. 9,642,298, both of which are incorporated by reference herein in their entirety. Accordingly, the row cleaner frame 11 in the exemplary embodiment is free to move away from the ground surface independently of the tool arm 6 until the row cleaner frame 11 or some element affixed thereto, such as a row cleaner wheel 12, meets an obstruction. The depth adjustment 22 provides a limit as to the amount of travel for the row cleaner frame 11 toward the ground surface, and thereby determines the vertical relationship between the row cleaner frame 11 and the coulter 5. The depth adjustment 22 may be manipulated by the user via the depth adjustment dial 23. Accordingly, the row cleaner frame 11 as shown in the exemplary embodiment provides a floating row cleaner, the advantages of which are well known to those skilled in the art.

As those practiced in the arts will appreciate, row cleaner wheels 12 are one structure for use in cleaning rows for agricultural purposes. Those of ordinary skill in the art will appreciate that the present art reduces residue plugging during operation and allows relatively narrow spacing between each of the two row cleaner wheels 12 mounted to a row cleaner frame 11 as well as allowing relatively narrow spacing between adjacent planter row units 1. As developed by the Applicant, the present art, when applied to a planter, allows for as little as fifteen-inch spacing between adjacent rows of seeds, which is useful and desired. A benefit of this configuration and operation is that less residue is uncovered or moved from the row area. As a result, trash flow is reduced thereby reducing planter row unit 1 plugging, which is beneficial and desirable.

As illustrated in the various figures show herein, the row cleaner wheels 12 may be angled with respect to the vertical axis. The vertical angle as shown in the exemplary embodiment is twenty-three degrees on each side, which results in a total of forty-six degrees between the row cleaner wheels 12. The row cleaner frame 11 may be configured to result in other combined vertical angle configurations of the row cleaner wheels 12 in the range of zero to ninety degrees.

In the exemplary embodiment as pictured herein, each row cleaner wheel 12 of a pair is symmetrical to the other row cleaner wheel 12 in that pair. In another embodiment not pictured herein, the row cleaner wheels 12 are still asymmetrical. As shown, each row cleaner wheel 12 is comprised of two non-equal diameter portions, which allows the user to control the amount of trash cleared by each row cleaner wheel 12 and simultaneously maintain depth control of each row cleaner wheel 12. That is, the smaller diameter portion restricts the depth of penetration of the larger diameter portion of each row cleaner wheel 12.

As one of ordinary skill will appreciate, the row cleaner assembly 10 may be configured for use and operation adjacent a plurality of row cleaner assemblies 10 and/or attached to a tool bar to form a contiguous planter unit (not shown). To modify the amount of trash cleared from each row, the row cleaner wheels 12 may be angled or positioned so that the periphery of adjacent row cleaner wheels 12 in a pair thereof intersect one another during use and operation for increased trash clearing. In another embodiment the row cleaner wheels 12 may be positioned so that the periphery of adjacent row cleaner wheels 12 do not intersect one another for less trash clearing.

Figure 51:
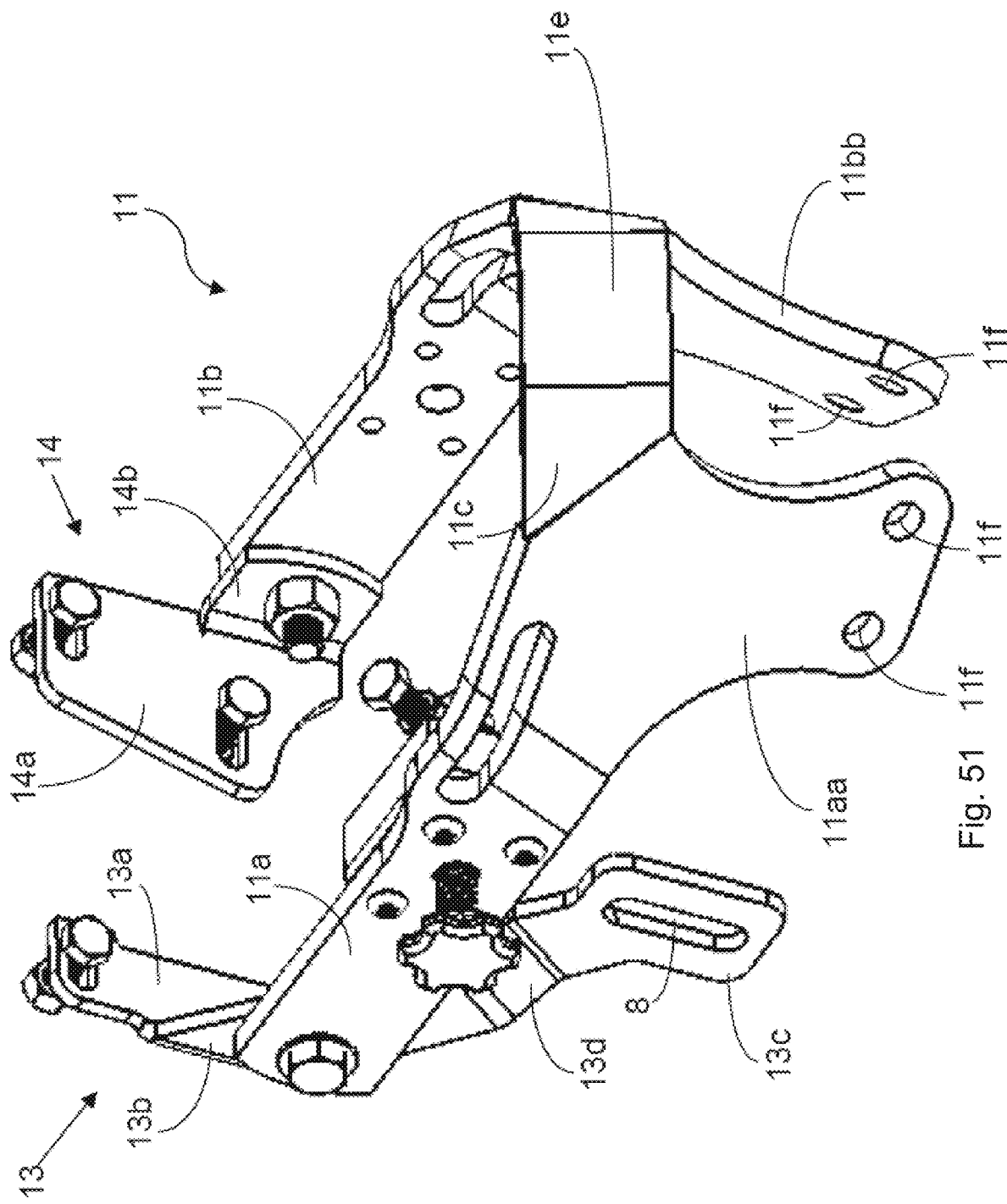
FIG. 51 provides a perspective view of one embodiment of the row cleaner frame with the coulter, row cleaner wheels, and various mounting structures removed for clarity.
Figure 52:
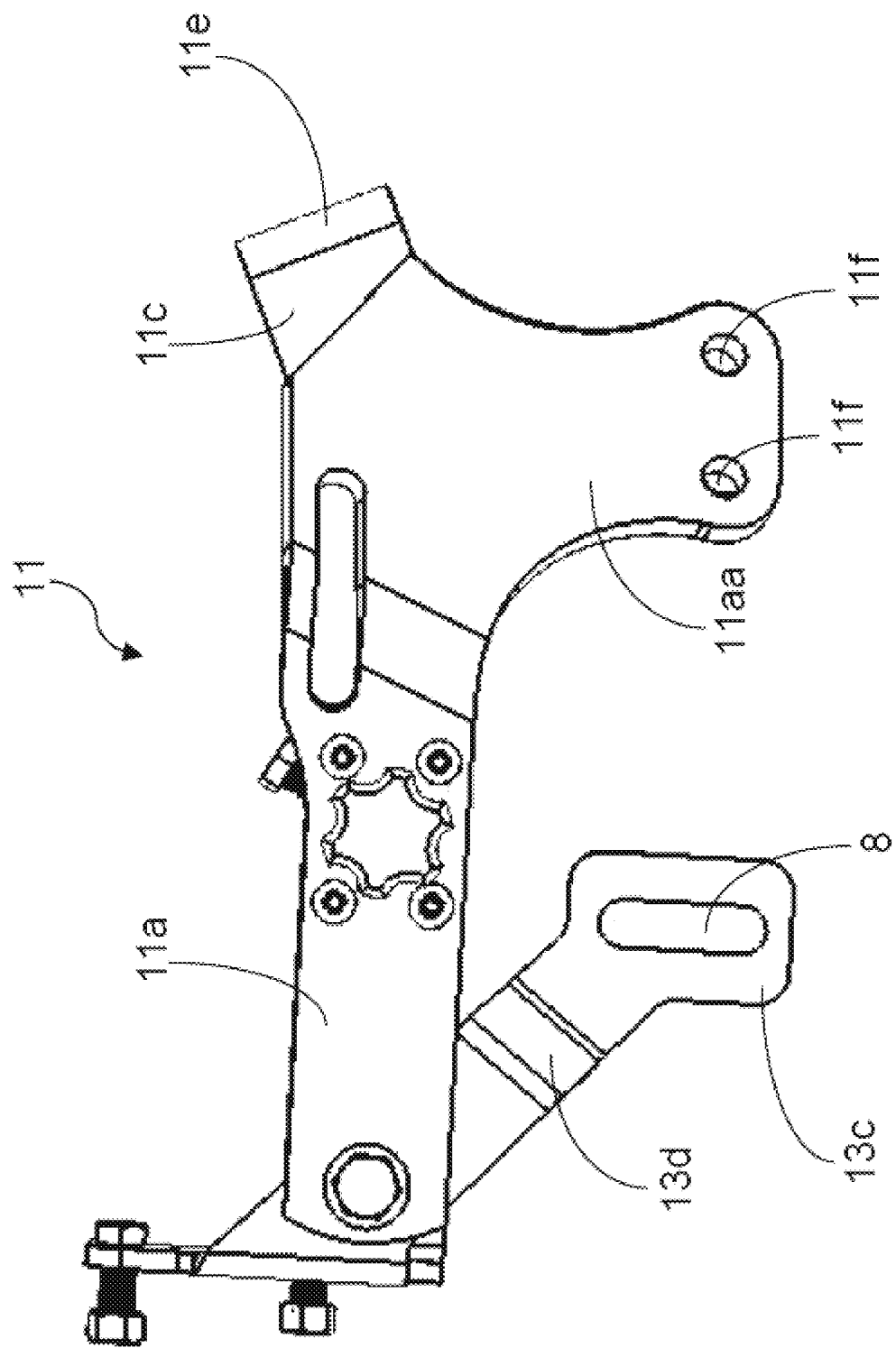
FIG. 52 provides a side view of one embodiment of the row cleaner frame with the coulter, row cleaner wheels, and various mounting structures removed for clarity.

As shown in FIGS. 51 and 52, the first side 11a may be formed with a first side tab 11aa, which extends below the first side 11a. The first side tab 11aa provides a lowered mounting point for the corresponding row cleaner wheel 12. The second side 11b may be formed with a similar second side tab 11bb. Either tab 11aa, 11bb may be formed with two row cleaner wheel apertures 11f. This allows the operator to position the row cleaner wheel 12 at two different positions on the row cleaner frame 11 so that the operator may select the optimal location based on specific conditions.

Figure 47:
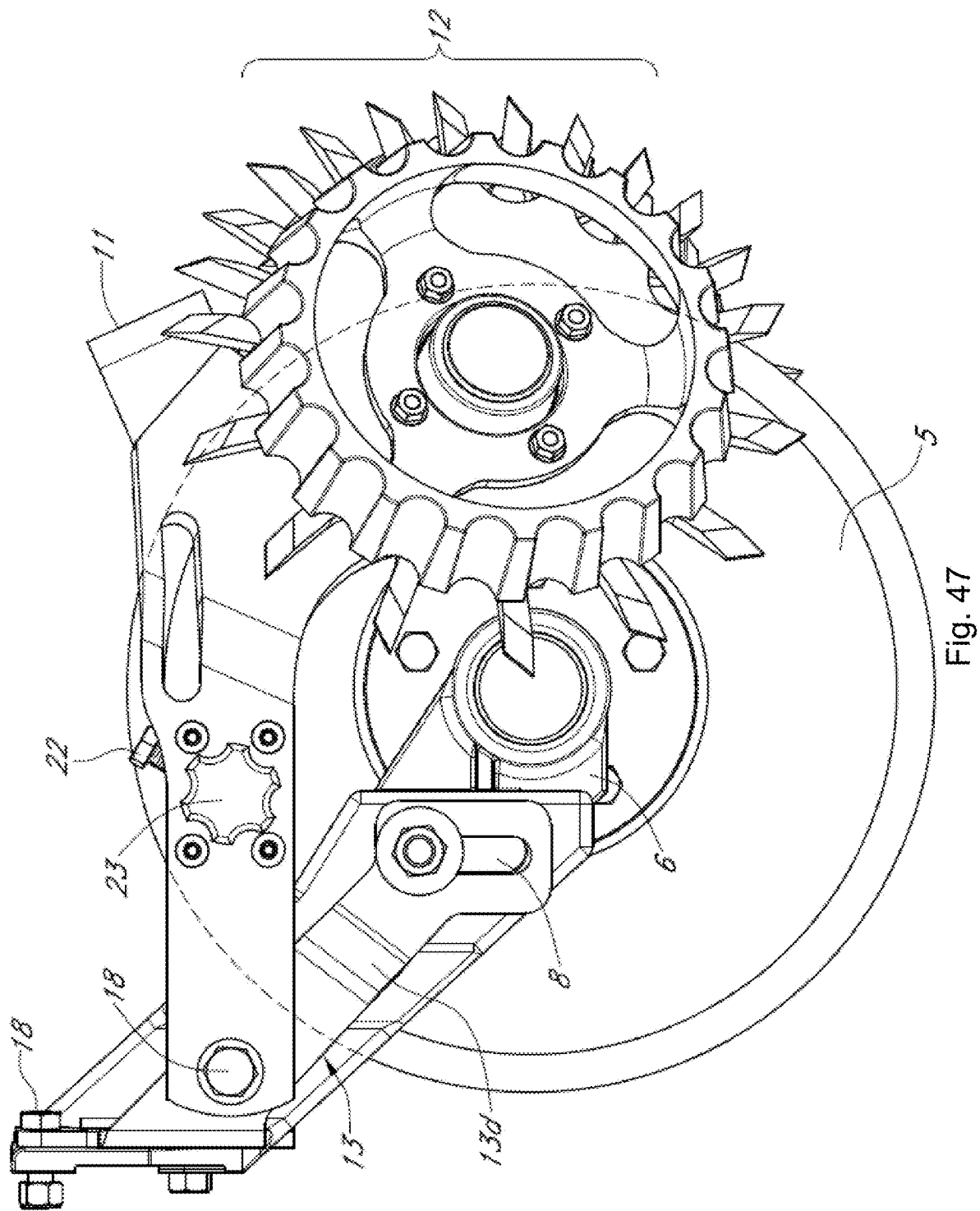
FIGS. 47 and 47A provide right side views illustrating one means of attaching applicant's row cleaner assembly to a front plate, and respectively with and without a coulter attached.
Figure 47A:
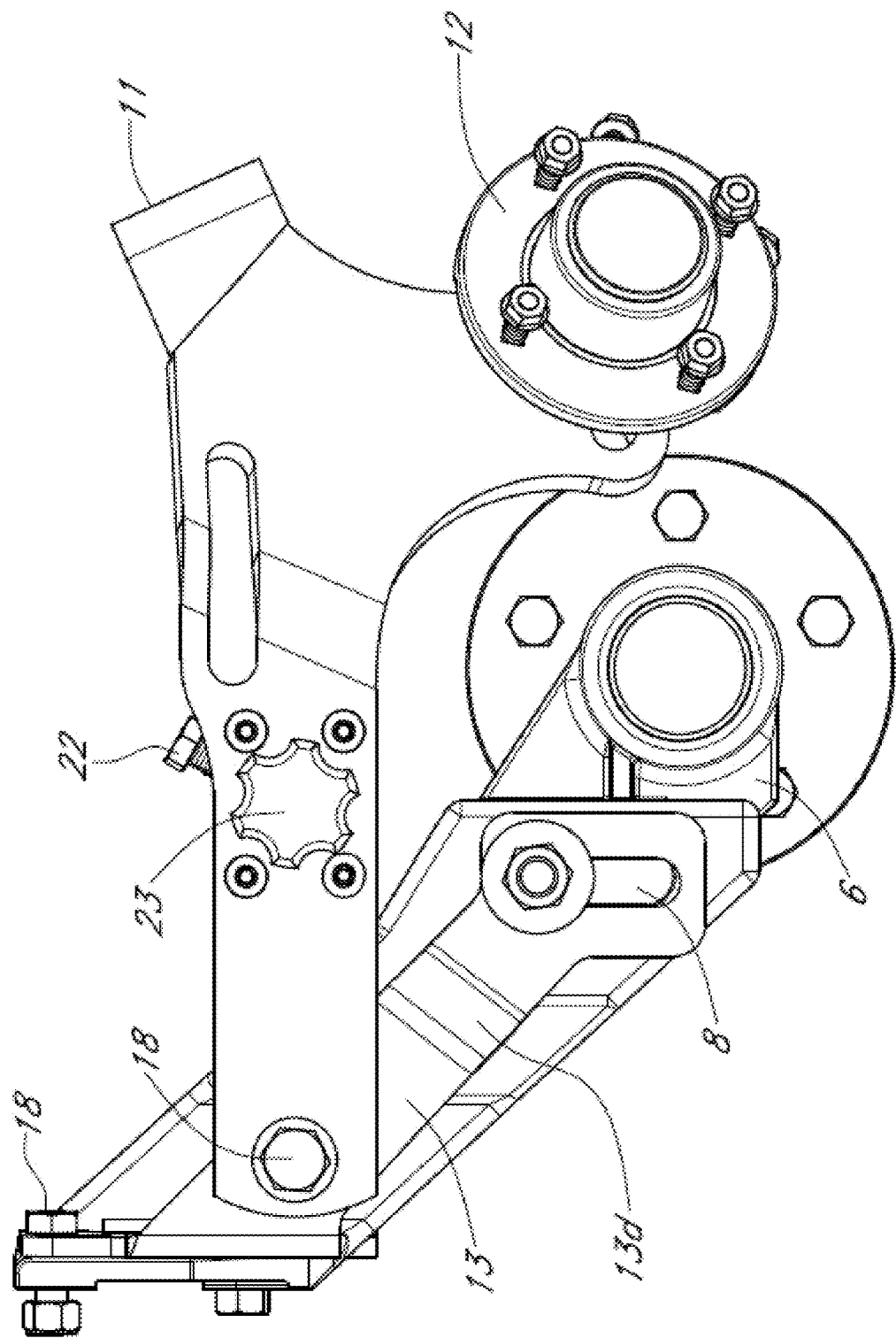

Providing a mounting point for the row cleaner wheel 12 that is below the first and second sides 11a, 11b of the row cleaner frame 11 allows the row cleaner assembly 10 to be more compact even when employed with additional structures, such as a coulter 5. Because the first and second side tabs 11aa, 11bb are lowered with respect to the other parts of the row cleaner frame 11, the row cleaner frame 11 may be placed in close proximity to an implement in the center of the row cleaner frame 11 while the row cleaner wheels 12 simultaneously are positioned in close proximity to the exterior sides of an implement in the center of the row cleaner frame 11. This situation is show in detail for a coulter 5 in FIG. 47, and without a coulter 5 in FIG. 47A. As shown, the tangential forward edge of the row cleaner assembly 10 (positioned toward the right in FIG. 47, and which is defined by the leading edge of the row cleaner wheels 12) is only marginally further forward than the tangential forward edge of the coulter 5. This compact dimension allows the row cleaner assembly 10 to be placed on a planter having multiple planter row units 1 even if the transport position for the planter requires that the row units be juxtaposed with one another about their respective length, such as the 1760 planter manufactured by Deere & Co.

As shown in FIG. 52, the axis of rotation for each row cleaner wheel 12 in the row cleaner assembly 10 is below the row cleaner frame 11. As explained in detail previously, this configuration allows the row cleaner frame 11 to be more compact in the horizontal dimension, even when used with an implement, such as a coulter 5.

Wireless Control System

As used herein, the term "downforce" may be interchangeable with the terms "downpressure" and/or "down pressure" without limitation unless so indicated in the following claims. Additionally, the term "hydraulic cylinder" may refer to any type of actuating device using pressurized fluid (e.g., air, petroleum-based liquids, etc.) including pneumatic cylinders without limitation unless so indicated in the following claims.

In certain applications, it may be desirable for an operator to have the ability to adjust the down pressure and/or downforce of one or more row cleaner assemblies 10 during operation. For example, U.S. Pat. No. 9,144,189, which is incorporated by reference herein in its entirety, discloses a downforce controller for adjusting the pressure of a hydraulic cylinder coupled to a row unit and a toolbar, which in turn adjusts the downforce of the row unit on the ground surface. However, such apparatuses require cumbersome and/or space-consuming controllers and/or control boxes to be mounted to a prime mover, such as a tractor, and oftentimes in the cab of a prime mover to ease access of an operator to the controller and/or control boxes.

Accordingly, in an aspect of the present invention, a wireless control system allows an operator to adjust the downforce of a row unit (and/or row cleaner assembly 10 without limitation unless so indicated in the following claims) via wireless communication, which may be accomplished via a portable computing device (including but not limited to a smartphone, tablet, laptop computer, PDA, and the like) without limitation unless so indicated in the following claims. A requirements specification for various aspects of such a wireless control system is attached hereto and made a part of this disclosure in its entirety as Appendix A, and a system proposal for same is attached hereto and made a part of this disclosure in its entirety as Appendix B.

Figure 52A:
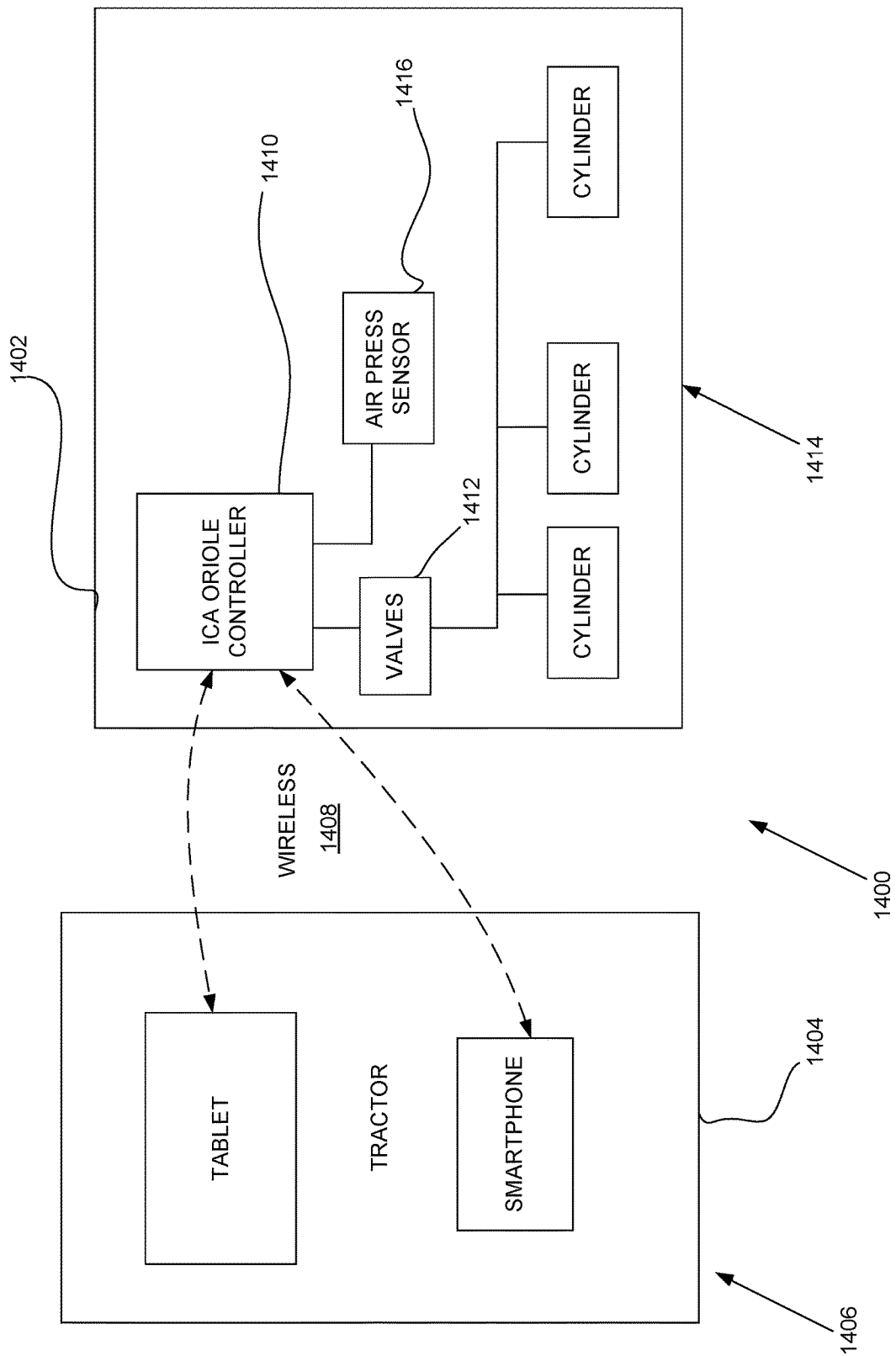
FIG. 52A provides a schematic view of one aspect of a wireless control system.
Figure 52B:
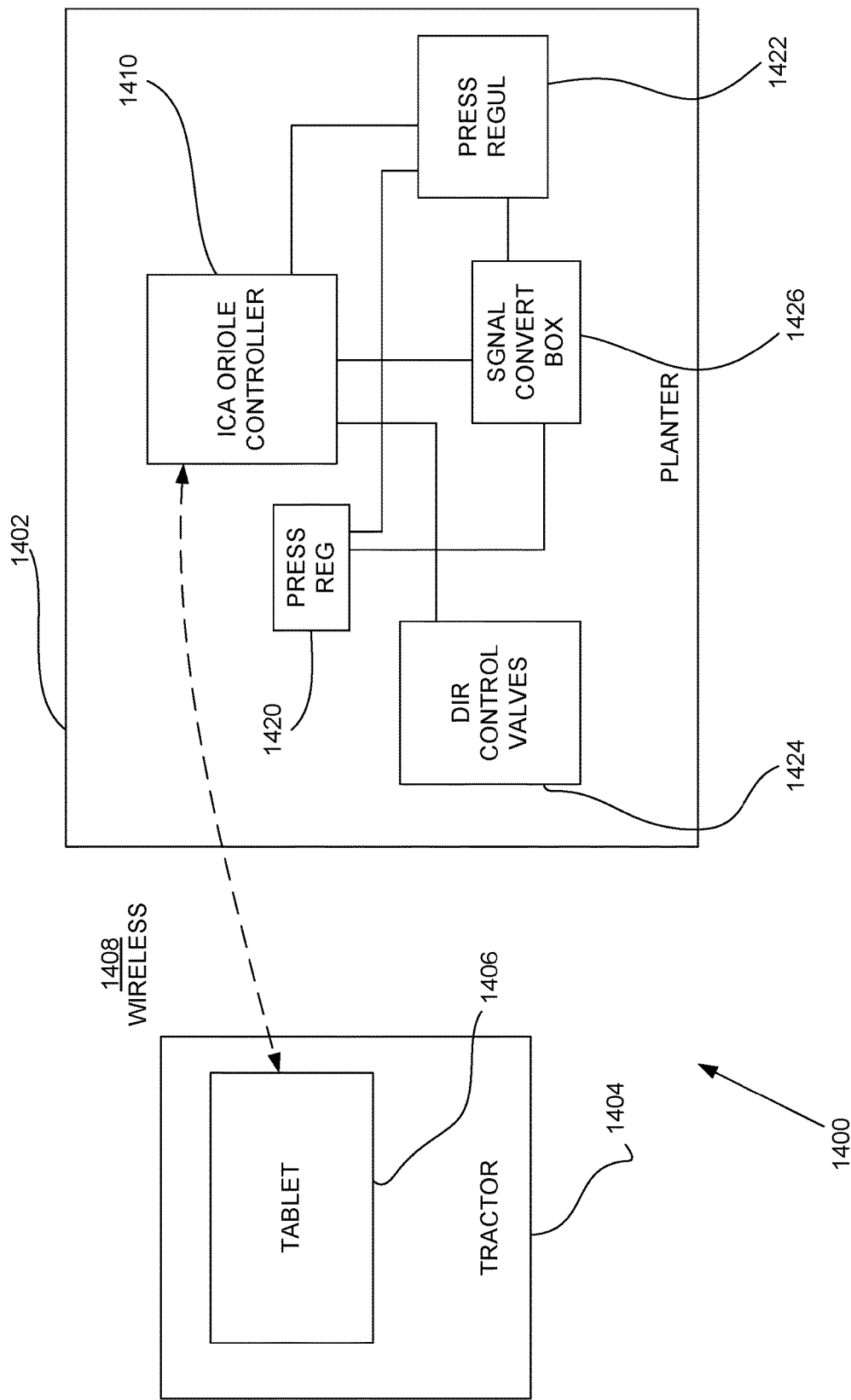
FIG. 52B provides a schematic view of additional components that may be used with the wireless control system show in FIG. 52A.

With reference to FIG. 52B, This system uses a single JCA Oriole controller as the implement controller that interfaces with two pressure regulators and directional control valves. A signal converter box is used to convert PWM signals from the Oriole controller to analog voltages in the range of 0-5V to set the target pressure for each of the pressure regulators. The pressure regulators each have integrated pressure sensors that feedback the actual measured pressure to the Oriole controller. Directional control valves are then used to extend or retract cylinders within the system, these valves are driven directly from the Oriole controller. The operator uses an app running on a tablet or smartphone to command the system pressure set points and directional control valves, and monitor the feedback for the actual pressure for each bank.

As disclosed in detail in Appendix B, in an aspect the wireless control system, various configurations and/or control schemes may be used without limitation unless so indicated in the following claims. For example, in one aspect the wireless control system may be configured to control one set of valves for a bank of hydraulic cylinders while maintaining the fluid pressure in the system in a specific window between a low and high value. In another aspect, the wireless control system may be configured to use the linear position of one or more hydraulic cylinders to ensure the desired amount of downforce is applied to a given row unit, wherein it is contemplated that such a configuration may provide more accuracy than a configuration controlling the fluid pressure of one or more cylinders. However, the optimal configuration may vary from one application to the next, and is therefore in no way limiting to the scope of the present disclosure unless so indicated in the following claims.

Referring now to FIG. 52A, which provides a schematic view of certain aspects of a first embodiment of the wireless control system, and FIG. 52B, which provides a schematic view of all but the pneumatic components of a wireless control system, in an aspect of a wireless control system configured to control the fluid pressure within one or more hydraulic cylinders. One or more microprocessors may be configured to drive one or more valves controlling one or more hydraulic cylinders. The hydraulic cylinders may be connected with one another via common hydraulic or pneumatic fluid conduit. The microprocessor may be programmable logic controller (PLC), e.g., a JCA Oriole Controller manufactured by JCA Industries Inc. of Winnipeg, Manitoba, Canada (http://www.jcaelectronics.ca/wp-content/uploads/2014/10/JCA_Oriole_Info_Sheet_Web.pdf) and in connection with a mid-level controller such as a JCA Falcon Controller (http://www.jcaelectronics.ca/products/falcon-mid-level-controller/), or any other suitable controller without limitation unless so indicated in the following claims.

FIG. 52A is a first exemplary embodiment of an air pressure control system 1400 having a relatively, when compared to the additional embodiments disclosed hereafter, lower accuracy for depth control of the row cleaner. In this system all cylinders 1414 on all rows are ganged or controlled together based on a common target air pressure level. In this embodiment, JCA controller 1410 controls cylinders 1414 via an output to pressure control valves 1412 and receives as an input a signal from air pressure sensor 1416. An operator, such as in tractor 1404, controls downforce control system via controller 1410 over communications link or network 1408 (e.g., Bluetooth, or other suitable communication link) through use of a handheld device 1406, such as a tablet or a smart phone.

The air pressure controlled system is the most straightforward of the two options, but would have less accuracy than the position feedback system. This system consists of a single JCA Oriole controller (see internal App. A for controller details), that drives valves controlling cylinders that are connected together on common air lines. An air pressure sensor is connected to the common line to measure the pressure in the system. A target pressure is set through an app on the tablet and/or smartphone, and communicated to the Oriole controller over Bluetooth. The controller will drive the valves to either increase or decrease the pressure to achieve the target pressure set by the system.

A fluid pressure sensor may be connected to a common hydraulic fluid conduit to measure the fluid pressure within the system. The fluid pressure sensor may be in communication with the controller, and the controller may be in communication with the portable computing device, which communication may be either wired or wireless (e.g., Bluetooth, various 802.11 protocols, etc.) without limitation unless so indicated in the following claims. Based on the data the fluid pressure sensor provides to the controller, the controller may cause one or more valves to open and/or close to maintain the desired system pressure. An operator may adjust/set the desired system pressure via a graphical user interface (GUI) that may be displayed on the portable computing device and communicated therefrom to the controller.

Figure 53A:
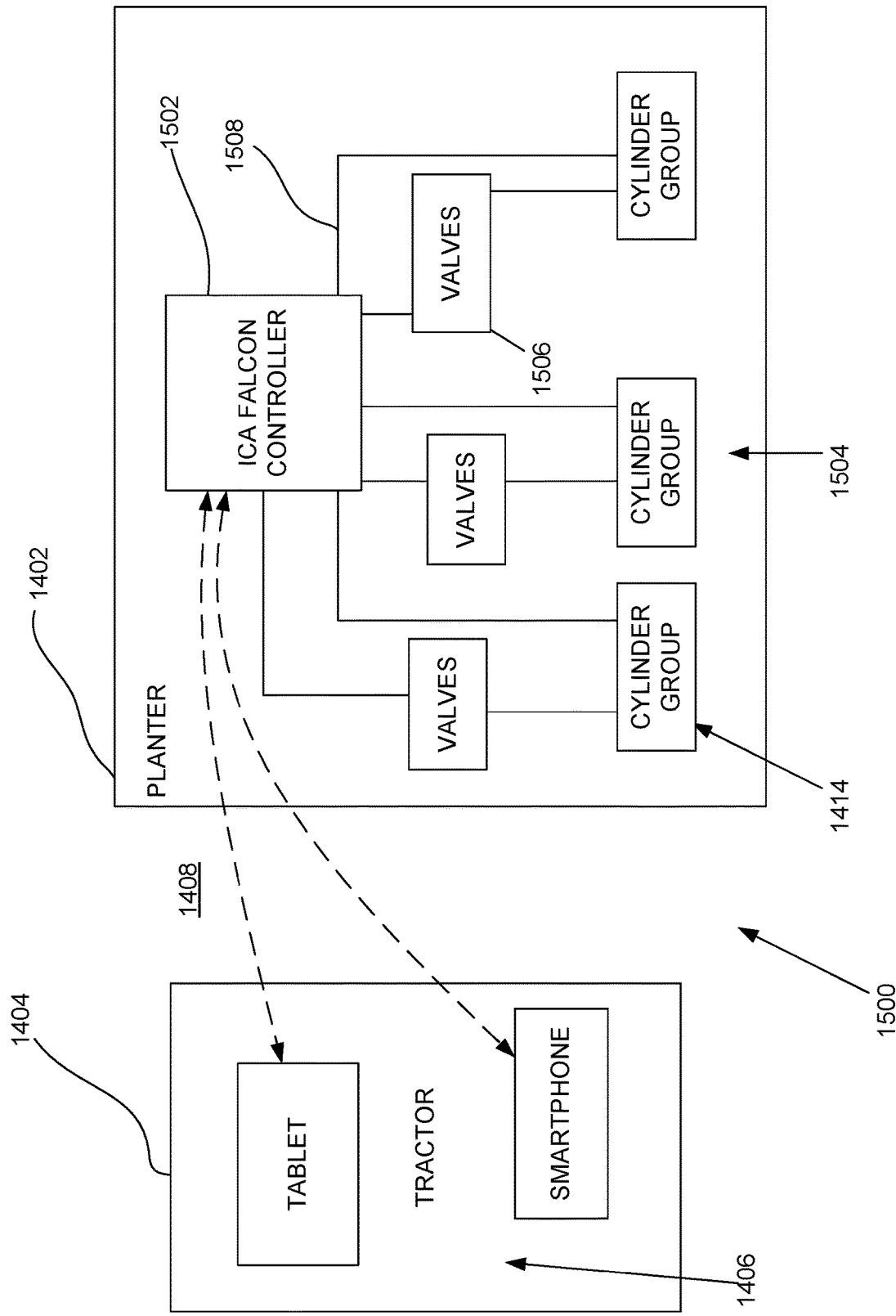
FIG. 53A provides a schematic view of other aspects of a wireless control system.

Referring now to FIG. 53A, which provides a schematic view of certain aspects of a wireless control system, in an aspect of a wireless control system configured to maintain a specific position of one or more hydraulic cylinders, a controller may be in communication with one or more valves. As with the wireless control system depicted in FIG. 52A, that depicted in FIG. 53A may employ any suitable controller without limitation unless so indicated in the following claims. For certain applications it is contemplated that a JCA Falcon Controller may be especially useful.

FIG. 53A is a second exemplary embodiment of an air pressure control system 1500 having a relatively, when compared to the above first embodiment, higher accuracy for depth control of the row cleaner. In this system groupings 1504 of cylinders 1414 are controlled separately as groups based on a common target air pressure level. In this embodiment, JCA controller 1410 controls cylinders 1414 via an output to zone pressure control valves 1506 and receives as inputs linear position feedback signals 1508. Again, an operator, such as in tractor 1404, controls downforce control system via controller 1502 over communications link or network 1408 (e.g., Bluetooth, or other suitable communication link) through use of a handheld device 1406, such as a tablet or a smart phone. In this case controller 1502 is, for example, the JCA Falcon Controller type. In this embodiment, the system 1500 groups cylinders 1414 into groups of four cylinders with each group or set controlled together by a single set of valves with linear position feedback used to regulate the system.

The system of FIG. 53A uses position feedback built into the pneumatic cylinder to maintain a target specified by the user through the smartphone/tablet app. In this option, groups of 4 cylinders (4 rows) are controlled with a single set of valves, and only the position feedback of one of the cylinders is used to measure the current position. It is assumed that the other cylinders are following the measured cylinder. In this system, a Falcon controller (see internal App. B for controller details) is used which has sufficient inputs and outputs to control up to 6 sections, each containing 4 rows (or a 24 row system). If more rows are required, a second Falcon controller could be used. The user can choose to set different target depths for each of the 4 row sections, or can chose to group each of the sections together to set a common depth. The user then can select the desired depth of each section, and configurations can be stored, named with custom names, and loaded at a later time to automatically return to preset depths.

Each valve may control fluid pressure to one or more hydraulic cylinders. In an aspect shown in FIG. 53A, each valve may control the fluid pressure to a group of four hydraulic cylinders, but the scope of the present disclosure is not so limited unless so indicated in the following claims.

In an aspect, the position feedback of one hydraulic cylinder within a group may be provided to the controller to provide a representative position for each hydraulic cylinder within the group. As with the wireless control system depicted in FIG. 52A, the controller may be in communication with the portable computing device, which communication may be either wired or wireless (e.g., Bluetooth, various 802.11 protocols, etc.) without limitation unless so indicated in the following claims. Based on the data the position sensor of a hydraulic cylinder provides to the controller, the controller may cause one or more valves to open and/or close to maintain the desired hydraulic cylinder position. An operator may adjust/set the desired hydraulic cylinder position via a graphical user interface (GUI) that may be displayed on the portable computing device and communicated therefrom to the controller.

Figure 53B:
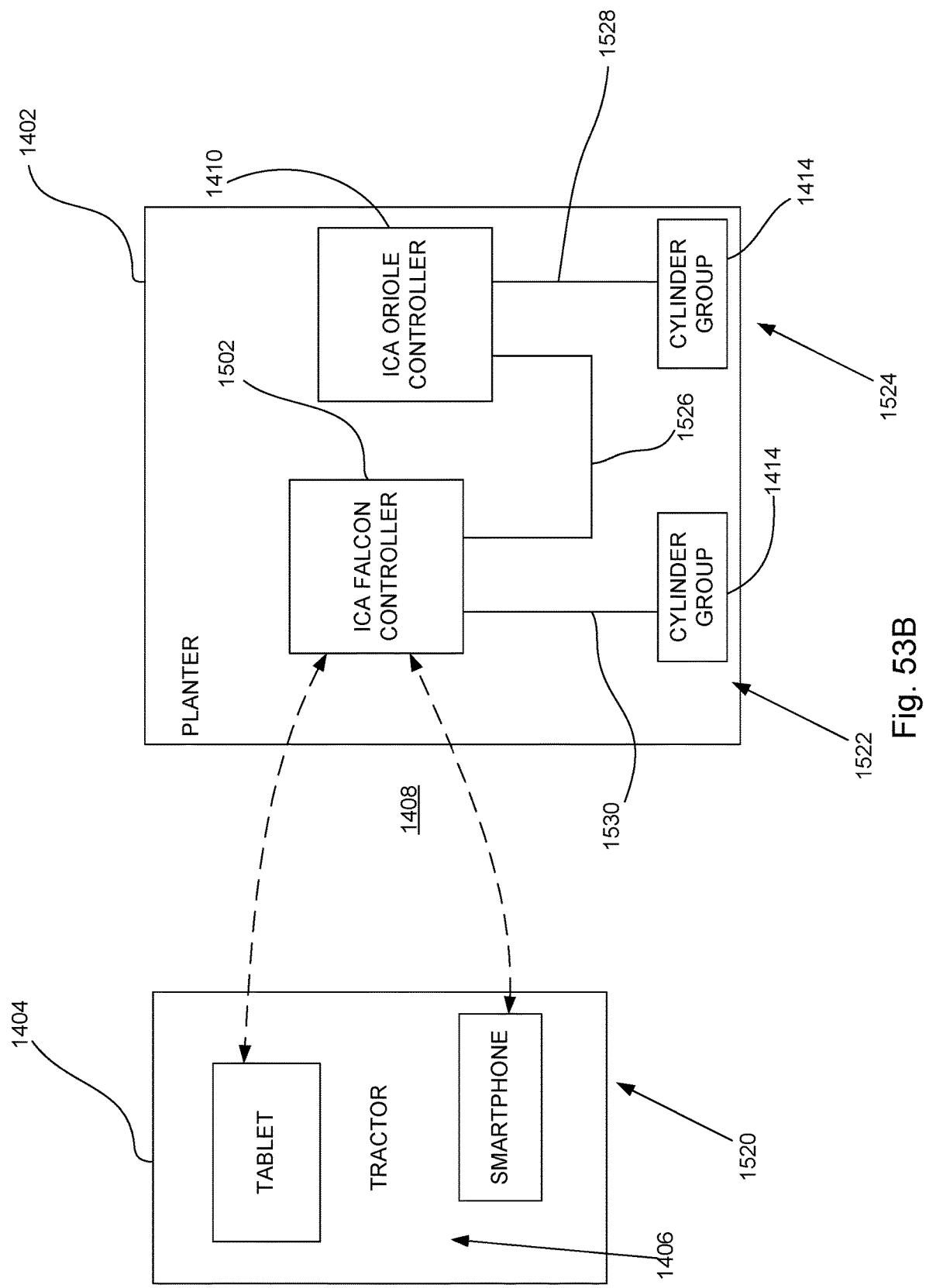
FIG. 53B provides a schematic view of other aspects of a wireless control system that may be adapted to allow individual adjustment of each hydraulic cylinder.
Figure 53C:
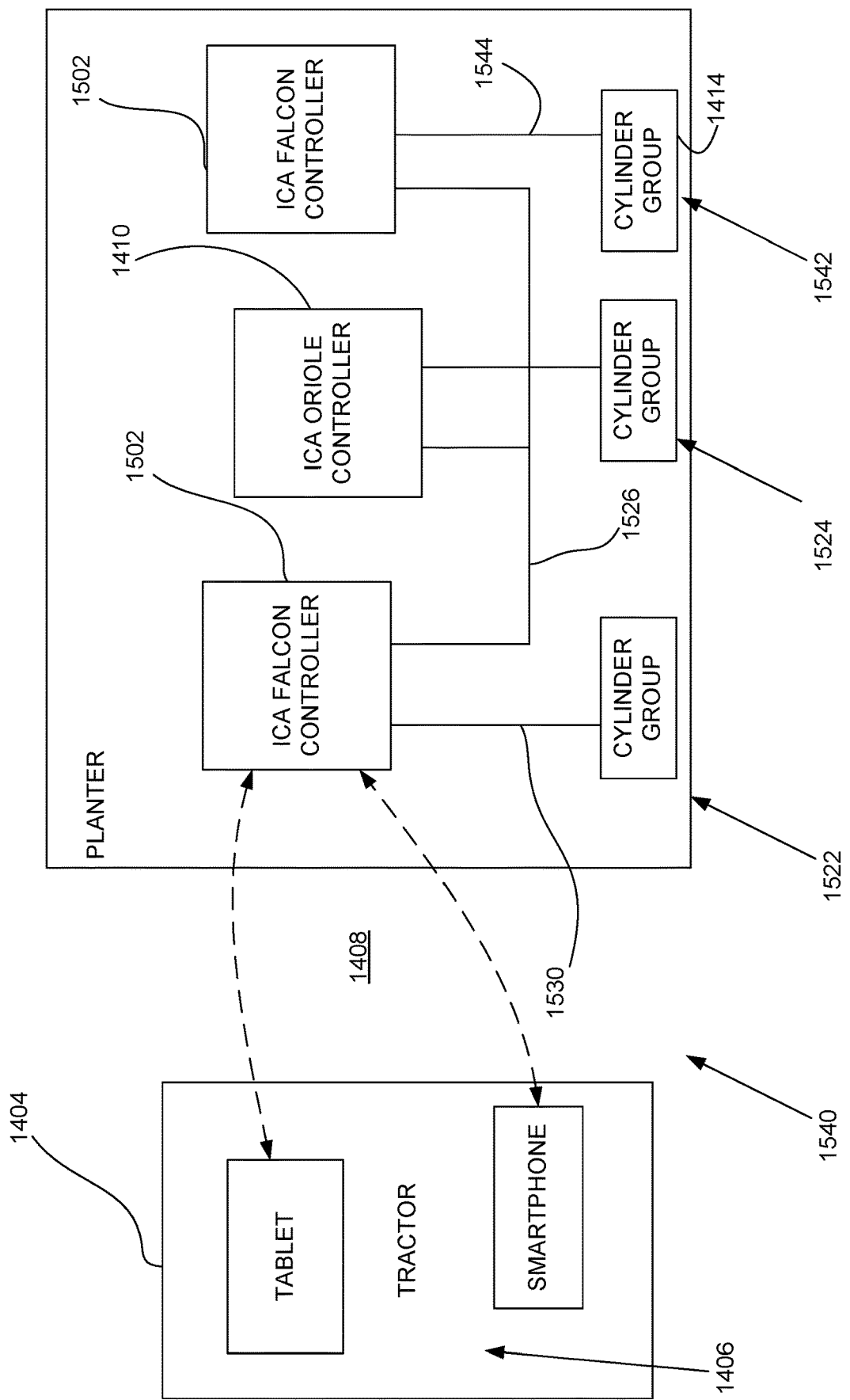
FIG. 53C provides a schematic view of other aspects of a wireless control system that may be adapted to allow individual adjustment of each hydraulic cylinder.
Figure 53D:
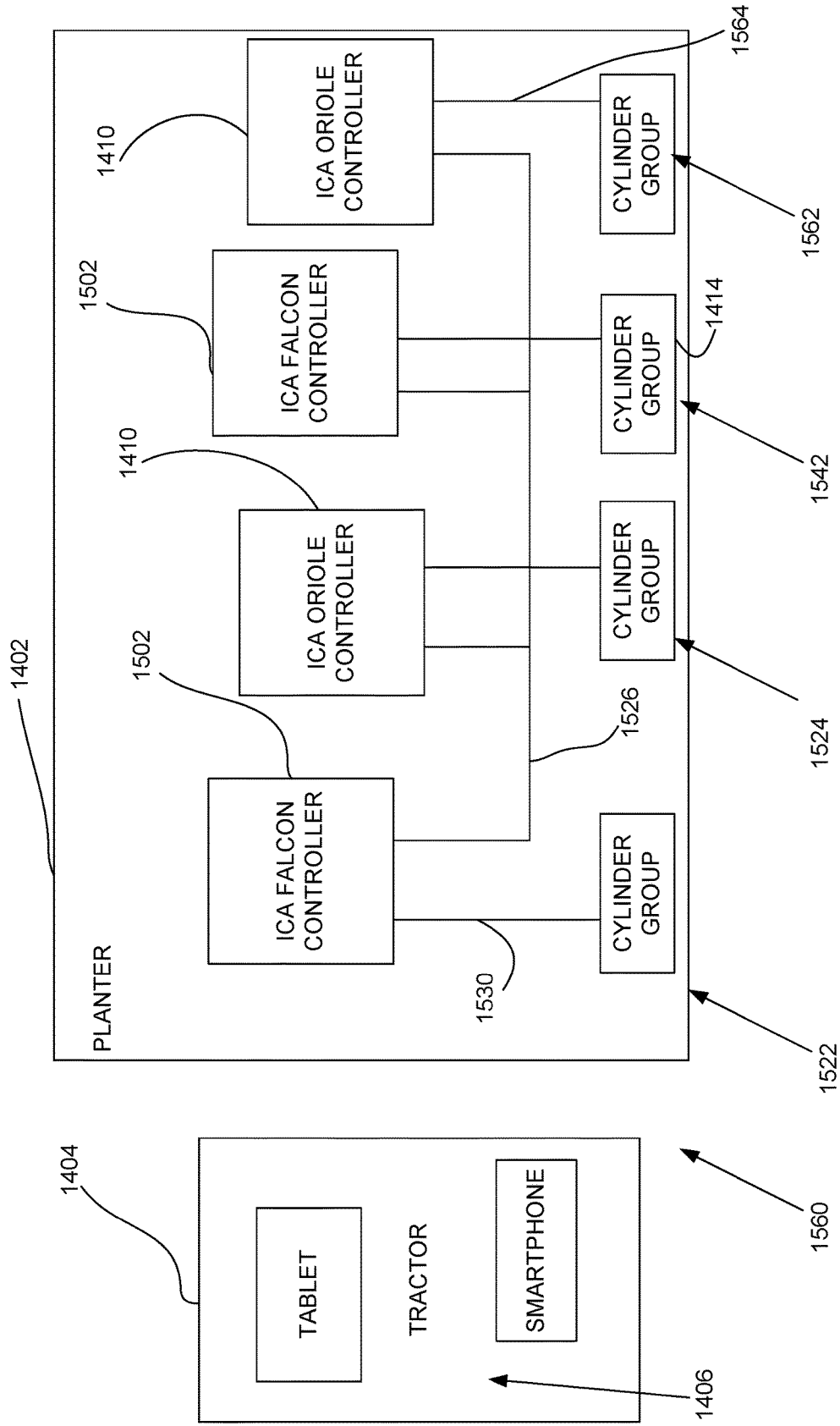
FIG. 53D provides a schematic view of further aspects of a wireless control system that may be adapted to allow individual adjustment of each hydraulic cylinder.
Figure 53E:
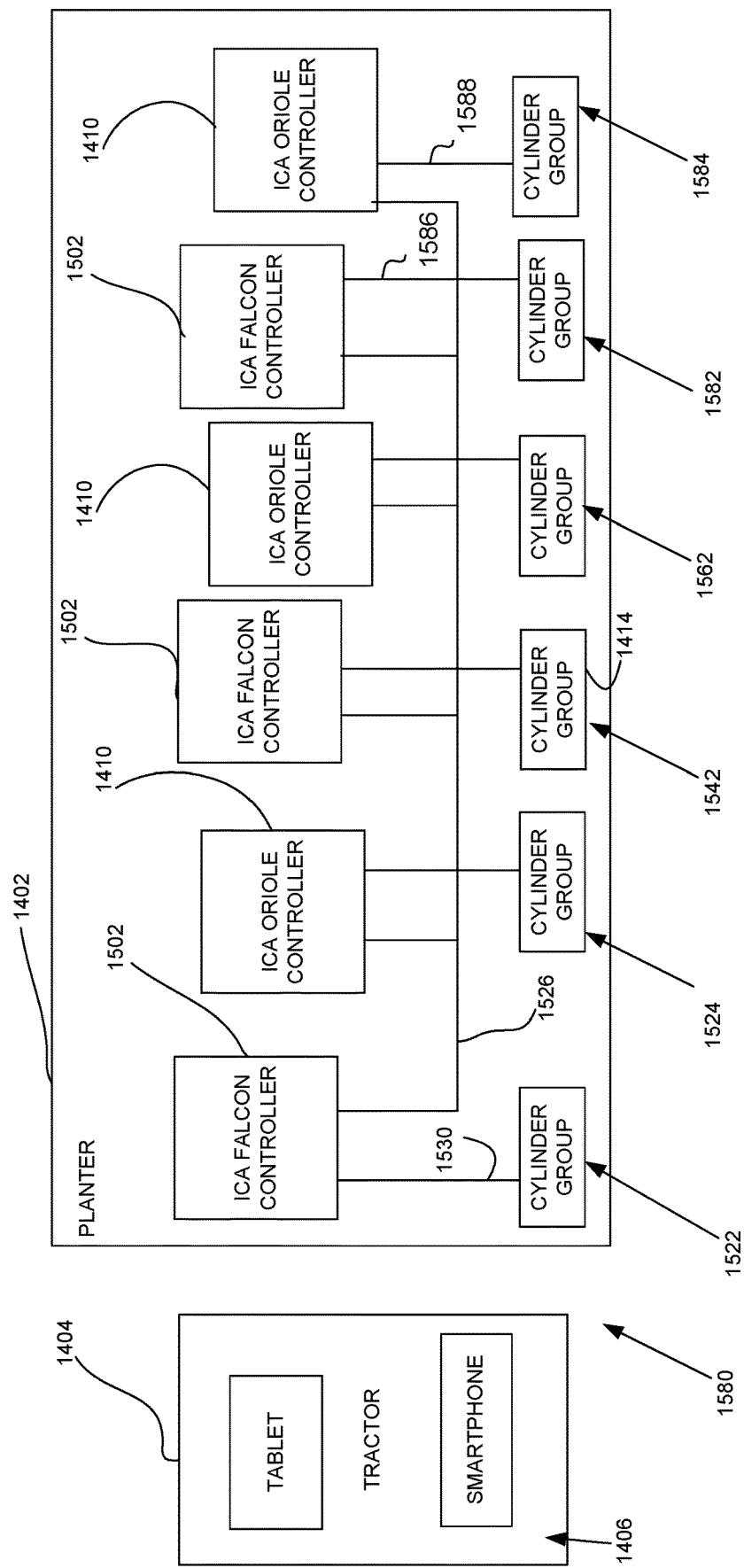
FIG. 53E provides a schematic view of further aspects of a wireless control system that may be adapted to allow individual adjustment of each hydraulic cylinder.

In an aspect, the wireless control system may be configured such that an operator may set a desired position for each individual hydraulic cylinder on a given implement. Various aspects of such a wireless control system adapted for use with an eight-row planter is shown in FIG. 53B. Various aspects of such a wireless control system adapted for use with a twelve-row planter is shown in FIG. 53C, with a sixteen-row planter is shown in FIG. 53D, and with a twenty-four-row planter is shown in FIG. 53E. However, the scope of the present disclosure is in no way limited by the number of hydraulic cylinders and/or rows of a row planter for which a wireless control system is configured unless so indicated in the following claims.

It is contemplated that wireless control systems configured to adjust the position of individual hydraulic cylinders may require additional control valves and/or additional controllers. Accordingly, as shown in FIGS. 53B-53E, a master controller may be configured to control one or more slave controllers. In an aspect, the master controller may be in communication with the portable computing device, and the slave controller(s) may be in communication with the master controller and/or with other slave controllers. In an aspect, it is contemplated that the communication between controllers (master-to-slave communication or slave-to-slave communication) may be through the CAN bus. However, other communication conduits may be used (either wired or wireless) without limitation unless so indicated in the following claims.

FIG. 53B is a third exemplary embodiment of an air pressure control system 1520 having a relatively, when compared to the embodiments disclosed above, higher accuracy for depth control of the row cleaner in an eight row configuration. In this system, as with that of FIG. 53A cylinders are placed and controlled in groups. Here, groupings 1522 and 1524 of cylinders 1414 are controlled separately as groups. In this embodiment, a master JCA Falcon controller 1502 is connected via a CAN bus 1526 to JCA controller 1410 and collectively control cylinder groups 1522 and 1524 via outputs to zone pressure control valves and are connected to cylinder groups via control and feedback signals 1528 and 1530. Again, an operator, such as in tractor 1404, controls downforce control system via controller 1502 over communications link or network 1408 (e.g., Bluetooth, or other suitable communication link) through use of a handheld device 1406, such as a tablet or a smart phone.

This system is similar to that of FIG. 53A in that linear position feedback is used to determine the depth of the row, but this option has independent control of each individual row. This option would have the highest accuracy and flexibility, but would require a larger number of controllers and valves (depending on the number of rows in the system). In this case each row could have its own depth target, or they can be grouped together with the same target (groups can be any different combination of rows), but the depth target for each row will be maintained based on the position feedback of that row. In this configuration, one Falcon controller is a master in a system with potentially multiple slave controllers that are connected to each other over the CAN bus. The master controller communicates to the tablet/smartphone app over Bluetooth, and then commands each of the slave controllers in the system. Each Falcon controller would be used to control 5 rows, and each Oriole controller would be used to control 3 rows.

FIG. 53C is a fourth exemplary embodiment of an air pressure control system 1560 for providing depth control of the row cleaner in a twelve row configuration. In this system, as with that of FIG. 53B groupings 1522 and 1524 of cylinders 1414 are controlled separately as groups by a master JCA Falcon controller 1502 connected via a CAN bus 1526 to JCA controller 1410. In this embodiment, an additional JCA Falcon controller 1502 is used to control additional cylinder group 1542 and includes control and feedback signal 1544 in a manner similar to that described above in connection with FIG. 53B.

FIG. 53D is a fifth exemplary embodiment of an air pressure control system 1560 for providing depth control of the row cleaner in a sixteen row configuration. In this system, as with that of FIG. 53C, groupings 1522,1524 and 1542 of cylinders 1414 are controlled separately as groups by a master JCA Falcon controller 1502 connected via a CAN bus 1526 to JCA controller 1410 and an additional JCA Falcon controller 1502. In this embodiment, an additional JCA Oriole controller 1410 is used to control additional cylinder group 1562 and includes control and feedback signal 1564 in a manner similar to that described above in connection with FIGS. 53B and 53C.

FIG. 53E is a sixth exemplary embodiment of an air pressure control system 1580 for providing depth control of the row cleaner in a twenty-four row configuration. In this system, as with that of FIG. 53D, groupings 1522,1524, 1542 and 1562 of cylinders 1414 are controlled separately as groups by a master JCA Falcon controller 1502 connected via a CAN bus 1526 to JCA controller 1410 and an additional JCA Falcon controller 1502 and an additional JCA Oriole controller 1410. In this embodiment, an additional JCA Oriole controller 1410 and an additional JCA Falcon controller 1502 are used to control additional cylinder groups 1582 and 1584 and includes control and feedback signal 1588 in a manner similar to that described above in connection with FIGS. 53B-D.

Tablet/Smartphone Application/Operating System

An application "app" may be developed as the user interface to the systems described above. The app can be developed for Android, Apple, and/or Microsoft platforms. It would be developed for one specific platform initially, and once testing is completed it would then be ported over to other platforms that need to be supported. The app would be available to users through app stores typically used for apps (Apple app store, Google Play store, etc.).

The basic app functionality that would be implemented for each option is as follows. In the alternative of the first embodiment the app would have a main operating screen that show the current system pressure measured, as well as a target pressure for the system. The operator could have the option to increase or decrease the target pressure, and also could have several stored settings of pressures used for different planting conditions. The stored settings could be named by the user and recalled at any time.

In the second alternative, the app would have a main operating screen and a setup screen. The main operating screen would show the current measured depth for each row section as well as a target depth that could be adjusted by the user. Similar to Option #1, the user could have predefined settings of depths that could be uniquely named and recalled automatically at later times. The setup screen would be used to define the number of sections that are controlled for the current system. Each section is a bank of 4 rows.

This app would have a main operating screen and a setup screen. The main operating screen would show the current measured depth for each individual row as well as a target depth for groups of row that could be adjusted by the user. Groups are user defined, and can be any number of rows that make sense to group together for control. Similar to the previous options, the user could have pre-defined settings of depths that could be uniquely named and recalled automatically at later times. The setup screen would be used to define the number of rows that are controlled for the current system, and how these are grouped for control.

It is contemplated that in another aspect of the wireless control system, an operator may be able to dynamically control the down pressure (and/or cause a portion of the wireless control system to dynamically control the down pressure) of one or more components of a row unit. Such a configuration may be especially useful if a single plot of land includes multiple conditions requiring different optimal down pressure values. Various aspects of a computer program and/or GUI that may be displayed on the portable computing device for use with the wireless control system are described in detail in Appendix B.

Additionally, although most illustrative embodiments pictured and described herein may be specifically adapted for use with row cleaner assemblies 10, the scope of the present disclosure is not so limited unless so indicated in the following claims. For example, it is contemplated that with another control valve, associated hydraulic cylinders, etc., a wireless control system may be adapted for use with the closing wheels of a row unit, and/or the furrow opening elements of a row unit (single disc, paired disc, etc.) without limitation unless so indicated in the following claims.

The materials used to construct the row cleaner assembly 10, row cleaner, wireless control system, and/or various elements and/or components thereof will vary depending on the specific application thereof, but it is contemplated that polymers, metals, metal alloys, natural materials, and/or combinations thereof may be especially useful for the row cleaner assembly 10, row cleaner, and/or various elements and/or components in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Figure 54:
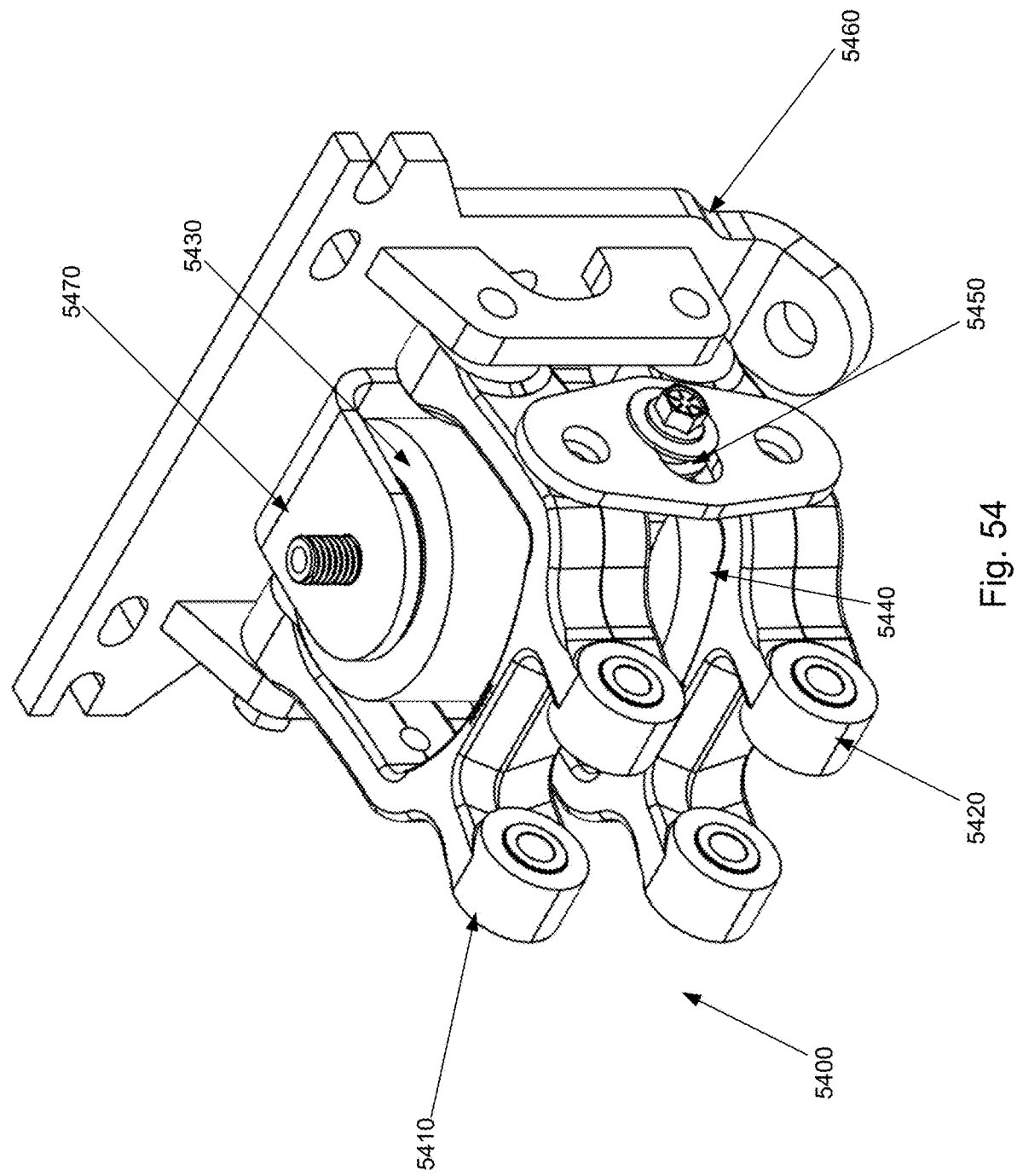
FIGS. 54 and 55 provide frontal isometric perspective views of a parallel arm assembly with air spring adjustment according to an embodiment of the present invention.
Figure 55:
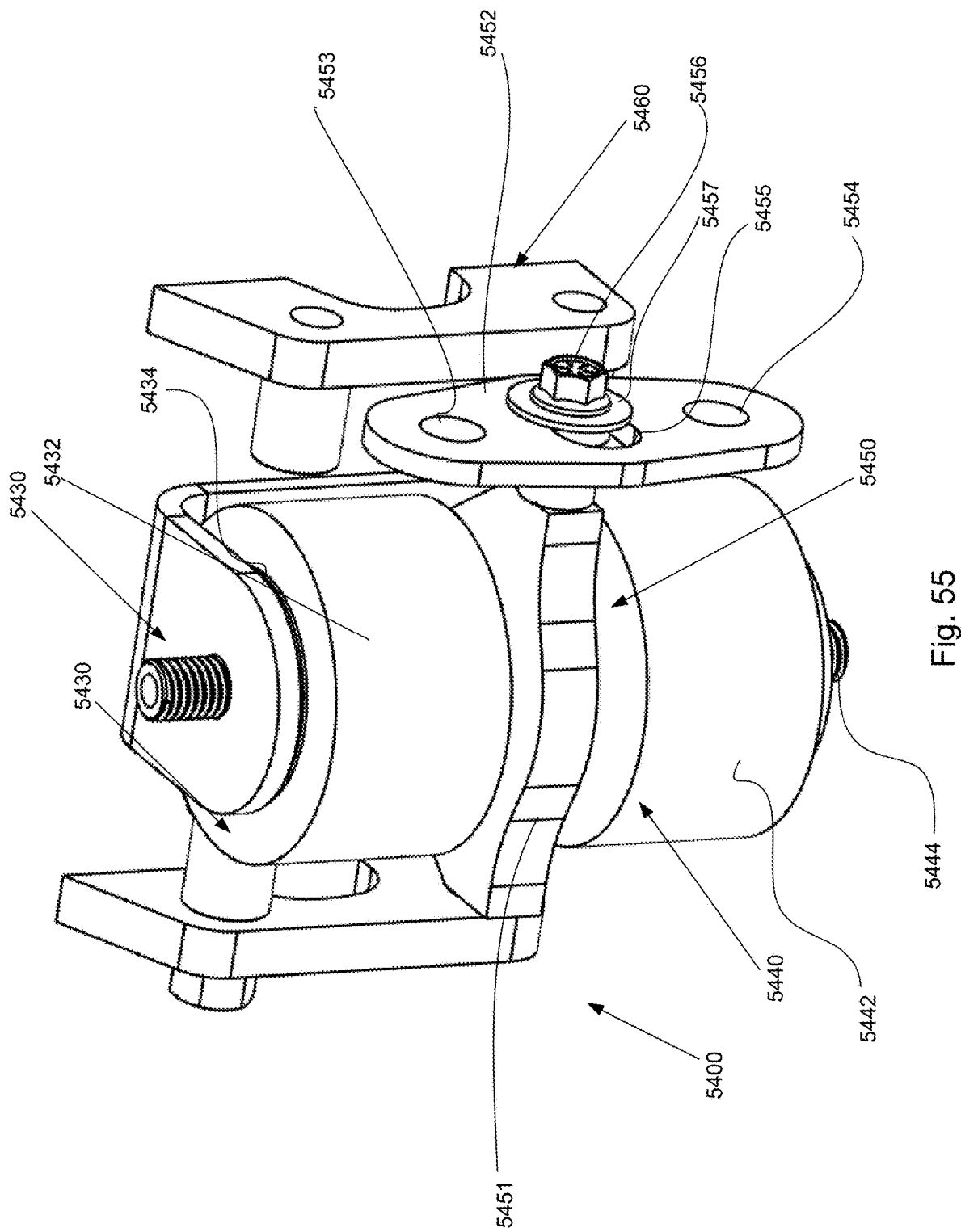

With reference now to FIGS. 54 and 55, frontal isometric perspective views of a parallel arm or linkage assembly with air spring, also referred to as air bag or sleeve air spring, adjustment 5400 according to an embodiment of the present invention are provided. The assembly 5400 comprises an upper parallel arm 5410, lower parallel arm 5420, upper air spring assembly 5430, lower air spring assembly 5440, mid plate assembly 5450, back plate or frame 5460, and supporting frame 5470. The air springs 5430 and 5440 may also be referred to as air bags or air suspension devices and may be GOODYEAR 1S3-013 air springs. The parallel arms 5410 and 5420 may be substantially similar in design and function to those of system 200 shown in FIG. 10 or assemblies 4300 shown in FIGS. 29 and 31 and may be installed and configured in a correspondingly similar manner. The supporting frame 5470 is a "U" or "C" shaped plate or flange that is secured to the frame 5460 such as by welding, but may also be formed from a cut and/or bent portion of the frame 5460. The upper air spring assembly 5430, lower air spring assembly 5440 and mid plate 5450 are disposed within the upper parallel arm 5410 and lower parallel arm 5420 and function similarly to the mechanical actuator or fluid actuator, such as a hydraulic or pneumatic cylinder, discussed herein.

In some applications or settings, using a mechanical actuator or fluid actuator, such as a hydraulic or pneumatic cylinder, may cause difficulty when attempting to perform fine adjustments of the position of the parallel arms 5410 and 5420. Gradually increasing the air pressure in the cylinder will not be sufficient to overcome internal frictions and stresses and will not result in a gradual change in the extension of the cylinder. Instead, in some circumstances the cylinder will suddenly extend, such as in a lurching fashion, and not provide the desired fine control over the position of the parallel arms 5410 and 5420. For example, the cylinder may "slam" fully open or closed instead of slightly or gradually changing position. In the system 5400 the air spring assemblies 5430 and 5440 provide for finer or more granular control over the position and angle of the parallel arms 5410 and 5420 when compared to a mechanical actuator or fluid actuator, such as a hydraulic or pneumatic cylinder. Also, by providing a dual-air bag configuration or a hybrid air bag and biasing means (e.g., mechanical spring member) configuration, this embodiment may provide enhanced control and operation.

An upper 5430 and lower 5440 air spring are positioned within the securing frame 5470, with one end of each of the air springs 5430 and 5440 secured to the securing frame 5470. For example, the top 5434 of the air spring 5430 may be secured to an upper portion of the securing frame 5470 and the top 5444 of the lower air spring 5440 may be secured to a lower or bottom portion of the securing frame 5470. In this manner, one end of each of the air springs 5430 and 5440 are in a fixed position relative to the plate 5460. An other end of each of the air springs 5430 and 5440 are secured to the mid plate assembly 5450.

The mid plate assembly 5450 comprises a mid-plate 5451 disposed between the two air springs 5430 and 5440. At one or both sides of the mid plate 5451 a cam bolt or pin 5456 is inserted into the plate 5451 through a cam-pin opening 5455 of a side plate 5452. The side plate 5452 is secured through opening 5453 to the upper parallel arm 5410 and through opening 5454 to the lower parallel arm 5420. A set of washers and bearings 5457 may be used with the cam pin or bolt 5456 to provide for smooth and even movement of the cam pin or bolt 5456 within the cam-pin opening 5455 as the parallel arms 5410 and 5420 move up and down when acted on by the spring assemblies 5430 and 5440.

In one form of operation, as the body 5432 of the upper air spring 5430 expands as pressure is increased within the air spring 5430, the mid plate 5451 is moved relatively downwards. The pressure in the body 5442 of the lower air spring 5440 may be maintained at a certain level, with excess air being bled or dumped from the lower air spring 5440 to maintain a constant internal pressure as the lower air spring 5440 is acted on by the force of the upper air spring 5430 and vice versa. Additionally, the pressure may be reduced in the opposite air spring in which pressure is being increased to provide for additional control over the position and rate of change of position of the parallel arms 5410 and 5420. The cam pin or bolt 5456 moves relatively front to back on an X-axis as the mid-plate 5451 moves top to bottom on a Y axis when the pressures are being adjusted within the air springs 5430 and 5440 to change the position of the parallel arms 5410 and 5420.

Figure 56:
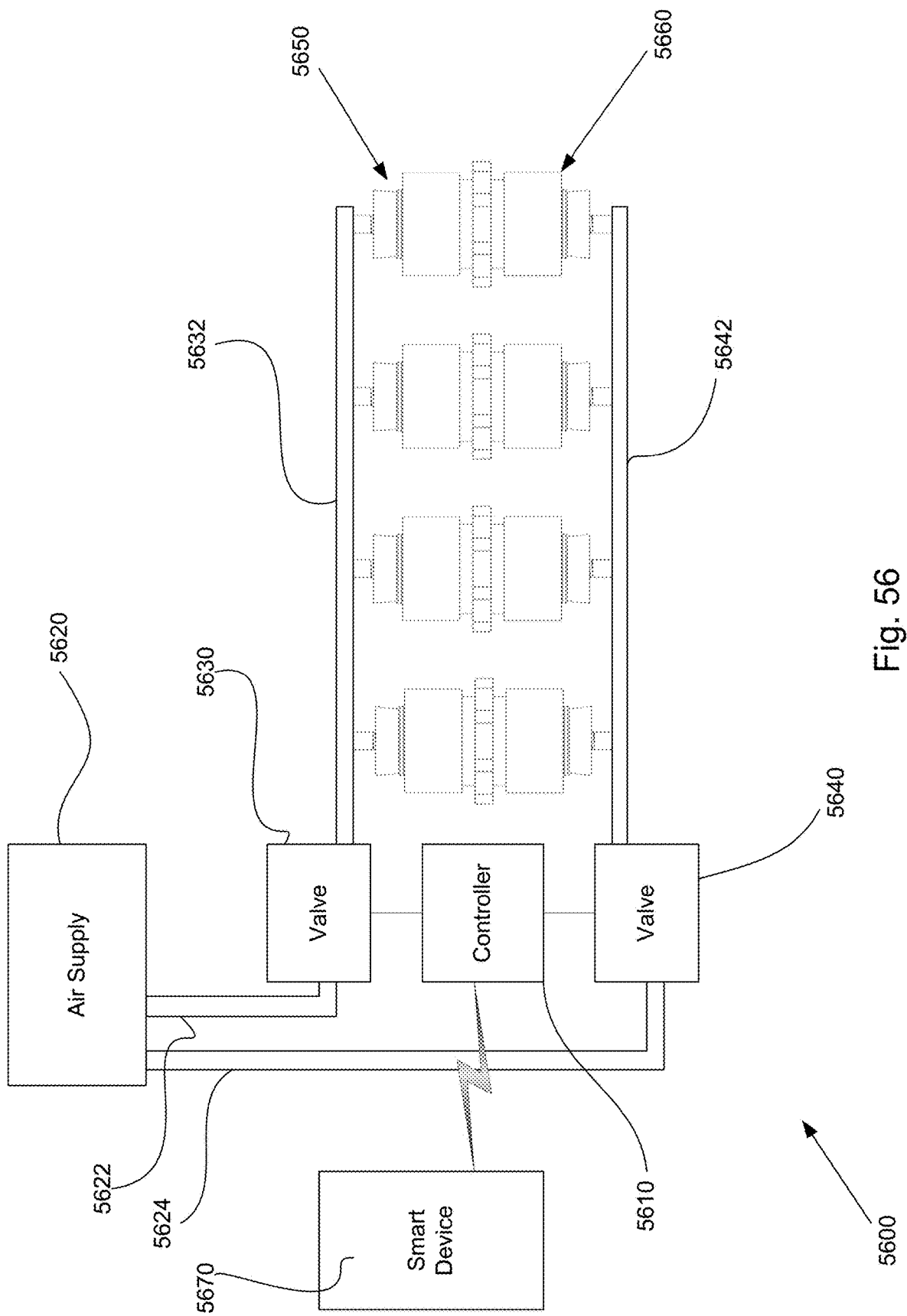
FIG. 56 provides a system diagram of a system for controlling a set of air springs in a row planting system according to an embodiment of the claimed invention.

With reference now to FIG. 56, a system diagram of a system 5600 for controlling a set of air springs 5650 and 5660 in a row planting system according to an embodiment of the claimed invention is provided. The system 5600 illustrates how a set of upper air springs 5650 and a set of lower air springs 5660 may each be grouped or "ganged" together in operation on a row planting unit, such as when installed on row closers or row cleaners on a row planter tool bar. A controller unit 5610 is in electronic communication with and operates valves 5630 and 5640, e.g., electro-pneumatic valves or regulators, which may be SMC PNEUMATICS regulators of the model SMC ITV2051-31N3N4 regulator, electro-pneumatic, IT2000/ITV2000 E/P REGULATOR. The controller unit 5610, which may be a JCA FALCON or JCA ORIOLE controller, operates the valves 5630 and 5640 to separately control or regulate the air pressure provided by the air supply 5620, which may be a hydraulic or electrically operated air compressor. Supply from the air supply 5620 may be from a common supply or may separately be supplied by lines 5622 and 5624 respectively to each of valves 5630 and 5640. A common air line 5632, which may be a set of air lines or a single air-line connected by one or more "T" junctions, provides air to each of the air springs in the set of upper air springs 5650, and a common air line 5642, which may be a set of air lines or a single air-line connected by one or more "T" junctions, provides air to each of the air springs in the set of lower air springs 5660. The smart device 5670, which may be a smart phone, tablet, laptop, or ISOBUS system integrated into a tractor or planter, provides inputs to the controller 5610 via a wired or wireless radio connection, such as by Bluetooth.

The controller 5610 may control the valves 5630 and 5640 so that one is set to maintain a certain pressure at a certain PSI, such as 50 PSI, while the other is set to increase the pressure to its corresponding set of springs. The valve set to maintain a desired pressure may bleed off or dump excess air from to maintain the desired internal pressure as the pressure increases in the corresponding opposite set of air springs. In this manner, one set of air springs, such as upper air springs 5650, may expand, while the other set of air springs 5660 maintains a desired pressure. This would then lower the parallel arm or compact row cleaner/closings assemblies operated by the air springs. The smart device 5670 and controller 5610 operating the valves 5630 and 5640 provide for manual or constant air pressure to be set for each set of gang-controlled air springs. There may be set a downward bias such that the system is set to fail in a down position.

Figure 57:
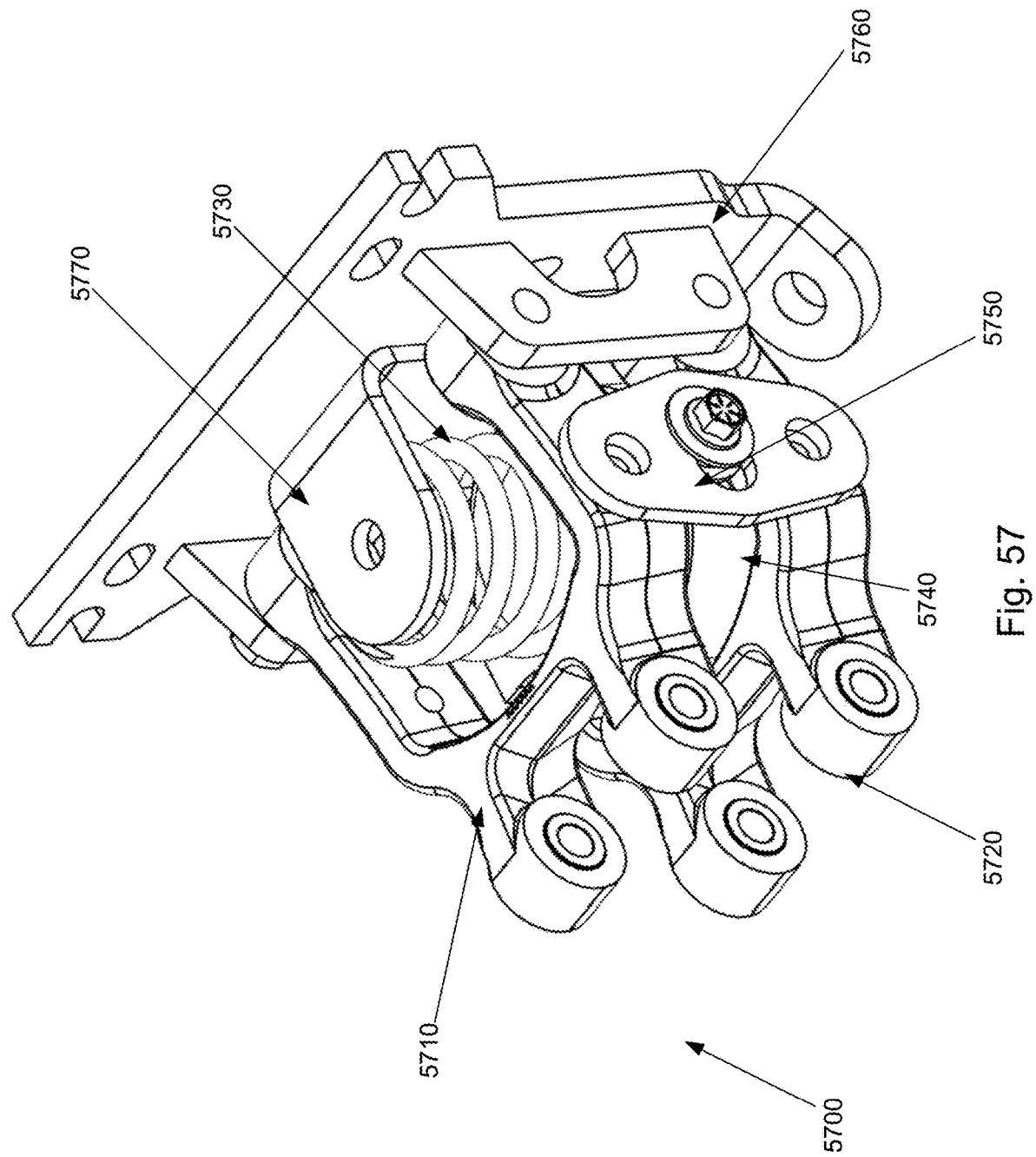
FIG. 57 provides a frontal isometric perspective view of a parallel arm assembly with spring biased air spring adjustment according to an embodiment of the present invention.

With reference now to FIG. 57, a frontal isometric perspective view of a parallel arm assembly 5700 with spring biased 5730 air spring 5740 adjustment according to an embodiment of the present invention is provided. The assembly 5700 may be similar to the assembly 5400 except that one of the air springs is replaced with a spring assembly 5730. The spring assembly 5730 and air spring 5740 are disposed within the parallel arms 5710 and 5710 and are secured to the frame or plate 5760 by the securing frame 5770. The spring assembly 5730 and air spring 5740 are joined to a mid-plate assembly 5750 and may be fixed at one end to the securing plate 5770. The spring assembly 5730 provides a downward bias on the system 5700 such that the air spring 5740 operates against the spring bias to raise the parallel arms 5710 and 5720 and such that the system fails in a down position.

Having described preferred aspects of the various methods and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the row cleaner assembly 10, row cleaner, and/or various elements and/or components are not limited to the specific embodiments pictured and described herein, but are intended to apply to all similar apparatuses and methods for providing the various features, functionalities, and/or advantages of those components. Modifications and alterations from the described embodiments will occur to those skilled in the art without departure from the spirit and scope of the present disclosure.

Any of the various features, components, functionalities, advantages, aspects, configurations, etc. for the row cleaner assembly 10, row cleaner, and/or various elements and/or components may be used alone or in combination with one another depending on the compatibility of the features, components, functionalities, advantages, aspects, configurations, etc. Accordingly, an infinite number of variations of the present disclosure exist. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the row cleaner/closer assemblies and/or components and methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A wireless control system for use with a planter row unit to provide adjustable depth control of a set of row cleaner assemblies, the control system comprising:
   a. a controller adapted to communicate via a communications link with a user-operated processor-based device having operating thereon a control application compatible with the controller;
   b. a source of compressed air adapted to output a pneumatic main supply;
   c. an electro-pneumatic regulator having an electrical input adapted to receive an electrical control signal originating from the controller, a pneumatic input in communication with the pneumatic main supply, and a pneumatic output adapted to provide a first pneumatic control supply at a first supply pressure;
   d. an air bag adapted to provide a variable force responsive to the first supply pressure on a row cleaner device, the air bag being fixed at one end relative to a frame portion of a planter row unit; and
   e. a biasing means adapted to bias the row cleaner device in a direction opposite to the air bag variable force;
   wherein the air bag device and the biasing means are mechanically connected to the row cleaner device by a set of linkages configured to move in an essentially vertical orientation relative to the ground.

2. The control system of claim 1, further comprising a plurality of air bags connected to the first pneumatic control supply to provide variable force on respective row cleaner devices, with each of the plurality of air bags being fixed at one end relative to a frame portion of a planter row unit.

3. The control system of claim 1, wherein the controller comprises a programmable logic controller (PLC) adapted to communicate via a communications link with a user-operated processor-based device having operating thereon a control application compatible with an operating system of the PLC.

4. The control system of claim 1, wherein the set of linkages comprise a pair of parallel linkages configured to pivot relative to the frame portion of the row planter and move at an end distal to the row planter in an essentially vertical manner.

5. The control system of claim 1, wherein the biasing means is a mechanical spring.

6. The control system of claim 1, wherein the biasing means is a second air bag configured opposite the air bag.

7. The control system of claim 1 further comprising a second electro-pneumatic regulator having an electrical input adapted to receive an electrical control signal originating from the controller, a pneumatic input in communication with the pneumatic main supply, and a pneumatic output adapted to provide a second pneumatic control supply at a second supply pressure, and wherein the biasing means is a second air bag configured opposite the air bag and is responsive to the second pneumatic control supply.

8. The control system of claim 1, further comprising a position feedback sensor adapted to sense the position of the row cleaner device and produce a position feedback signal representative of the sensed position, the position feedback sensor having an output in direct or indirect communication with the controller.

9. The control system of claim 1, wherein the user-operated processor-based device is a portable controller device adapted to present a user interface element to enable an operator to adjust/set the first pneumatic control supply via a graphical user interface (GUI) displayed on the portable controller device.

10. The control system of claim 1, wherein the controller communicates with the user-operated processor-based device using a wireless protocol.

11. The control system of claim 10, wherein the wireless protocol is Bluetooth.

12. The control system of claim 1, wherein the controller communicates with a cab control platform via an ISOBUS communications system.

13. A wireless control system for use with a planter row unit to provide adjustable control of a set of row closer assemblies, the control system comprising:

a. a controller adapted to communicate via a communications link with a user-operated processor-based device having operating thereon a control application compatible with the controller;

b. a source of compressed air adapted to output a pneumatic main supply;

c. an electro-pneumatic regulator having an electrical input adapted to receive an electrical control signal originating from the controller, a pneumatic input in communication with the pneumatic main supply, and a pneumatic output adapted to provide a first pneumatic control supply at a first supply pressure;

d. an air bag adapted to provide a variable force responsive to the first supply pressure on a row closing device, the air bag being fixed at one end relative to a frame portion of a planter row unit; and e. a biasing means adapted to bias the row closing device in a direction opposite to the air bag variable force;

wherein the air bag device and the biasing means are mechanically connected to the row closing device by a set of linkages configured to move in an essentially vertical orientation relative to the ground.

* * * * *